United States Patent
Yanashima et al.

(10) Patent No.: US 7,102,264 B2
(45) Date of Patent: Sep. 5, 2006

(54) SYNCHRONOUS INDUCTION MOTOR AND MANUFACTURING METHOD AND DRIVE UNIT FOR THE SAME, AND HERMETIC ELECTRIC COMPRESSOR

(75) Inventors: Toshihito Yanashima, Ota (JP); Keijiro Igarashi, Ota (JP); Masaaki Takezawa, Nitta-gun (JP); Kazuhiko Arai, Nitta-gun (JP); Eiichi Murata, Isesaki (JP); Noboru Onodera, Ora-gun (JP); Shigemi Koiso, Ota (JP); Kazuhiro Enomoto, Osato-gun (JP); Yoshitomo Nakayama, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/901,153

(22) Filed: Jul. 29, 2004

(65) Prior Publication Data

US 2005/0253474 A1 Nov. 17, 2005

Related U.S. Application Data

(62) Division of application No. 10/692,865, filed on Oct. 27, 2003, which is a division of application No. 10/108,047, filed on Mar. 28, 2002, now abandoned.

(30) Foreign Application Priority Data

| Mar. 30, 2001 | (JP) | .................... 2001-99883 |
| Mar. 30, 2001 | (JP) | .................... 2001-99938 |
| Mar. 30, 2001 | (JP) | .................... 2001-100033 |
| Mar. 30, 2001 | (JP) | .................... 2001-100129 |
| Mar. 30, 2001 | (JP) | .................... 2001-100198 |
| Mar. 30, 2001 | (JP) | .................... 2001-100263 |
| May 30, 2001 | (JP) | .................... 2001-161521 |

(51) Int. Cl.
*H02K 21/12* (2006.01)

(52) U.S. Cl. .................................... 310/156.57
(58) Field of Classification Search ............................ 310/156.01–156.84, 261
See application file for complete search history.

(56) References Cited

U.S. PATENT DOCUMENTS

| 3,492,520 A | 1/1970 | Yates ........................ 310/261 |
| 4,139,790 A | 2/1979 | Steen ..................... 310/156.83 |

(Continued)

FOREIGN PATENT DOCUMENTS

JP 64001451 A 1/1989

(Continued)

*Primary Examiner*—Darren Schuberg
*Assistant Examiner*—Nguyen Hanh
(74) *Attorney, Agent, or Firm*—Armstrong, Kratz, Quintos, Hanson & Brooks, LLP

(57) ABSTRACT

A synchronous induction motor features improved assemblability of a rotor, significantly reduced production cost, and improved operation performance of the motor. A plurality of die-cast secondary conductors is provided around a rotor yoke constituting the rotor of the synchronous induction motor. End rings are die-cast integrally with the secondary conductors on the peripheral portions of both end surfaces of the rotor yoke. Permanent magnets are inserted into slots formed such that they penetrate the rotor yoke. The openings of both ends of the slots are closed by a pair of end surface members formed of a non-magnetic constituent. One of the end surface members is secured to the rotor yoke by one of the end rings when the secondary conductors and the end rings are formed. The other end surface member is secured to the rotor yoke by a fixture.

1 Claim, 37 Drawing Sheets

U.S. PATENT DOCUMENTS

| | | | |
|---|---|---|---|
| 4,358,696 A | 11/1982 | Liu et al. | 310/156.84 |
| 4,403,161 A | 9/1983 | Miyashita et al. | 310/156.83 |
| 4,568,846 A | 2/1986 | Kapadia | 310/156.83 |
| 5,097,166 A | 3/1992 | Mikulic | 310/156.83 |
| 5,369,325 A * | 11/1994 | Nagate et al. | 310/156.54 |
| 6,008,559 A | 12/1999 | Asano et al. | 310/156.53 |
| 6,268,677 B1 | 7/2001 | Takabatake et al. | 310/156.55 |
| 6,274,960 B1 | 8/2001 | Sakai et al. | 310/156.02 |
| 6,342,745 B1 | 1/2002 | Sakai et al. | 310/156.56 |
| 6,555,940 B1 | 4/2003 | Naito et al. | 310/156.56 |
| 6,727,627 B1 * | 4/2004 | Sasaki et al. | 310/211 |

FOREIGN PATENT DOCUMENTS

JP     2000-224818     11/2000

* cited by examiner

SYNCHRONOUS INDUCTION MOTOR AND MANUFACTURING METHOD AND DRIVE UNIT FOR THE SAME, AND HERMETIC ELECTRIC COMPRESSOR

This is a divisional application of U.S. Ser. No. 10/692,865, filed Oct. 27, 2003, which is a divisional application of U.S. Ser. No. 10/108,047, filed Mar. 28, 2002 now abandoned.

BACKGROUND OF THE INVENTION

1. Field of the Invention

The present invention relates to a synchronous induction motor constituted by a plurality of secondary conductors provided on the peripheral portion of a rotor yoke, an end ring which is positioned on the peripheral portions of both end surfaces of the rotor yoke and which is integrally formed with the secondary conductors by die casting, and a permanent magnet embedded in the rotor yoke.

2. Description of the Related Art

Conventionally, an air conditioner or a refrigerator, for example, incorporates a hermetic electric compressor for the refrigerating cycle of a cooling unit of the air conditioner or the refrigerator. As an electric constituent for driving the compressor, an induction motor, a DC brushless motor, or a synchronous induction motor driven by a single-phase or three-phase commercial power supply has been used.

The rotor of the synchronous induction motor is constituted by a stator having stator windings and a rotor rotating in the stator. A plurality of secondary conductors positioned around a rotor yoke that makes up the rotor are die-cast. Furthermore, end rings are integrally formed with the secondary conductors by die-casting onto the peripheral portions of both end surfaces of the rotor yoke. Slots are formed through the rotor yoke, permanent magnets are inserted in the slots, and the openings at both ends of the slots are respectively secured by end surface members.

The permanent magnets to be provided in the rotor are inserted in the slots formed in the rotor yoke, then secured by fixing members. Furthermore, in order to ensure good rotational balance of the rotor, balancers are installed in the vicinity of the end rings positioned on the peripheral portions of the end surfaces of the rotor yoke. In this case, after forming the end rings by die casting, the end surface members for fixing the permanent magnets in the slots and the balancers are separately installed. This has been posing a problem in that the assembling efficiency of the synchronous induction motor is considerably deteriorated.

Furthermore, in order to secure the space for the slots for fixing the permanent magnets in the rotor, the end rings have to be made small. This inevitably leads to small sectional areas of the end rings. As a result, the heat generated by the rotor during operation increases, leading to a problem in that running performance is degraded due to degraded magnetic forces of the magnets, and, if rare earth type magnets are used for the permanent magnets, then significant demagnetization occurs.

SUMMARY OF THE INVENTION

Accordingly, the present invention has been made with a view toward solving the problems with the prior art described above, and it is an object of the present invention to provide a synchronous induction motor that features improved assemblability of a rotor of a synchronous induction motor and improved running performance.

According to one aspect of the present invention, there is provided a synchronous induction motor having a stator equipped with a stator winding, a rotor rotating in the stator, a plurality of secondary conductors which is positioned around a rotor yoke constituting the rotor and which is formed by die casting, end rings which are positioned on the peripheral portions of both end surfaces of the rotor yoke and which are integrally formed with the secondary conductors by die casting, permanent magnets inserted in slots formed such that they penetrate the rotor yoke, and a pair of end surface members formed of a non-magnetic material that closes the openings of both ends of the slots, wherein one of the end surface members is secured to the rotor yoke by one of the end rings when the secondary conductors and end rings are formed, and the other end surface member is secured to the rotor yoke by a fixture. Therefore, one of the end surface members can be secured to the rotor yoke at the same time when the secondary conductors and the end rings are die-cast.

With this arrangement, after the permanent magnets are inserted into the slots, the permanent magnets can be secured to the rotor merely by securing the other end surface member to the rotor yoke by a fixture. It is therefore possible to reduce the number of steps for installing the permanent magnets with resultant improved assemblability, permitting the overall productivity of synchronous induction motors to be dramatically improved.

According to another aspect of the present invention, there is provided a synchronous induction motor having a stator equipped with a stator winding, a rotor rotating in the stator, a plurality of secondary conductors which is positioned around a rotor yoke constituting the rotor and which is formed by die casting, end rings which are positioned on the peripheral portions of both end surfaces of the rotor yoke and which are integrally formed with the secondary conductors by die casting, permanent magnets inserted in slots formed such that they penetrate the rotor yoke, and a pair of end surface members formed of a non-magnetic material that closes the openings of both ends of the slots, wherein a non-magnetic member is disposed in contact with the inner sides of the two end rings to secure the two end surface members by pressing them against the rotor yoke by the non-magnetic member. It is therefore possible to increase the sectional areas of the end rings by the amount provided by pressing the end surface members against the non-magnetic member.

With this arrangement, the loss of the rotor can be decreased by the amount equivalent to the increased portion of the sectional areas of the end rings. This allows the amount of generated heat of the rotor to be reduced, making it possible to significantly improve the running performance of the synchronous induction motor.

According to yet another aspect of the present invention, there is provided a synchronous induction motor having a stator equipped with a stator winding, a rotor rotating in the stator, a plurality of secondary conductors which is positioned around a rotor yoke constituting the rotor and which is formed by die casting, end rings which are positioned on the peripheral portions of both end surfaces of the rotor yoke and which are integrally formed with the secondary conductors by die casting, permanent magnets inserted in slots formed such that they penetrate the rotor yoke, and a pair of end surface members formed of a non-magnetic material that closes the openings of both ends of the slots, wherein a balancer formed into a predetermined shape beforehand is secured by a fixture to the rotor yoke together with the end surface member. Therefore, the ease of installation of the balancer can be considerably improved.

With this arrangement, it is no longer necessary to secure the permanent magnets and the balancer separately, with consequent greater ease of installation. This permits dramatically improved productivity of the synchronous induction motor.

According to still another aspect of the present invention, there is provided a synchronous induction motor having a stator equipped with a stator winding, a rotor rotating in the stator, a plurality of secondary conductors which is positioned around a rotor yoke constituting the rotor and which is formed by die casting, end rings which are positioned on the peripheral portions of both end surfaces of the rotor yoke and which are integrally formed with the secondary conductors by die casting, permanent magnets inserted in slots formed such that they penetrate the rotor yoke, and a pair of end surface members formed of a non-magnetic material that closes the openings of both ends of the slots, wherein a plurality of laminated sheet balancers is secured by a fixture to the rotor yoke together with the end surface member. Therefore, the ease of installation of the balancer is improved, permitting dramatically improved productivity to be achieved.

Furthermore, since a plurality of sheet balancers is laminated, using inexpensive metal sheets for the balancer allows a considerable reduction in the cost of the balancer. This leads to a dramatically reduced production cost of the synchronous induction motor.

According to a further aspect of the present invention, there is provided a synchronous induction motor having a stator equipped with a stator winding, a rotor rotating in the stator, a plurality of secondary conductors which is positioned around a rotor yoke constituting the rotor and which is formed by die casting, end rings which are positioned on the peripheral portions of both end surfaces of the rotor yoke and which are integrally formed with the secondary conductors by die casting, permanent magnets inserted in slots formed such that they penetrate the rotor yoke, and a pair of end surface members formed of a non-magnetic material that closes the openings of both ends of the slots, wherein at least one of the end surface members and a balancer are formed into one piece. Hence, the number of components can be reduced. This permits simpler installation of the end surface members, resulting in dramatically improved productivity.

According to another aspect of the present invention, there is provided a synchronous induction motor having a stator equipped with a stator winding, a rotor rotating in the stator, a plurality of secondary conductors which is positioned around a rotor yoke constituting the rotor and which is formed by die casting, end rings which are positioned on the peripheral portions of both end surfaces of the rotor yoke and which are integrally formed with the secondary conductors by die casting, permanent magnets inserted in slots formed such that they penetrate the rotor yoke, a pair of end surface members formed of a non-magnetic material that closes the openings of both ends of the slots, and a balancer secured by being press-fitted to the inner side of at least one of the end rings. Hence, the installation of the balancer can be simplified. This arrangement makes it possible to significantly improve the productivity of the synchronous induction motor.

According to another aspect of the present invention, there is provided a synchronous induction motor having a stator equipped with a stator winding, a rotor rotating in the stator, a plurality of secondary conductors which is positioned around a rotor yoke constituting the rotor and which is formed by die casting, end rings which are positioned on the peripheral portions of both end surfaces of the rotor yoke and which are integrally formed with the secondary conductors by die casting, permanent magnets inserted in slots formed such that they penetrate the rotor yoke, and a pair of end surface members formed of a non-magnetic material that closes the openings of both ends of the slots in which the permanent magnets have been inserted, wherein the two end surface members are secured to the rotor yoke by the two end rings when the secondary conductors and the end rings are formed. This arrangement makes it possible to obviate the need of, for example, the cumbersome step for inserting the permanent magnets into the slots, then attaching the end surface members to both ends of the rotor yoke after die-casting the end rings, as in the case of a prior art. Thus, the productivity of the rotor can be dramatically improved.

According to a further aspect of the present invention, there is provided a synchronous induction motor having a stator equipped with a stator winding, a rotor which is secured to a rotating shaft and which rotates in the stator, a secondary conductor provided around the rotor yoke constituting the rotor, and a permanent magnet embedded in the rotor yoke, wherein a magnetic field produced by the permanent magnet does not pass through the rotating shaft. Thus, it is possible to prevent the rotating shaft from being magnetized. This arrangement makes it possible to prevent iron powder or the like from adhering to the rotating shaft and to protect the rotating shaft and a bearing from being worn due to the friction attributable to the magnetic force of the permanent magnet. This permits secure prevention of damage to the motor caused by the friction.

According to a further aspect of the present invention, there is provided a synchronous induction motor having a stator equipped with a stator winding, a rotor which is secured to a rotating shaft and which rotates in the stator, a secondary conductor provided around the rotor yoke constituting the rotor, and a permanent magnet embedded in the rotor yoke, wherein a magnetic field produced by the permanent magnet bypasses the rotating shaft. Thus, it is possible to prevent the rotating shaft from being magnetized. This arrangement makes it possible to prevent iron powder or the like from adhering to the rotating shaft and to protect the rotating shaft and a bearing from being worn due to the friction attributable to the magnetic force of the permanent magnet. This permits secure prevention of damage to the motor caused by the friction.

According to another aspect of the present invention, there is provided a synchronous induction motor having a stator equipped with a stator winding, a rotor which is secured to a rotating shaft and which rotates in the stator, a secondary conductor provided around the rotor yoke constituting the rotor, and a permanent magnet embedded in the rotor yoke, wherein a magnetic field produced by the permanent magnet passes through only the rotor yoke, excluding the rotating shaft. Thus, it is possible to prevent the rotating shaft from being magnetized. This arrangement makes it possible to prevent iron powder or the like from adhering to the rotating shaft and to protect the rotating shaft and a bearing from being worn due to the friction attributable to the magnetic force of the permanent magnet. This permits secure prevention of damage to the motor caused by the friction.

In a preferred form of the synchronous induction motor in accordance with the present invention, a void is formed in the rotor yoke between the permanent magnet and the rotating shaft, so that the passage of the magnetic field produced by the permanent magnet can be reduced. Thus, it is possible to prevent the rotating shaft from being magnetized. This arrangement makes it possible to prevent iron powder or the like from adhering to the rotating shaft and to protect the rotating shaft and a bearing from being worn due to the friction attributable to the magnetic force of the permanent magnet. This permits secure prevention of damage to the motor caused by the friction.

In another preferred form of the synchronous induction motor in accordance with the present invention, a pair of the permanent magnets is disposed with the rotating shaft therebetween, and permanent magnets for attracting the magnetic field produced by the paired permanent magnets are disposed at both ends of a line that passes the paired permanent magnets and the rotating shaft. It is therefore possible to prevent the magnetic field produced by the paired permanent magnets from passing through the rotating shaft. Thus, it is possible to prevent the rotating shaft from being magnetized. This arrangement makes it possible to prevent iron powder or the like from adhering to the rotating shaft and to protect the rotating shaft and a bearing from being worn due to the friction attributable to the magnetic force of the permanent magnet. This permits secure prevention of damage to the motor caused by the friction.

In yet another preferred form of the synchronous induction motor in accordance with the present invention, the permanent magnets are provided at both ends of a line that connects two magnetic poles, and the permanent magnets are radially disposed substantially about the rotating shaft. Hence, the magnetic field produced by the permanent magnets can be spaced away from the rotating shaft. Thus, it is possible to prevent the rotating shaft from being magnetized. This arrangement makes it possible to prevent iron powder or the like from adhering to the rotating shaft and to protect the rotating shaft and a bearing from being worn due to the friction attributable to the magnetic force of the permanent magnet. This permits secure prevention of wear on the rotor caused by the friction.

According to another aspect of the present invention, there is provided a synchronous induction motor having a stator equipped with a stator winding, a rotor rotating in the stator, a secondary conductor provided around the rotor yoke constituting the rotor, and a permanent magnet embedded in the rotor yoke, wherein the permanent magnet is magnetized by current passed through the stator winding. Hence, for example, a rotor in which a magnetic material for the permanent magnet that has not yet been magnetized has been inserted is installed in the stator, so that the rotor can be inserted into the stator without being magnetically attracted to its surrounding. This arrangement makes it possible to prevent inconvenience of lower productivity of the synchronous induction motor, thus permitting improved assemblability of the synchronous induction motor. This allows a synchronous induction motor with high reliability to be provided.

In a preferred form of the synchronous induction motor in accordance with the present invention, the permanent magnet is made of a rare earth type magnet or a ferrite magnet, so that high magnet characteristic can be achieved. With this arrangement, the magnitude of the current passed through the stator winding can be reduced so as to control the temperature at the time of magnetization to a minimum. Hence, the deformation of the rotor or the stator or the like that would be caused by high temperature can be minimized, making it possible to provide a synchronous induction motor with secured high quality.

Especially in the case of a synchronous induction motor, current passes through the secondary conductor even during normal synchronous operation, causing the temperature of the entire rotor to rise. Therefore, the demagnetization at high temperature can be restrained by using, for example, a ferrite magnet or a rare earth type magnet (the coercive force at normal temperature being 1350 to 2150 kA/m and the coercive force temperature coefficient being $-0.7\%/^\circ$ C. or less).

In a preferred form of the synchronous induction motor in accordance with the present invention, the stator winding is of a single-phase configuration and has a primary winding and an auxiliary winding, and the permanent magnet is magnetized by the current passed through either the primary winding or the auxiliary winding. Hence, it is possible to achieve better magnetizing performance than, for example, in the case where current is passed through both the primary winding and the auxiliary winding at the same time. This allows an unmagnetized magnet material to be intensely magnetized.

In a preferred form of the synchronous induction motor in accordance with the present invention, the stator winding is of a three-phase configuration that includes a three-phase winding. The permanent magnet is magnetized by current passed through a single phase, two phases, or three phases of the stator windings. Therefore, it is possible to select the phase or phases through which current is to be passed according to the disposition of the magnet or the permissible current (against deformation or the like) of the windings.

In yet another preferred form of the synchronous induction motor in accordance with the present invention, the stator windings are coated with varnish or a sticking agent that is heated to fuse the windings. Hence, for example, even if the stator windings generate heat and become hot when an unmagnetized magnet material inserted into the rotor is magnetized by passing current through the stator windings, it is possible to restrain the deformation of winding ends of the stator windings and the deterioration of winding films caused by the heat. Thus, since the winding ends of the stator windings do not deform even if an unmagnetized magnet material inserted into the rotor is magnetized, a highly reliable synchronous induction motor can be provided.

Furthermore, the synchronous induction motor in accordance with the present invention is installed in a compressor, allowing the production cost of the compressor to be considerably reduced.

Moreover, the compressor incorporating the synchronous induction motor in accordance with the present invention is used with an air conditioner or an electric refrigerator or the like. Hence, the production cost of the air conditioner or the electric refrigerator can be significantly decreased.

According to another aspect of the present invention, there is provided a manufacturing method for a synchronous induction motor having a stator equipped with a stator winding, a rotor rotating in the stator, a secondary conductor provided around a rotor yoke constituting the rotor, and a permanent magnet embedded in the rotor yoke, wherein a magnet constituent for the permanent magnet is embedded in the rotor yoke and current is passed through the stator winding to magnetize the magnet constituent. Hence, the rotor can be inserted into the stator without being magnetically attracted to its surrounding, permitting dramatically improved assemblability of the synchronous induction motor. This makes it possible to prevent an inconvenience of reduced productivity of the synchronous induction motor, which permits improved assemblability of the synchronous induction motor. As a result, a highly reliable synchronous induction motor can be provided.

In a preferred form of the manufacturing method for the synchronous induction motor in accordance with the present invention, a rare earth type or ferrite material is used for the magnet constituent. Therefore, a high magnet characteristic can be achieved even if, for example, a magnetizing magnetic field is weak. This makes it possible to reduce the current passing through the stator winding so as to minimize a temperature rise that occurs at the time of magnetization. Thus, the deformation of the rotor or the stator or the like caused by high temperature can be minimized, ensuring high quality of the synchronous induction motor.

In a preferred form of the manufacturing method for the synchronous induction motor in accordance with the present invention, the stator winding is of a single-phase configuration and has a primary winding and an auxiliary winding, and the magnet constituent is magnetized by the current passed through either the primary winding or the auxiliary winding. Hence, it is possible to achieve better magnetizing performance than, for example, in the case where current is passed through both the primary winding and the auxiliary winding at the same time. This allows an unmagnetized magnet material to be intensely magnetized.

In a preferred form of the manufacturing method for the synchronous induction motor in accordance with the present invention, the stator winding is of a three-phase configuration that includes a three-phase winding. The magnet constituent is magnetized by current passed through a single phase, two phases, or three phases of the stator windings. Therefore, it is possible to select the phase or phases through which current is to be passed according to the disposition of the magnet or the permissible current (against deformation or the like) of the windings.

In yet another preferred form of the manufacturing method for the synchronous induction motor in accordance with the present invention, the stator windings are coated with varnish or a sticking agent that is heated to fuse the windings. Hence, for example, even if the stator windings are subjected to electromagnetic forces when an unmagnetized magnet constituent inserted into the rotor is magnetized by passing current through the stator windings, it is possible to restrain the deformation of windings and the deterioration of the films of the windings. Thus, since the winding ends of the stator windings do not deform even if an unmagnetized magnet material inserted into the rotor is magnetized, a highly reliable synchronous induction motor can be provided.

According to yet another aspect of the present invention, there is provided a drive unit for a synchronous induction motor that includes a stator equipped with a stator winding formed of a primary winding and an auxiliary winding, a rotor rotating in the stator, a secondary conductor provided around a rotor yoke constituting the rotor, a permanent magnet embedded in the rotor yoke, an operating capacitor connected to the auxiliary winding, and a series circuit of a start-up capacitor and a PTC, which is connected in parallel to the operating capacitor. This arrangement permits larger running torque to be provided at starting up the synchronous induction motor equipped with the operating capacitor connected to the auxiliary winding, and the series circuit of the start-up capacitor and the PTC, which is connected in parallel to the operating capacitor. This enables the power consumed during normal operation to be reduced, making it possible to provide a drive unit capable of running the synchronous induction motor with extremely high efficiency. Hence, considerably higher efficiency can be achieved during the operation of the synchronous induction motor.

According to still another aspect of the present invention, there is provided a drive unit for a synchronous induction motor that includes a stator equipped with a stator winding formed of a primary winding and an auxiliary winding, a rotor rotating in the stator, a secondary conductor provided around a rotor yoke constituting the rotor, a permanent magnet embedded in the rotor yoke, an operating capacitor connected to the auxiliary winding, and a PTC connected in parallel to the operating capacitor. This arrangement permits larger running torque to be provided at starting up the synchronous induction motor equipped with the operating capacitor connected to the auxiliary winding and the PTC connected in parallel to the operating capacitor. This enables the power consumed during normal operation to be reduced, making it possible to provide a drive unit capable of running the synchronous induction motor with extremely high efficiency. Hence, considerably higher efficiency can be achieved during the operation of the synchronous induction motor.

According to yet another aspect of the present invention, there is provided a drive unit for a synchronous induction motor that includes a stator equipped with a stator winding formed of a primary winding and an auxiliary winding, a rotor rotating in the stator, a secondary conductor provided around a rotor yoke constituting the rotor, a permanent magnet embedded in the rotor yoke, an operating capacitor connected to the auxiliary winding, and a series circuit of a start-up capacitor and a start-up relay contact connected in parallel to the operating capacitor. This arrangement permits larger running torque to be provided at starting up the synchronous induction motor equipped with the operating capacitor connected to the auxiliary winding, and the series circuit of the start-up capacitor and the start-up relay contact connected in parallel to the operating capacitor. This enables the power consumed during normal operation to be reduced, making it possible to provide a drive unit capable of running the synchronous induction motor with extremely high efficiency. Hence, considerably higher efficiency can be achieved during the operation of the synchronous induction motor.

According to a further aspect of the present invention, there is provided a drive unit for a synchronous induction motor that includes a stator equipped with a stator winding formed of a primary winding and an auxiliary winding, a rotor rotating in the stator, a secondary conductor provided around a rotor yoke constituting the rotor, a permanent magnet embedded in the rotor yoke, and an operating capacitor connected to the auxiliary winding. This arrangement permits larger running torque to be provided at starting up the synchronous induction motor equipped with the operating capacitor connected to the auxiliary winding. This enables the power consumed during normal operation to be reduced, making it possible to provide a drive unit capable of running the synchronous induction motor with extremely high efficiency. Hence, considerably higher efficiency can be achieved during the operation of the synchronous induction motor.

According to a further aspect of the present invention, there is provided a hermetic electric compressor having a compression unit and an electric unit for driving the compression unit in a hermetic vessel, wherein the electric unit is secured to the hermetic vessel and constituted by a stator equipped with a stator winding and a rotor rotating in the stator, the rotor has a secondary conductor provided around a rotor yoke and a permanent magnet embedded in the rotor yoke, and a thermal protector for cutting off the supply of current to the electric unit in response to a predetermined temperature rise is provided in the hermetic vessel. Therefore, installing the thermal protector onto the stator winding, for example, makes it possible to cut off the supply of current to the electric unit if the temperature of the stator winding rises. This arrangement makes it possible to prevent the permanent magnet embedded in the rotor yoke from being thermally demagnetized by a rise in temperature of the electric unit. Hence, the supply of current to the stator winding can be cut off before the stator winding generates abnormal heat while the hermetic electric compressor is in operation. This makes it possible to securely prevent damage to the stator winding and thermal demagnetization of the permanent magnet so as to ideally maintain the driving force of a synchronous induction motor, permitting significantly improved reliability of the electric unit.

According to a further aspect of the present invention, there is provided a hermetic electric compressor having a compression unit and an electric unit for driving the compression unit in a hermetic vessel, wherein the electric unit is secured to the hermetic vessel and constituted by a stator equipped with a stator winding and a rotor rotating in the stator, the rotor has a secondary conductor provided around a rotor yoke and a permanent magnet embedded in the rotor yoke, and a thermal protector for cutting off the supply of current to the electric unit at a predetermined temperature rise is provided on the outer surface of the hermetic vessel. Therefore, it is possible to cut off the supply of current to the electric unit if the temperature of the outer surface of the hermetic vessel rises due to the heat generated by the electric unit. Thus, a temperature rise in the hermetic vessel can be restrained, so that an accident, such as a fire, caused by a temperature rise in the hermetic vessel can be prevented.

In a preferred form of the hermetic electric compressor in accordance with the present invention, the thermal protector is constructed of a thermistor whose resistance value varies with temperature and a controller that controls the supply of current to the electric unit according to a change in the resistance value of the thermistor. Thus, if, for example, the temperature of the hermetic electric compressor rises and exceeds a preset level, the controller controls the supply of current to the electric unit and cuts off the supply of current to the electric unit. With this arrangement, it is possible to control the current supplied to the stator winding before the hermetic electric compressor is run under overload and damaged. This means that a temperature rise in the electric unit can be securely controlled by controlling the revolution of the electric unit, enabling the service life of the electric unit to be prolonged, with resultant dramatically improved reliability of the hermetic electric compressor.

In a preferred form of the hermetic electric compressor in accordance with the present invention, the thermal protector is constituted by a bimetal switch, so that the current supplied to the electric unit can be cut off also if the temperature of the hermetic electric compressor rises. This obviates the need for controllably adjust the electric unit by using an expensive circuit device, making it possible to effect inexpensive and secure protection of the hermetic electric compressor from damage caused by a temperature rise.

In a preferred form of the hermetic electric compressor in accordance with the present invention, the thermal protector is constituted by a thermostat that opens/closes a contact according to temperature, so that the current supplied to the electric unit can be cut off also if the temperature of the hermetic electric compressor rises. This obviates the need for controllably adjusting the electric unit by using an expensive circuit device, making it possible to effect inexpensive and secure protection of the hermetic electric compressor from damage caused by a temperature rise.

According to a further aspect of the present invention, there is provided a hermetic electric compressor having a compression unit and an electric unit for driving the compression unit in a hermetic vessel, wherein the electric unit is secured to the hermetic vessel and constituted by a stator equipped with a stator winding and a rotor rotating in the stator, the rotor has a secondary conductor provided around a rotor yoke and a permanent magnet embedded in the rotor yoke, and an overload protector for cutting off the supply of current to the electric unit in response to a predetermined overload current is provided. Therefore, it is possible to cut off the supply of current to the electric unit if the hermetic electric compressor is overloaded during operation, thereby allowing the electric unit to be protected from a temperature rise. Thus, damage to the electric unit can be prevented, enabling the service life of the electric unit to be considerably prolonged, with resultant dramatically improved reliability of the hermetic electric compressor.

In a preferred form of the hermetic electric compressor in accordance with the present invention, the overload protector is constituted by an overload switch, so that the current supplied to the electric unit can be cut off to prevent a temperature rise in the electric unit thereby to protect it if the hermetic electric compressor is overloaded during operation. Thus, damage to the electric unit can be prevented, enabling the service life of the electric unit to be considerably prolonged, with resultant dramatically improved reliability of the hermetic electric compressor.

In another preferred form of the hermetic electric compressor in accordance with the present invention, the overload protector is constituted by a current transformer for detecting the current supplied to the electric unit and a controller for controlling the supply of current to the electric unit on the basis of an output of the current transformer, so that the current supplied to the electric unit can be cut off by the controller if the hermetic electric compressor is overloaded during operation. This arrangement makes it possible to prevent a temperature rise in the electric unit so as to protect the electric unit. Hence, damage to the electric unit attributable to an overload current can be securely prevented.

In another preferred form of the hermetic electric compressor in accordance with the present invention, the controller cuts off the supply of current to the electric unit after a predetermined time elapses since a temperature or current exceeded a predetermined value. It is therefore possible to protect, by the controller, the electric unit which would be damaged if continuously subjected to an excessive temperature rise or overcurrent caused by an overloaded operation or the like of the hermetic electric compressor. Thus, damage to the electric unit can be prevented, enabling the service life of the electric unit to be considerably prolonged, with resultant dramatically improved reliability of the hermetic electric compressor.

In a further preferred form of the hermetic electric compressor in accordance with the present invention, the controller restarts the supply of current to the electric unit after waiting for the elapse of a predetermined delay time since the supply of current to the electric unit was cut off. This means that the delay time is always allowed before the supply of current to the electric unit is restarted after the supply of current to the electric unit was cut off. It is therefore possible to prevent the rotor from becoming hot due to, for example, frequent repetition of energizing and de-energizing of the electric unit. Hence, demagnetization of the permanent magnet embedded in the rotor due to heat can be prevented.

DESCRIPTION OF THE PREFERRED EMBODIMENTS

Figure 1:
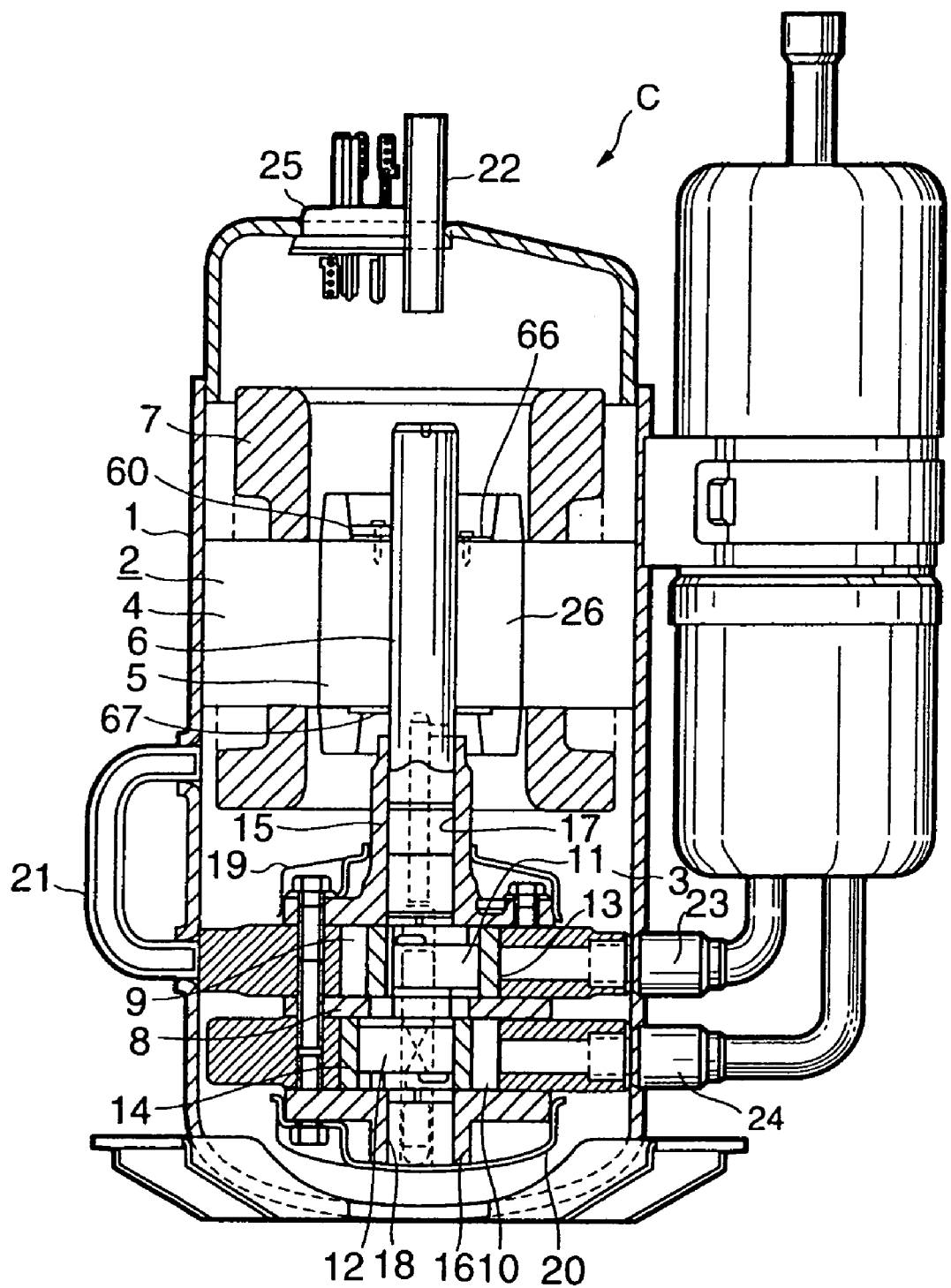
FIG. 1 is a longitudinal sectional side view of a hermetic electric compressor to which a synchronous induction motor in accordance with the present invention has been applied.

Embodiments of the present invention will be described in detail with reference to the accompanying drawings. FIG. 1 is a longitudinal sectional side diagram of a hermetic electric compressor C, an embodiment to which the present invention is applied. A hermetic vessel 1 in FIG. 1 includes a synchronous induction motor 2 in accordance with the present invention in an upper compartment and a compressor 3 in a lower compartment in the hermetic vessel 1, the compressor 3 being rotatively driven by the synchronous induction motor 2. The hermetic vessel 1 is split into two parts in advance to house the synchronous induction motor 2 and the compressor 3, then hermetically sealed by high-frequency welding or the like. The hermetic electric compressor C may be a rotary, reciprocal, scroll compressor, or the like.

The synchronous induction motor 2 is constructed of a single-phase, two-pole stator 4 secured to the inner wall of the hermetic vessel 1 and a rotor 5 which is located on the inner side of the stator 4 and rotatively supported around a rotating shaft 6. The stator 4 is provided with a stator winding 7 for applying a rotational magnetic field to the rotor 5.

The compressor 3 has a first rotary cylinder 9 and a second rotary cylinder 10 separated by a partitioner 8. The cylinders 9 and 10 have eccentric members 11 and 12 rotatively driven by the rotating shaft 6. The eccentric positions of the eccentric members 11 and 12 are phase-shifted from each other 180 degrees.

A first roller 13 located in the cylinder 9 and a second roller 14 located in the cylinder 10 rotate in the cylinders as the eccentric members 11 and 12 rotate. Reference numerals 15 and 16 denote a first frame member and a second frame member, respectively. The first frame member 15 forms a closed compression space of the cylinder 9 between itself and the partitioner 8. Similarly, the second frame member 16 forms a closed compression space of the cylinder 10 between itself and the partitioner 8. The first frame member 15 and the second frame member 16 are equipped with bearings 17 and 18, respectively, that rotatively support the bottom of the rotating shaft 6.

Discharge mufflers 19 and 20 are installed so as to cover the first frame member 15 and the second frame member 16. The cylinder 9 and the discharge muffler 19 are in communication through a discharge aperture (not shown) provided in the first frame member 15. Similarly, the cylinder 10 and the discharge muffler 20 are also in communication through a discharge aperture (not shown) provided in the second frame member 16. A bypass pipe 21 provided outside the hermetic vessel 1, and is in communication with the interior of the discharge muffler 20.

A discharge pipe 22 is provided at the top of the hermetic vessel 1. Suction pipes 23 and 24 are connected to the cylinders 9 and 10, respectively. A hermetic terminal 25 supplies electric power to the stator winding 7 of the stator 4 from outside the hermetic vessel 1 (the lead wire connecting the hermetic terminal 25 and the stator winding 7 being not shown).

A rotor iron core 26 is formed of a plurality of laminated rotator iron plates, each of which is made by punching an electromagnetic steel plate having a thickness of 0.3 mm to 0.7 mm (not shown) into a predetermined shape. The laminated rotator iron plates are crimped into one piece, or may be welded into one piece. End surface members 66 and 67 are attached to the top and bottom ends of the rotor iron core 26. The end surface members 66 and 67 are formed of planes made of a non-magnetic material, such as stainless steel, aluminum, copper, or brass. If the end surface members 66 and 67 should use a magnetic material, then the end surface members 66 and 67 would provide a magnetic path, and the magnet of the rotor 5 would develop a magnetic short circuit, leading to degraded running performance of the synchronous induction motor 2. For this reason, a non-magnetic material is used for the members 66 and 67.

Figure 2:
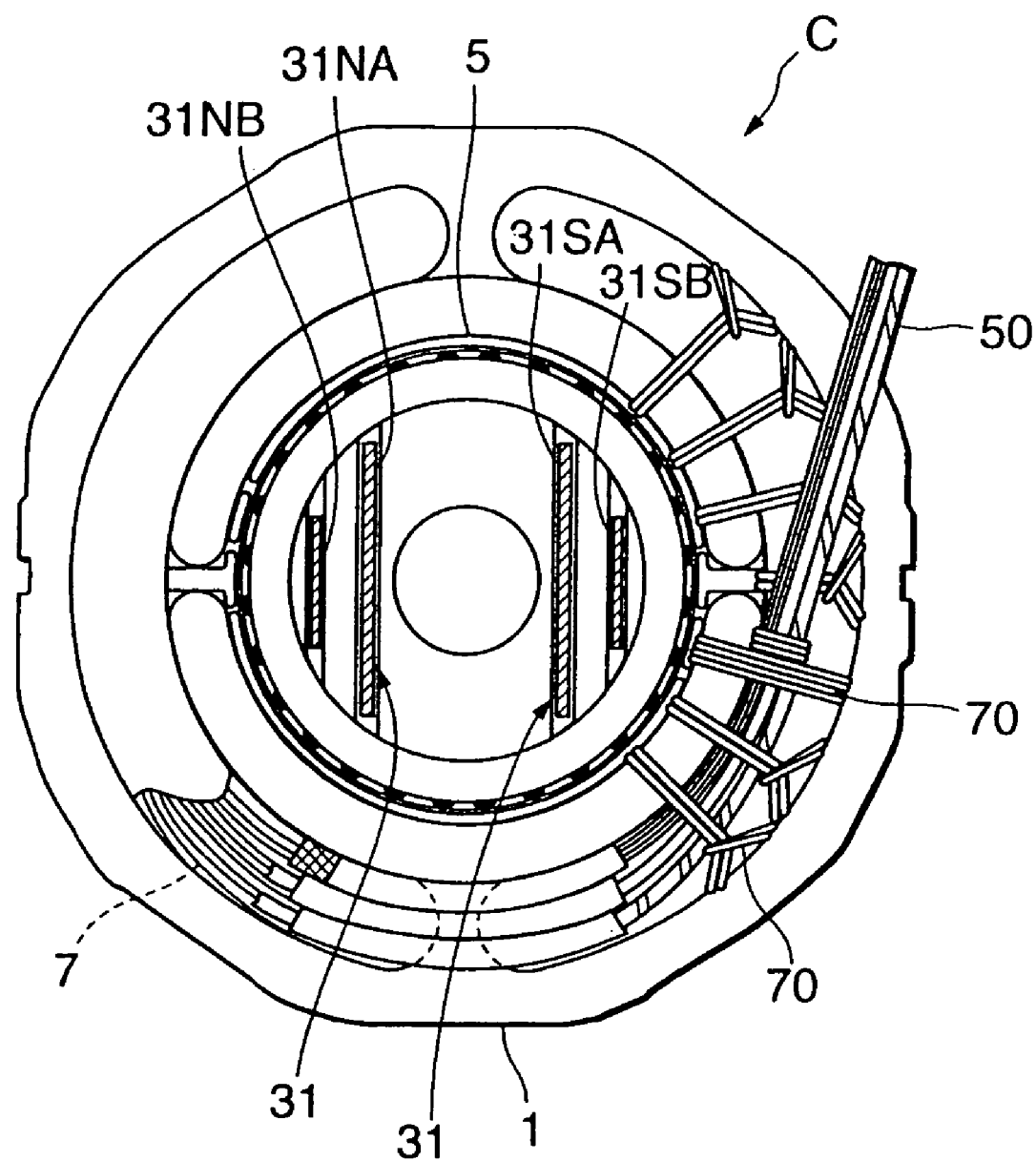
FIG. 2 is a plan view of the hermetic electric compressor with its hermetic vessel split into two.
Figure 3:
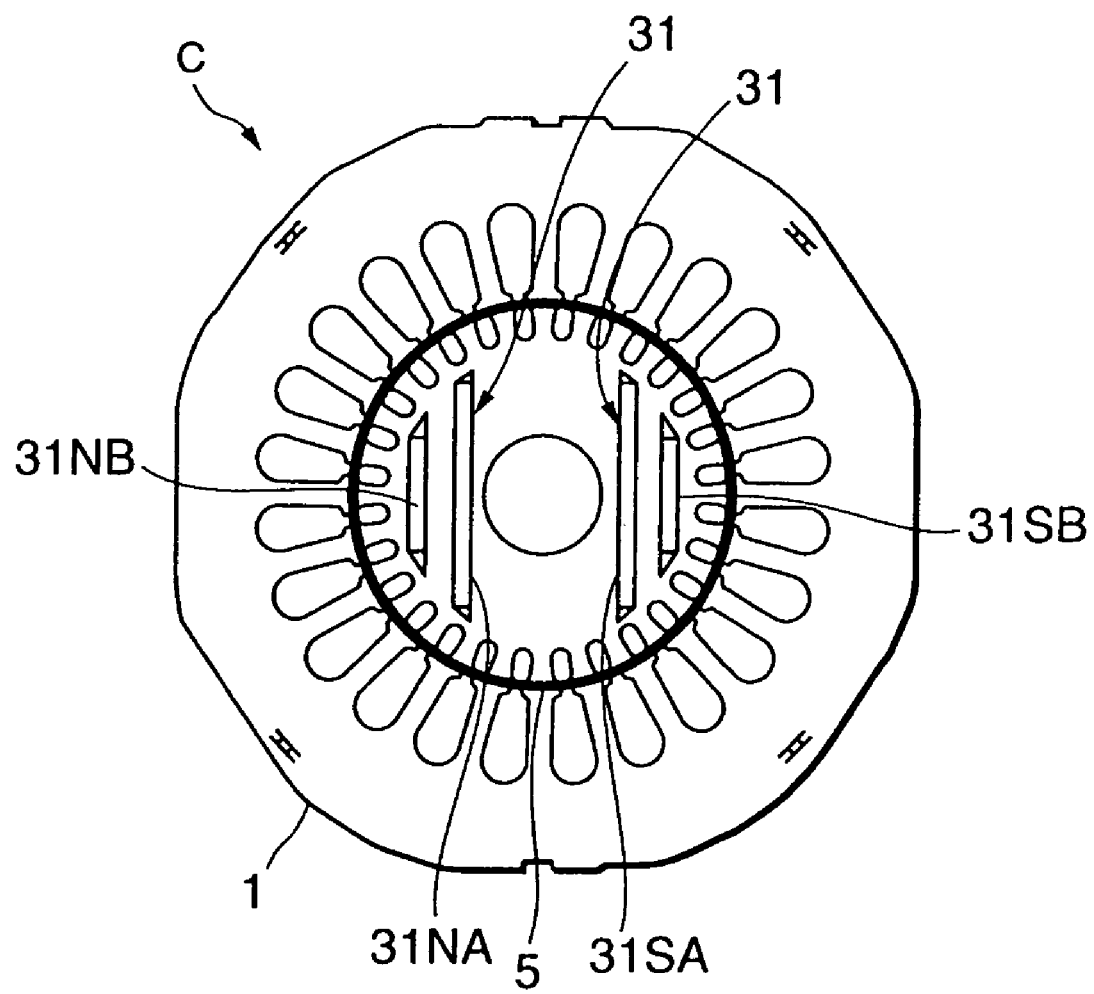
FIG. 3 is a cross sectional top view of the motor.
Figure 4:
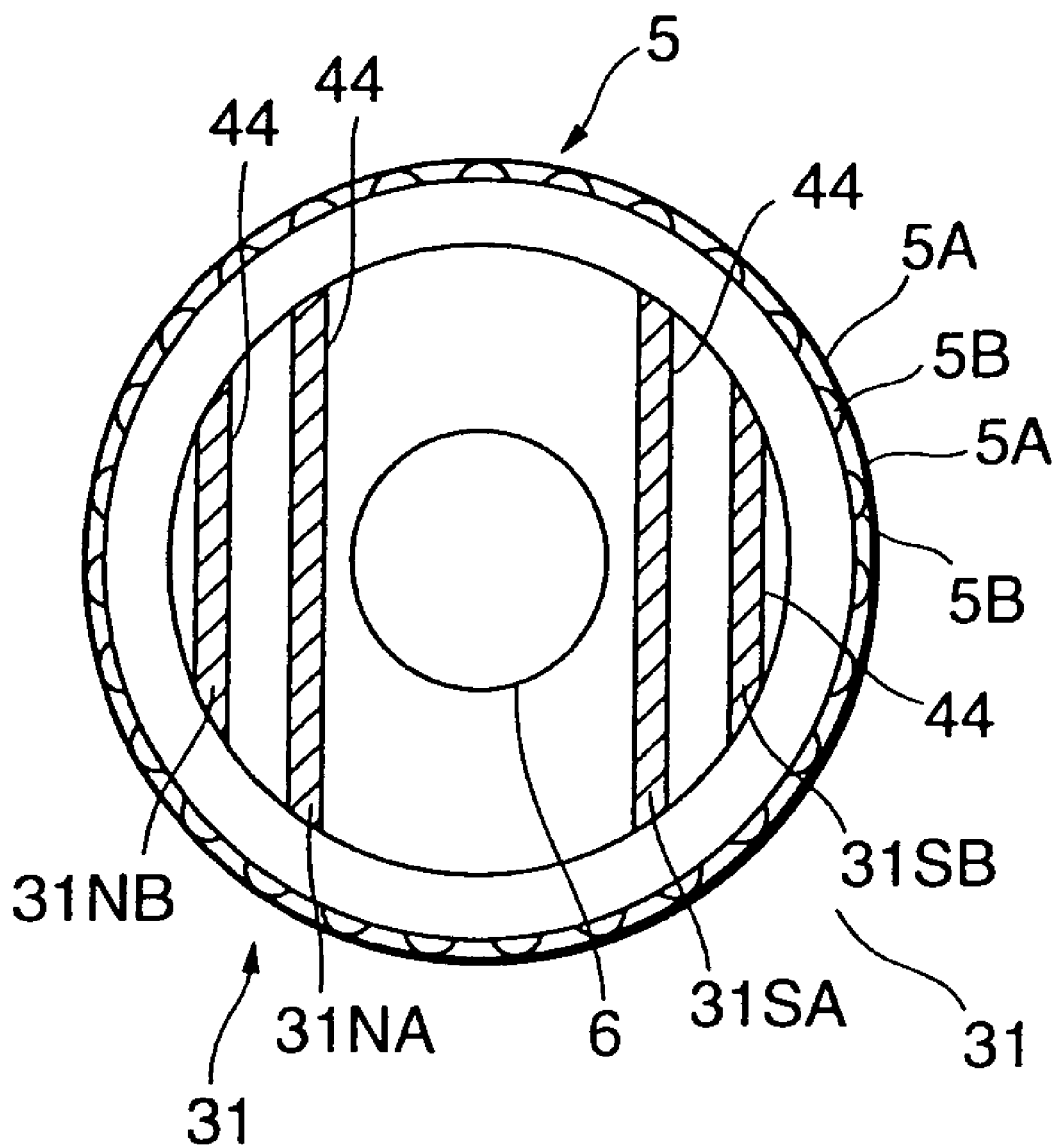
FIG. 4 is a partially cutaway cross sectional top view of a rotor.
Figure 5:
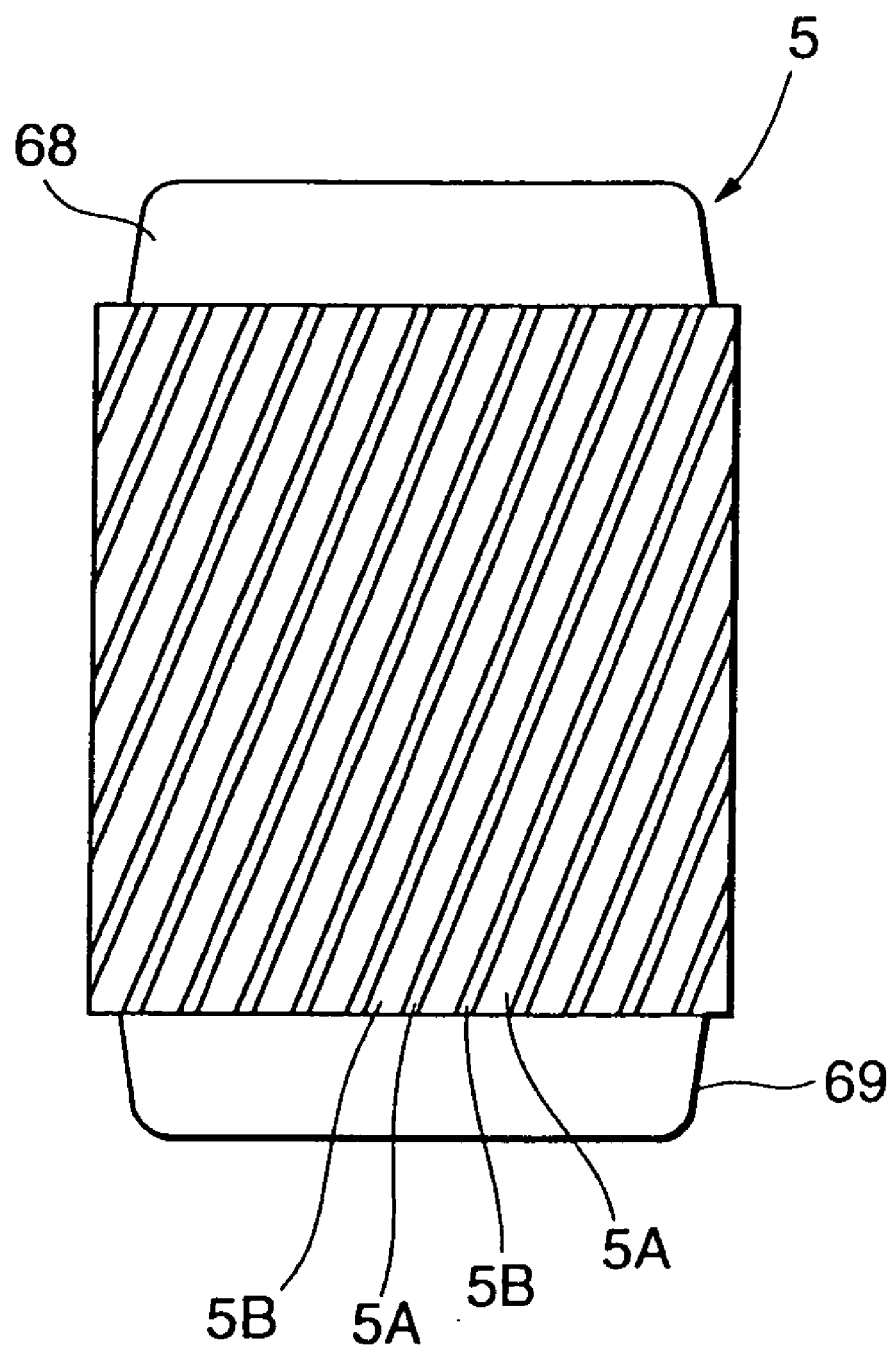
FIG. 5 is a side view of the rotor.

FIG. 2 is a plan view of the hermetic electric compressor C having the hermetic vessel 1 split into two parts. FIG. 3 is a cross sectional top view of the hermetic electric compressor C, FIG. 4 is a cross sectional top view of the rotor 5, and FIG. 5 is a side view of the rotor 5. The stator 4 has the stator winding 7 wound around the stator 4. A leader line 50 connected to the stator winding 7 and a coil end of the stator winding 7 are joined together with a polyester thread 70, and the leader line 50 is connected to the hermetic terminal 25.

The rotor 5 is constructed of a rotor yoke 5A, die-cast squirrel-cage secondary conductors 5B positioned around the rotor yoke 5A, a die-cast end ring 69 which is positioned on the peripheral portion of an end surface of the rotor yoke 5A, which annularly protrudes by a predetermined dimension, and which is integrally die-cast with the squirrel-cage secondary conductors 5B, and permanent magnets 31 embedded in the rotor yoke 5A. The permanent magnets 31 are magnetized after permanent magnet materials are inserted in slots 44, which will be discussed hereinafter. The permanent magnets 31 (31SA and 31SB) embedded in one side (e.g., the right side in the drawing) from the rotating shaft 6 are polarized with the same south pole, while the permanent magnets 31 (31NA and 31NB) embedded in the other side (e.g., the left side in the drawing) are polarized with the same north pole.

The plurality of squirrel-cage secondary conductors 5B are provided on the peripheral portion of the rotor yoke 5A and have aluminum diecast members injection-molded in cylindrical holes (not shown) formed in the cage in the direction in which the rotating shaft 6 extends. The squirrel-cage secondary conductors 5B are formed in a so-called skew pattern in which they are spirally inclined at a predetermined angle in the circumferential direction of the rotating shaft 6 from one end toward the other end, as shown in FIG. 5.

Figure 6:
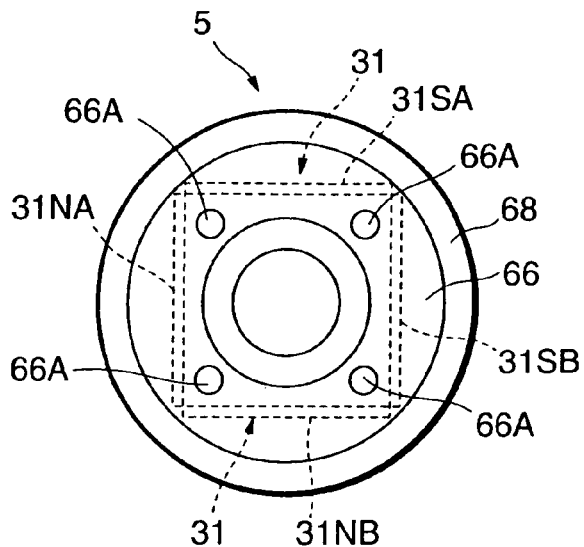
FIG. 6 is a top view of the rotor.
Figure 7:
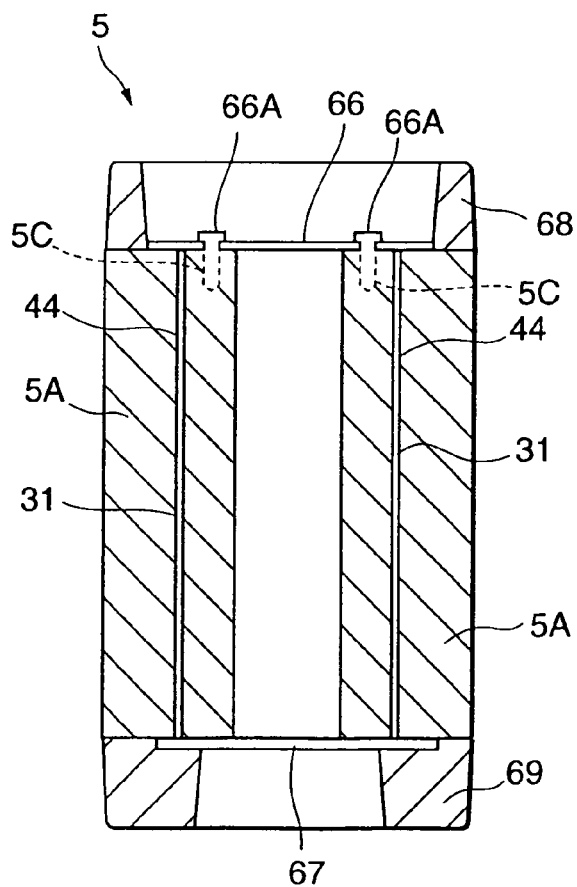
FIG. 7 is a longitudinal side view of the rotor shown in FIG. 6.

The rotor yoke 5A has a plurality of slots 44 (four in this embodiment) vertically formed with both ends open. The openings at both ends of the slots 44 are closed by a pair of the end surface members 66 and 67, respectively, as shown in FIGS. 6 and 7. When the squirrel-cage secondary conductors 5B and the end rings 68 and 69 are die-cast, the end surface member 67 is fixed to the rotor yoke 5A by the end ring 69. The end surface member 66 is secured to the rotor yoke 5A by a plurality of rivets 66A functioning as fixtures.

In this case, after the permanent magnets 31 are inserted through the openings of the slots 44, the openings are closed by the end surface member 66, and the end surface member 66 is fixed by riveting into engaging holes 5C provided in the rotor yoke 5A. This secures the permanent magnets 31 into the slots 44. The permanent magnets 31 are made of a rare earth type permanent magnet material of, for example, a praseodymium type permanent magnet or a neodymium type permanent magnet with nickel plating or the like provided on the surface thereof so as to produce high magnetic forces. The permanent magnets 31 and 31 are provided such that they oppose the rotating shaft 6, and the opposing permanent magnets 31 and 31 are embedded and magnetized to have opposite poles.

The permanent magnets 31SA and 31SB embedded in one side (e.g., the right side and the upper side in the drawing) from the rotating shaft 6 are polarized with the same south pole, while the permanent magnets 31NA and 31NB embedded in the other side (e.g., the left side and the lower side in the drawing) are polarized with the same north pole. More specifically, the permanent magnets 31SA, 31SB and the permanent magnets 31NA, 31NB are disposed to substantially form a rectangular shape around the rotating shaft 6, and are embedded such that they carry two poles, namely, the south pole and the north pole, outward in the circumferential direction of the rotating shaft 6. This enables torque to be applied to the rotor 5 by the magnetic forces of a primary winding 7A and an auxiliary winding 7B, which will be discussed hereinafter. The layout of the permanent magnets 31 shown in FIGS. 6 and 7 is different from the layout of the permanent magnets 31 shown in FIGS. 2, 3, and 4. The layout of the permanent magnets 31 shown in FIGS. 6 and 7 may be replaced by the layout shown in FIGS. 2, 3, and 4. In this case, however, the riveting positions of the rivets 66A have to be changed. Further alternatively, the permanent magnets 31 shown in FIGS. 2, 3, and 4 may be arranged as shown in FIG. 6 or 7.

Figure 8:
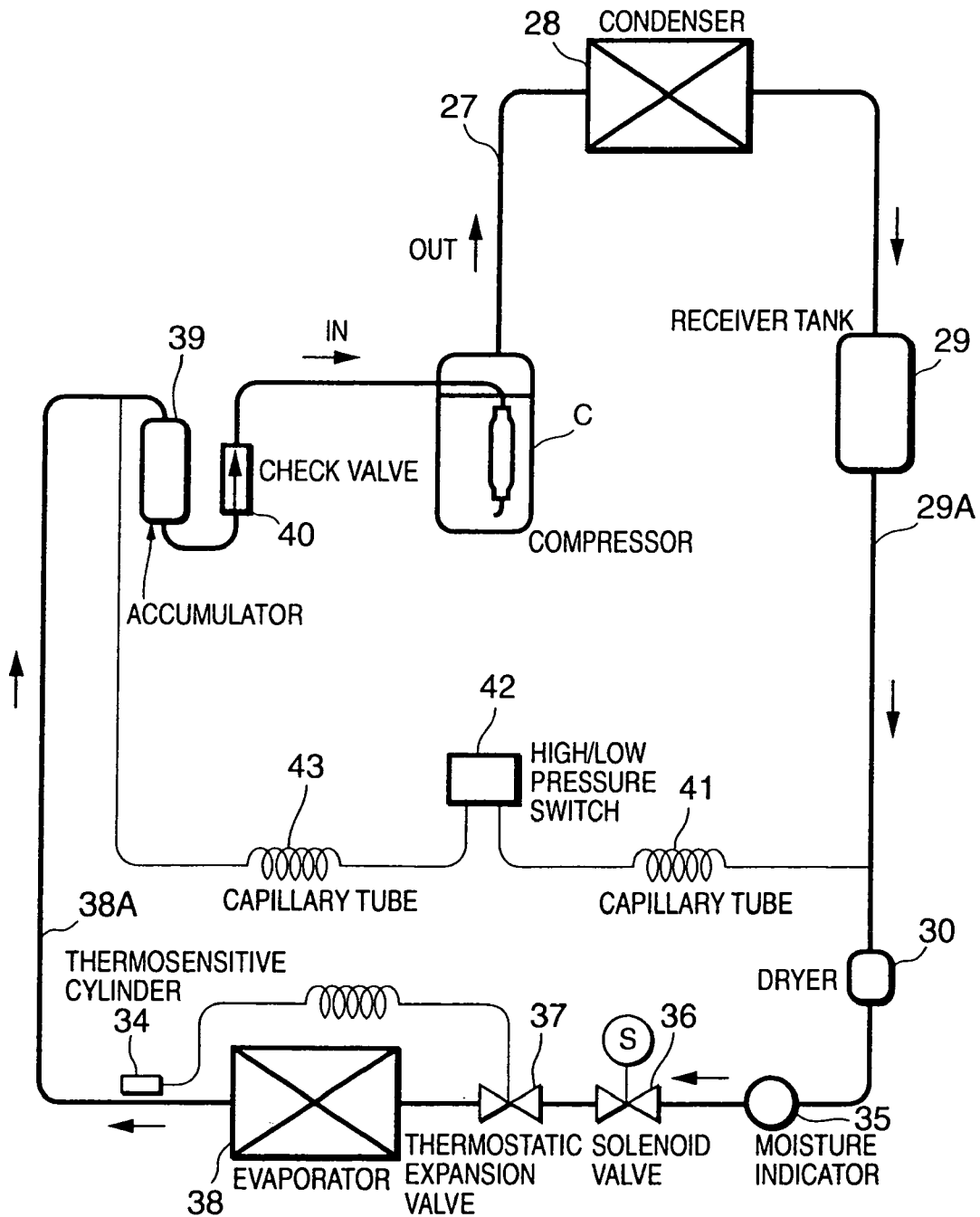
FIG. 8 is a refrigerant circuit diagram of an air conditioner or an electric refrigerator or the like that uses the hermetic electric compressor provided with the synchronous induction motor in accordance with the present invention.

The hermetic electric compressor C provided with the synchronous induction motor 2 set forth above is used in a refrigerant circuit (FIG. 8) of an air conditioner or an electric refrigerator or the like to cool the interior of a room or a refrigerator. More specifically, when the compressor 3 of the hermetic electric compressor C is driven, a refrigerant sealed in the refrigerant circuit is drawn in through a suction pipe 23, compressed by the first rotary cylinder 9 and the second rotary cylinder 10, and discharged into a pipe 27 from a discharge pipe 22. The compressed gas refrigerant discharged into the pipe 27 flows into a condenser 28 where it radiates heat and is condensed into a liquid refrigerant, then flows into a receiver tank 29.

The liquid refrigerant that flows into and temporarily stays in the receiver tank 29 passes from a pipe 29A at the outlet side of the receiver tank 29 to a dryer 30, a moisture indicator 35, a solenoid valve 36, and a thermostatic expansion valve 37 wherein it is throttled. Then, the liquid refrigerant flows into an evaporator 38 where it evaporates. At this time, the refrigerant absorbs heat around it to effect its cooling action. When the refrigerant almost liquefies, the refrigerant runs from a pipe 38A at the outlet side of the evaporator 38 into an accumulator 39 where it undergoes vapor-liquid separation, then it is drawn back into the compressor 3 again through a check valve 40. This refrigerating cycle is repeated.

The liquid refrigerant that has left the receiver tank 29 is branched off from the pipe 29A into a pipe 38A between the evaporator 38 and the accumulator 39 via a capillary tube 41, a high/low pressure switch 42, and a capillary tube 43. The high/low pressure switch 42 detects the pressures of the pipe 29A and the pipe 38A through the capillary tubes 41 and 43. If the pressures of the two pipes 29A and 38A exceeds a predetermined pressure difference or more, resulting in an insufficient amount of the refrigerant drawn into the hermetic electric compressor C, then the liquid refrigerant from the receiver tank 29 is allowed to flow into the compressor 3 for protection. The thermostatic expansion valve 37 automatically adjusts its opening degree on the basis of the temperature detected by a thermosensitive cylinder 34 provided at the outlet end of the evaporator 38.

Figure 9:
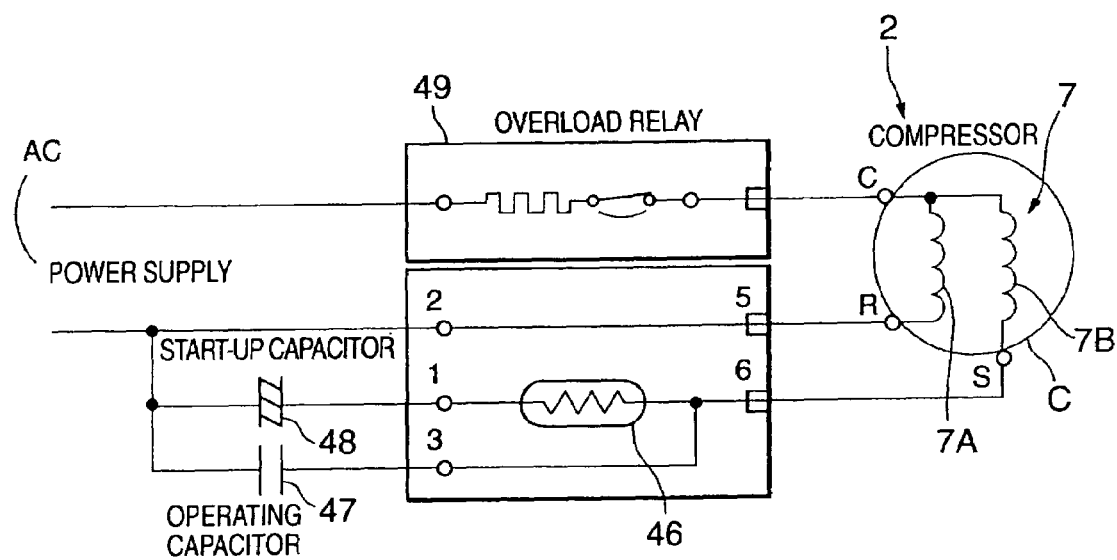
FIG. 9 is an electric circuit diagram of the synchronous induction motor.

FIG. 9 shows an electrical circuit diagram of the synchronous induction motor 2. The synchronous induction motor 2 shown in FIG. 9 that receives power from a single-phase alternating current commercial power source AC is equipped with a primary winding 7A and an auxiliary winding 7B. One end of the primary winding 7A is connected to one end of the single-phase alternating current commercial power source AC, and the other end thereof is connected to the other end of the power source AC. The auxiliary winding 7B connected to one end of the single-phase alternating current commercial power source AC is connected in series to the other end of the power source AC through the intermediary of a PTC 46 and a start-up capacitor 48 and also connected to an operating capacitor 47 in parallel to the PTC 46 and the start-up capacitor 48.

The PTC 46 is formed of a semiconductor device whose resistance value increases in proportion to temperature. The resistance value is low when the synchronous induction motor 2 is started, and increases as current passes therethrough, generating heat. A power switch 49 is constituted by a current-sensitive type line current sensor for detecting line current and an overload relay that serves also as a protective switch used to supply power from the single-phase alternating current commercial power source AC to the stator winding 7 and to cut off the supply of power to the stator winding 7. The operating capacitor 47 is set to have a capacitance suited for steady operation, and the operating capacitor 47 and the start-up capacitor 48 are set to provide capacitances suited for start-up in the state wherein the capacitors 47 and 48 are connected in parallel.

The operation of the synchronous induction motor 2 will now be described. When the power switch 49 is closed, current flows from the single-phase alternating current commercial power source AC to the primary winding 7A and the auxiliary winding 7B. When the synchronous induction motor 2 is started up, the temperature of the PTC 46 is low and the resistance value thereof is also low, so that large current passes through the PTC 46 and large current accordingly passes through the auxiliary winding 7B. The auxiliary winding 7B obtains start-up torque from the current phase difference between itself and the primary winding 7A produced by the operating capacitor 47 and the start-up capacitor 48 connected in parallel, thus causing the synchronous induction motor 2 to start running. This energization causes the PTC 46 to start self-heating, and the resistance value of the PTC 46 increases accordingly until very little current passes through the PTC 46 itself. Thus, the start-up capacitor 48 is isolated, and the synchronous induction motor 2 continues steady operation from the current phase difference between the primary winding 7A and the auxiliary winding 7B by the operating capacitor 47. As the hermetic electric compressor C operates, air conditioning is effected in a room or the interior of a refrigerator is cooled.

As described above, one of the end surface members 67 is secured to the rotor yoke 5A by one of the end rings 69 when the secondary conductors 5B and the two end rings 68 and 69 are formed. The other end surface member 66 is secured to the rotor yoke 5A by the rivets 66A. Hence, it is possible to secure the end surface member 67 to the rotor yoke 5A at the same time when the secondary conductors 5B and the end rings 68 and 69 are die-cast. Thus, after the permanent magnets 31 are inserted into the slots 44, the permanent magnets 31 can be secured to the rotor 5 merely by securing the other end surface member 66 to the rotor yoke 5A by the rivets 66A.

Figure 10:
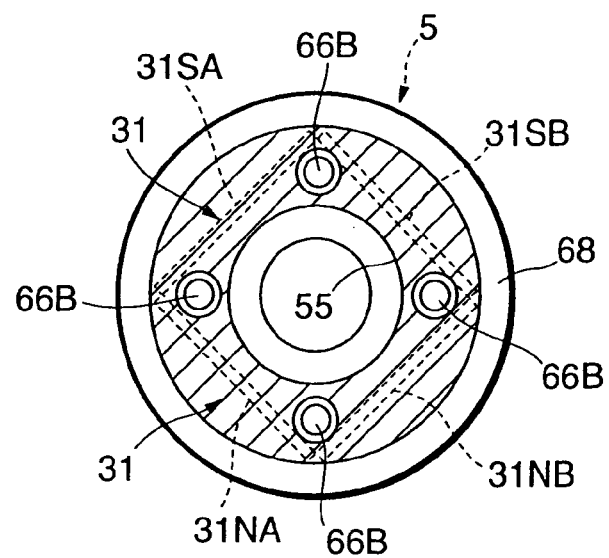
FIG. 10 is a top view of another rotor.
Figure 11:
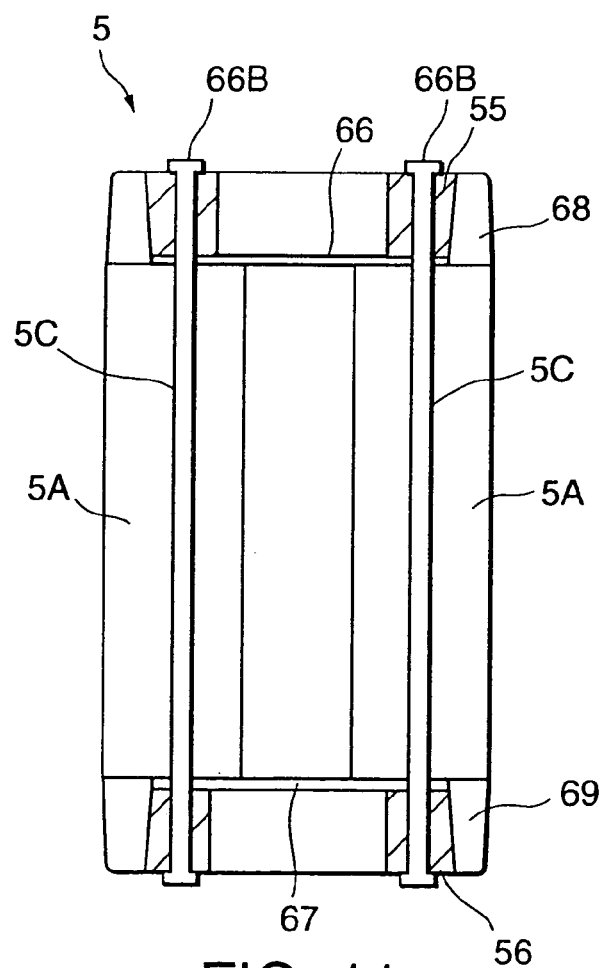
FIG. 11 is a partially longitudinal sectional side view of the rotor shown in FIG. 10.

Another rotor 5 is shown in FIG. 10 and FIG. 11. In this case, nonmagnetic constituents 55 and 56 are disposed in contact with the inner sides of the two end rings 68 and 69, which are integrally die-cast with the squirrel-cage type secondary conductors 5B making up the rotor 5. The nonmagnetic constituents 55 and 56 are made of copper, brass, or the like that allows easy passage of current. The thickness of the nonmagnetic constituents 55 and 56 is set such that, when they are closely attached onto the plate-like end surface members 66 and 67 that close both ends of the permanent magnets 31 embedded in the rotor yoke 5A, they do not jut out beyond the end rings 68 and 69 that are integrally die-cast, protruding from both end surfaces of the rotor yoke 5A.

The nonmagnetic constituents 55 and 56 are riveted at both ends thereof by the rivets 66B in the engaging through holes 5C provided in the rotor yoke 5A. The rivets 66B are fixed at four positions in the inner side of the corners where both ends of the individual permanent magnets 31SA, 31SB and the permanent magnets 31NA, 31NB are in contact, the permanent magnets being disposed substantially into a rectangular shape around the rotating shaft 6. Thus, the non-magnetic constituents 55 and 56 fix the two end surface members 66 and 67 by pressing them against the rotor yoke 5A.

Figure 12:
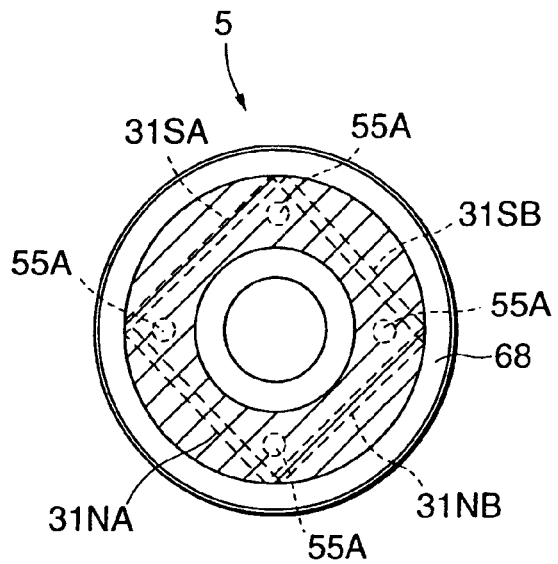
FIG. 12 is a top view of another rotor.
Figure 13:
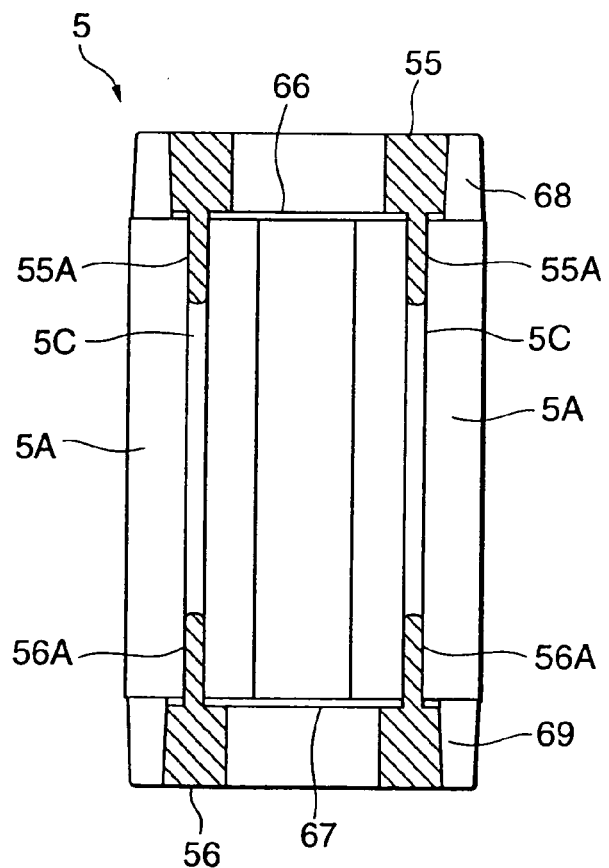
FIG. 13 is a longitudinal sectional side view of the rotor shown in FIG. 12.

FIG. 12 and FIG. 13 show another rotor 5. As in the case of the rotor shown in FIG. 10 and FIG. 11, the nonmagnetic constituents 55 and 56 are disposed in contact with the inner sides of the two end rings 68 and 69, which are integrally die-cast with the squirrel-cage type secondary conductors 5B making up the rotor 5. The nonmagnetic constituents 55 and 56 are made of copper, brass, or the like that allows easy passage of current. The thickness of the nonmagnetic constituents 55 and 56 is set such that, when they are closely attached onto the plate-like end surface members 66 and 67 that close both ends of the permanent magnets 31 embedded in the rotor yoke 5A, they do not jut out beyond the end rings 68 and 69 that are integrally die-cast, protruding from both end surfaces of the rotor yoke 5A.

Engaging pins 55A, 55A having a predetermined diameter and a predetermined length are protuberantly formed on one surface of the nonmagnetic constituent 55. Similarly, engaging pins 56A, 56A having a predetermined diameter and a predetermined length are protuberantly formed on one surface of the nonmagnetic constituent 56. The nonmagnetic constituents 55 and 56 are formed using a cast, and the engaging pins 55A, 55A, 56A, and 56A are integrally formed with the nonmagnetic constituents 55 and 56. The nonmagnetic constituents 55 and 56 are fixed by being press-fitted into the engaging holes 5C provided in the rotor yoke 5A. Thus, the nonmagnetic constituents 55 and 56 secure the two end surface members 66 and 67 by pressing them against the rotor yoke 5A.

As set forth above, the nonmagnetic constituents 55 and 56 are disposed in contact with the inner sides of the two end rings 68 and 69, and the two end surface members 66 and 67 are secured by being pressed against the rotor yoke 5A by the nonmagnetic constituents 55 and 56. Therefore, the sectional areas of the end rings 68 and 69 can be increased by the amount provided by the nonmagnetic constituents 55 and 56 securing the members 66 and 67 by pressing. With this arrangement, the secondary resistance is decreased by the amount equivalent to the increase in the sectional areas of the end rings 68 and 69. Hence, a rise in temperature of the end rings 69 and 69 can be restrained, and the magnetic forces of the magnets can be effectively used, making it possible to significantly improve the running performance of the synchronous induction motor 2.

Figure 14:
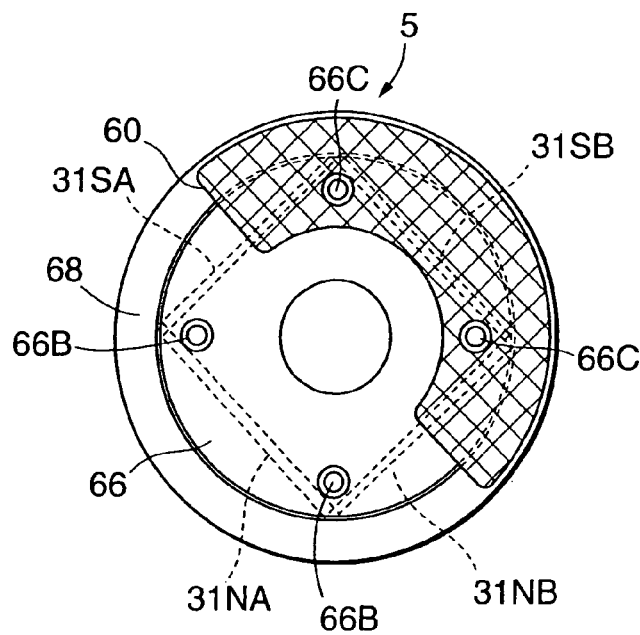
FIG. 14 is a top view of a rotor illustrating an end surface member that is provided inside an end ring and fixed by a balancer.
Figure 15:
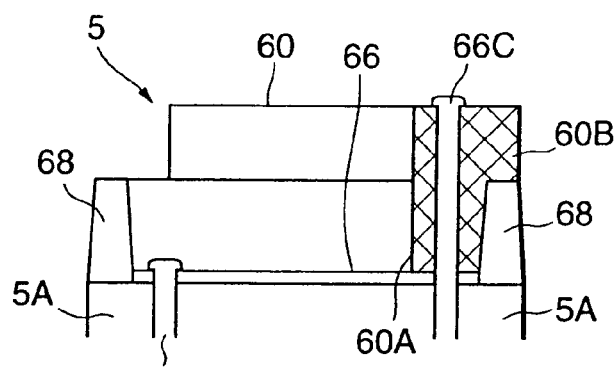
FIG. 15 is a diagram showing a part of the longitudinal sectional side view of the rotor shown in FIG. 12.

The rotor yoke 5A is provided with a balancer 60 for ensuring good rotational balance of the rotor 5 (see FIG. 14 and FIG. 15). The balancer 60 die-cast into a predetermined shape in advance has an end surface fixing portion 60A for fixing the end surface member 66 and a rested portion 60B placed on the end ring 68, the end surface fixing portion 60A and the rested portion 60B forming a step. The balancer 60 is shaped substantially like a semicircle of the rotor yoke 5A. Rivets 66C are located substantially equidistantly from the center of the semicircular balancer 60, and the balancer 60 is secured to the rotor yoke 5A together with the end surface members 66 by the rivets 66C.

Thus, since the balancer 60 is secured to the rotor yoke 5A together with the end surface member 66 by the rivets 66C, the ease of installing the balancer 60 can be dramatically improved. This obviates the need for separately fixing the permanent magnets 31 and the balancer 60, permitting dramatically improved productivity of the synchronous induction motor 2.

Figure 16:
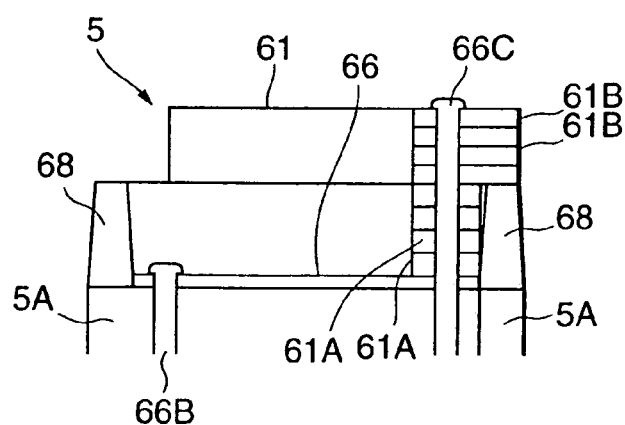
FIG. 16 is a diagram showing a part of the longitudinal sectional side view of a rotor incorporating a balancer formed of a plurality of laminated sheet balancers.

A balancer assembly 61 is shown in FIG. 16. The balancer 61 is constructed of a predetermined number of plate-like balancers 61A and plate-like balancers 61B having substantially the same outer configuration as that of the rested portion 60B. The plate-like balancers 61A are made of metal plates, each plate being made of stainless steel, copper, brass, or the like and having a predetermined thickness and having substantially the same outer configuration as that of the end surface fixing portion 60A of the balancer 60 shown in FIG. 14. A predetermined number of the plate-like balancers 61A and a predetermined number of the plate-like balancers 61B are laminated, and secured to the rotor yoke 5A together with the end surface member 66 by the rivets 66C, thereby making up the balancer assembly 61.

Thus, since the balancer assembly 60 is fixed to the rotor yoke 5A together with the end surface member 66 by the rivets 66A, greater ease of installation of the balancer 60 can be achieved, allowing considerably higher productivity to be achieved. Moreover, since a plurality of the plate-like balancers 61A and 61B are laminated, the weight of the balancer assembly 61 can be easily adjusted. In addition, the cost of the balancer assembly 61 can be significantly reduced by using, for example, inexpensive metal plates for the balancer assembly 61.

Figure 17:
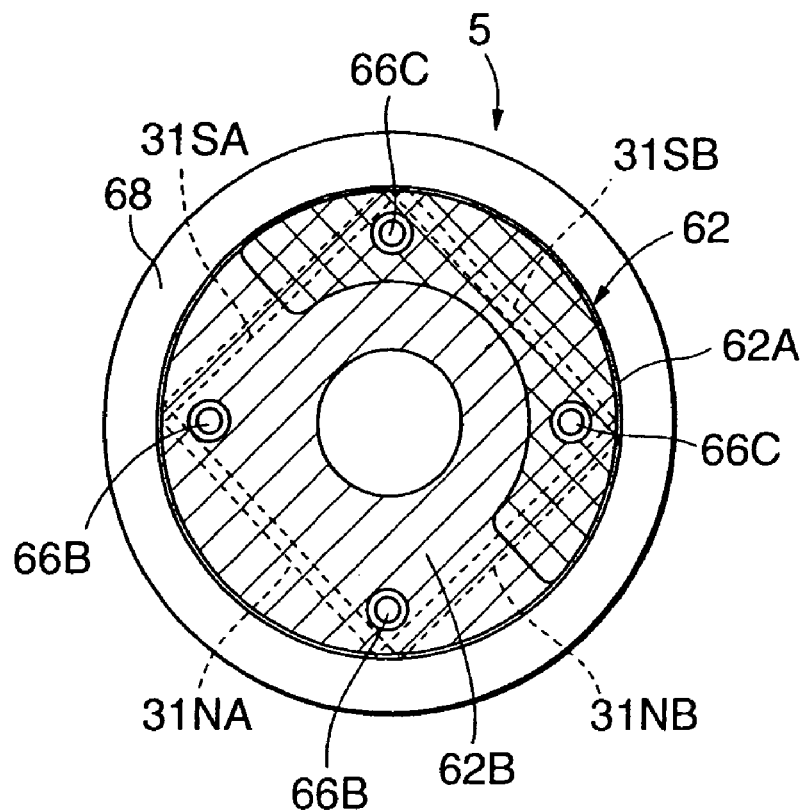
FIG. 17 is a top view of a rotor in which an end surface member and a balancer have been integrally formed and installed.
Figure 18:
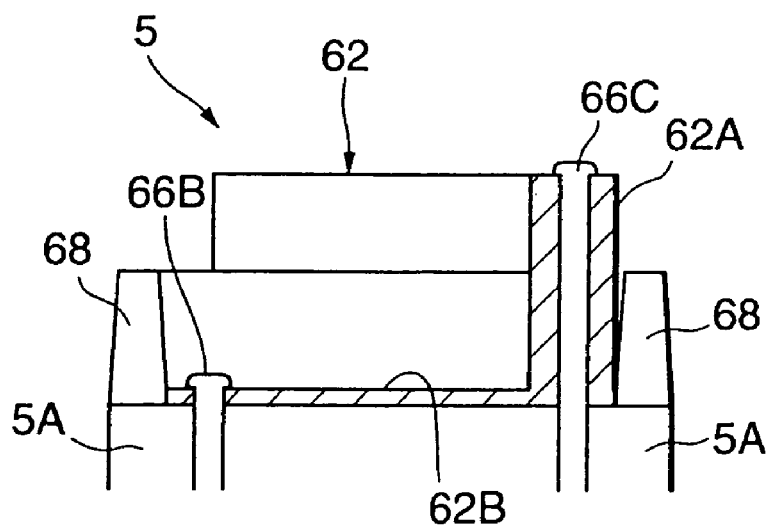
FIG. 18 is a diagram showing a part of the longitudinal sectional side view of the rotor shown in FIG. 17.

FIG. 17 and FIG. 18 show another balancer assembly 62. The balancer assembly 62 is formed of the end surface member 67 and the balancer 60 shown in FIG. 14 combined into one piece. A weight portion 62A corresponding to the balancer 60 and an end surface portion 62B which is formed continuously from the weight 62A and which corresponds to the end surface member 67 are combined into one piece. The balancer assembly 62 is die-cast, or formed by pouring molten copper, brass, or the like into a mold. The end surface portion 62B and the weight portion 62A are secured to the rotor yoke 5A together with the other end surface member 67 by a rivet 66B and a rivet 66C, respectively.

As described above, since the balancer 62 is formed of the end surface member 67 and the balancer 60 combined into one piece, the number of components can be reduced. This allows the installation of the end surface member 67 to be simplified, thus permitting dramatically improved productivity to be achieved.

Figure 19:
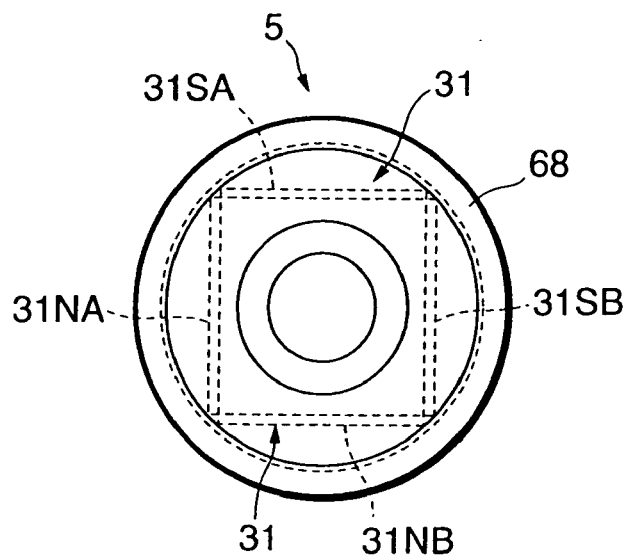
FIG. 19 is a top view of another rotor.
Figure 20:
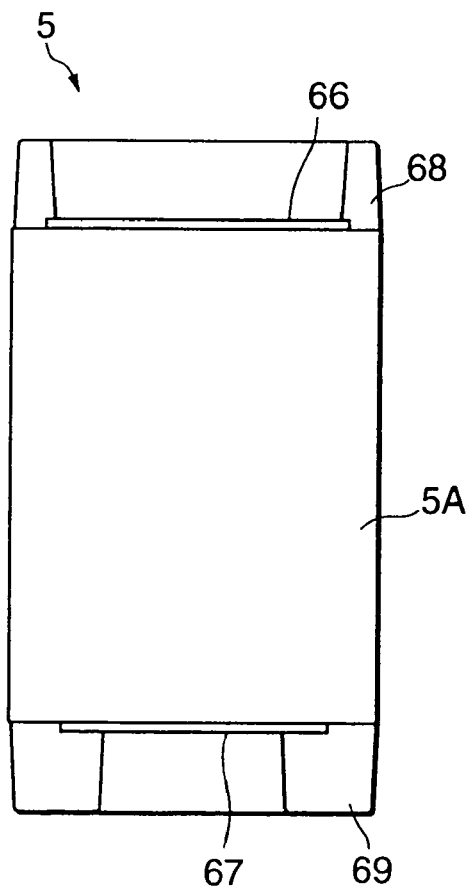
FIG. 20 is a partial longitudinal sectional side view of the rotor shown in FIG. 19.

FIG. 19 and FIG. 20 show another rotor 5. In this case, the rotor yoke 5A constituting the rotor 5 has a plurality of slots 44 (four in this embodiment) that are formed to vertically penetrate the rotor yoke 5A and have their both ends open. The openings of both ends of the slots 44 are closed by a pair of end surface members 66 and 67, as shown in FIG. 19 and FIG. 20. When the squirrel-cage secondary conductors 5B and end rings 68 and 69 are die-cast, the end surface member 67 is integrally secured to the rotor yoke 5A by the end ring 69, and the end surface member 66 is integrally secured to the rotor yoke 5A by the end ring 68.

In this case, with the peripheral portions of the end surface members 66 and 67 slightly extended into the end rings 68 and 69, respectively, the rotor yoke 5A, the end rings 68 and 69, and the end surface members 66 and 67 are die-cast into one piece. This secures the two end surface members 66 and 67 to both ends of the rotor yoke 5A, and also fixes the permanent magnets 31 in the slots 44. The permanent magnets 31 are made of a rare earth type permanent magnet material of, for example, a praseodymium type permanent magnet or a neodymium type permanent magnet with nickel plating or the like provided on the surface thereof so as to produce high magnetic forces. The permanent magnets 31 and 31 are provided such that they oppose the rotating shaft 6, and the opposing permanent magnets 31 and 31 are embedded and magnetized to have opposite poles.

The permanent magnets 31SA and 31SB embedded in one side (e.g., the right side and the upper side in the drawing) from the rotating shaft 6 are polarized with the same south-seeking poles, while the permanent magnets 31NA and 31NB embedded in the other side (e.g., the left side and the lower side in the drawing) are polarized with the same north-seeking poles. More specifically, the permanent magnets 31SA, 31SB and the permanent magnets 31NA, 31NB are disposed to substantially form a rectangular shape around the rotating shaft 6, and are embedded such that they carry two poles, namely, the south pole and the north pole, outward in the circumferential direction of the rotating shaft 6. This enables torque to be applied to the rotor 5 by the magnetic forces of a primary winding 7A and an auxiliary winding 7B, which will be discussed hereinafter. The layout of the permanent magnets 31 shown in FIGS. 19 and 20 is different from the layout of the permanent magnets 31 shown in FIGS. 2, 3, and 4. The layout of the permanent magnets 31 shown in FIGS. 19 and 20 may be replaced by the layout shown in FIGS. 2, 3, and 4. Further alternatively, the permanent magnets 31 shown in FIGS. 2, 3, and 4 may be arranged as shown in FIG. 19 or 20.

Thus, since the two end surface members 66 and 67 are secured to the rotor yoke 5A by the two end rings 68 and 69 when the secondary conductors 5B and the end rings 68 and 69 are formed by die casting, the two end surface members 66 and 67 can be easily secured to the rotor yoke 5A when the secondary conductors 5B and the end rings 68 and 69 are formed by die casting. This arrangement makes it possible to obviate the need of, for example, the cumbersome step for inserting the permanent magnets 31 into the slots 44, then attaching the end surface members 66 and 67 to both ends of the rotor yoke 5A after die-casting the end rings 68 and 69, as in the case of a prior art.

Figure 21:
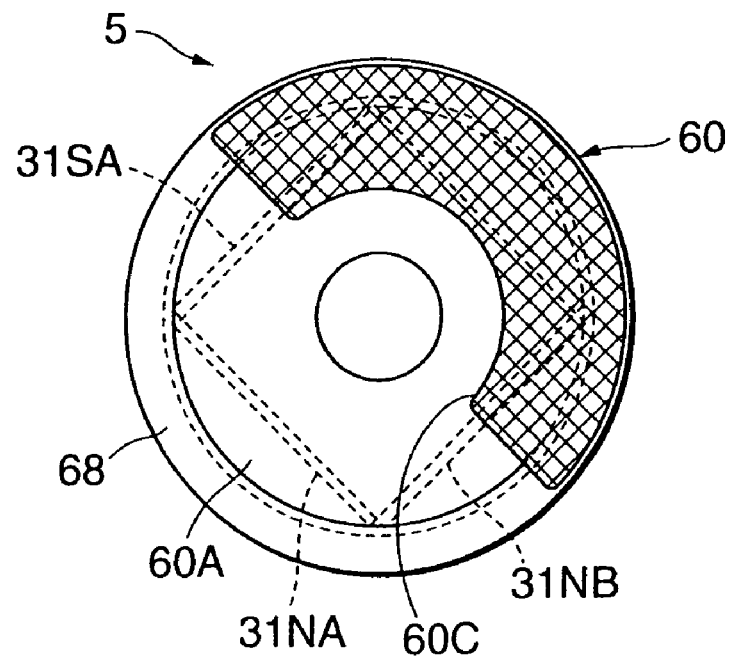
FIG. 21 is a top view of a rotor in which an end surface member is integrally formed with a balancer and fixed to a rotor yoke.
Figure 22:
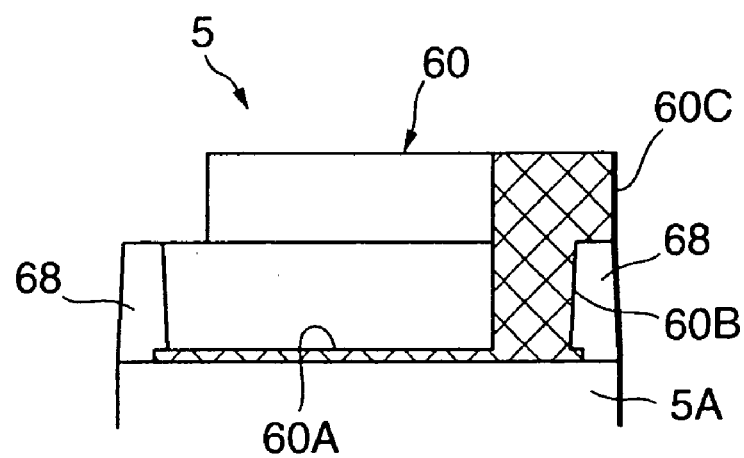
FIG. 22 is a partial longitudinal sectional side view of the rotor shown in FIG. 21.

Another rotor is shown in FIGS. 21 and 22. In this case, a rotor yoke 5A is provided with a balancer 60 for ensuring good rotational balance of the rotor 5. The balancer 60 is integrally formed with an end surface member 66, and is constituted by an end surface plate portion 60A, a weight portion 60C, and a connecting portion 60B that connects the weight portion 60C and the end surface plate portion 60A. The weight portion 60C is formed to have a sufficient size to be rested on an end ring 68, and has a substantially semicircular shape.

The end surface plate portion 60A has substantially the same shape as the end surface member 66. The end surface plate portion 60A and the weight portion 60C are connected by the connecting portion 60B. The end surface plate portion 60A, the weight portion 60C, and the connecting portion 60B are formed into one piece. The balancer 60 is cast by pouring molten copper, brass, or the like into a mold. The connecting portion 60B is positioned on the inner side of the end ring 68, with the periphery of the end surface plate portion 60A slightly extending into the end ring 68. The weight portion 60C is formed on the end ring 68.

The balancer 60 formed as set forth above is secured to the rotor yoke 5A by the end ring 68 when both end surface members 66 and 67, secondary conductors 5B, and the end rings 68 and 69 are die-cast. The end surface member 67 is secured to the rotor yoke 5A by the end ring 69, as previously mentioned. This fixes the permanent magnets 31 in slots 44 of the rotor yoke 5A.

Thus, the balancer 60 and the end surface member 67 are secured to the rotor yoke 5A when the secondary conductors 5B and the two end rings 68 and 69 are die-cast. This makes it possible to obviate the need for a cumbersome step for inserting a plurality of the permanent magnets 31 into the slots 44 after die-casting the secondary conductor 5B and the two end rings 68 and 69, then installing the end surface members 66 and 67 to both ends of the rotor yoke 5A, as in the prior art.

When the permanent magnets are installed in the rotor of a synchronous induction motor, a magnetic field of the permanent magnets inevitably passes through a rotating shaft. Hence, the rotating shaft is magnetized, and there has been a problem in that iron powder or the like adheres to the magnetized rotating shaft, causing the rotating shaft to wear.

In addition, installing the permanent magnets in the rotor causes the rotting shaft and a bearing to be attracted to each other due to the magnetic forces of the permanent magnets, resulting in high friction between the rotating shaft and the bearing. This has also been presenting a problem of wear on the rotating shaft.

Referring now to FIG. 23 through FIG. 37, the descriptions will be given of the configuration that significantly restrains the magnetization of a rotating shaft to which a rotor of a two-pole synchronous induction motor has been attached.

Figure 23:
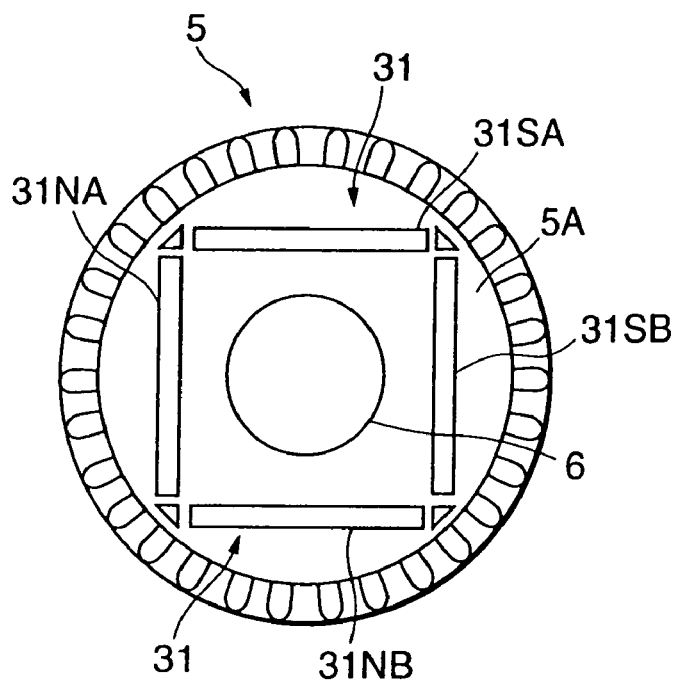
FIG. 23 is a cross sectional top view of another rotor.

In this case, unmagnetized magnet constituents of permanent magnets 31 are inserted in the openings of slots 44, the openings are then closed by an end surface member 66, and the end surface member 66 is riveted to engaging holes 5C provided in the rotor yoke 5A by rivets 66A so as to fix the magnet constituents in the slots 44. Thus, the end surface members 66 and 67 are secured to both ends of the rotor yoke 5A, and the permanent magnets 31 are fixed in the slots 44. The permanent magnets 31 are made of a rare earth type permanent magnet material of, for example, a praseodymium type permanent magnet or a neodymium type permanent magnet with nickel plating or the like provided on the surface thereof so as to produce high magnetic forces. The permanent magnets 31 and 31 are provided such that they oppose the rotating shaft 6, and the opposing permanent magnets 31 and 31 are embedded and magnetized to have opposite poles, as shown in FIG. 23.

The permanent magnets 31SA and 31SB embedded in one side (e.g., the right side and the upper side in the drawing) from the rotating shaft 6 are polarized with the same south-seeking poles, while the permanent magnets 31NA and 31NB embedded in the other side (e.g., the left side and the lower side in the drawing) are polarized with the same north-seeking poles. More specifically, the permanent magnets 31SA, 31SB and the permanent magnets 31NA, 31NB are disposed to substantially form a rectangular shape around the rotating shaft 6, and are embedded such that they carry two poles, namely, the south pole and the north pole, outward in the circumferential direction of the rotating shaft 6. This enables torque to be applied to the rotor 5 by the lines of magnetic force of a primary winding 7A and an auxiliary winding 7B, which will be discussed hereinafter. The layout of the permanent magnets 31 shown in FIG. 23 is different from the layout of the permanent magnets 31 shown in FIGS. 2, 3, and 4. The layout of the permanent magnets 31 shown in FIG. 23 may be replaced by the layout shown in FIGS. 2, 3, and 4. Further alternatively, the permanent magnets 31 shown in FIGS. 2, 3, and 4 may be arranged as shown in FIG. 23.

Figure 24:
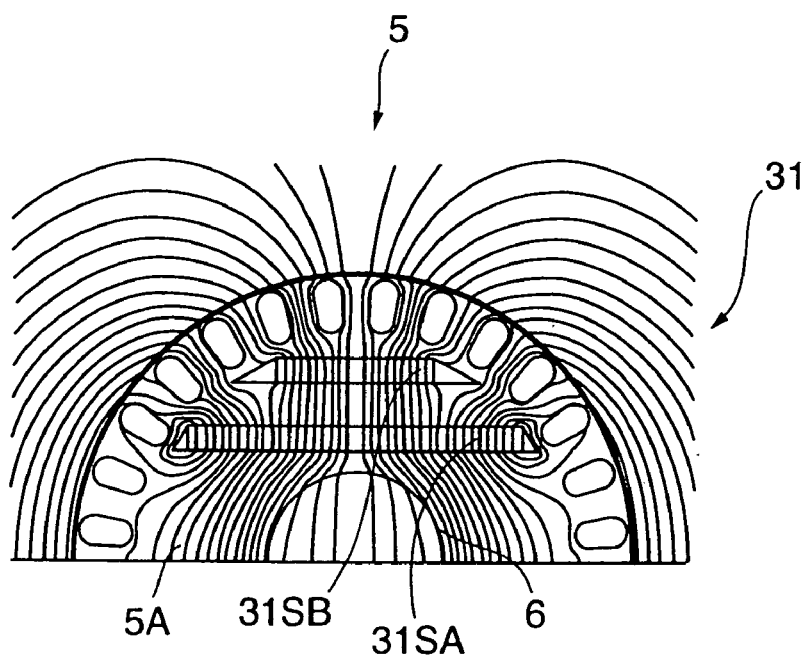
FIG. 24 is an analytical diagram of a magnetic field of a rotor in the layout of the permanent magnet shown in FIG. 4.

FIG. 24 is an analytical diagram of the magnetic field of the rotor 5 shown in FIG. 4. In the rotor 5, a magnetic field in which both permanent magnets 31 and 31 attract each other is formed; however, only the south-pole side of the magnetic field is shown in FIG. 24. As may be seen from FIG. 24 and FIG. 4, The permanent magnets 31 and 31 mounted on the rotor 5 and opposing the rotating shaft 6 are arranged to have opposite magnetic poles from each other against the rotating shaft 6. The magnetic flux of the rotor 5 with this arrangement is $0.294 \times 10^{-2}$ [Wb], although it depends on the magnetic force of the permanent magnets 31 and other conditions.

A lubricant runs between the rotor 5 and the rotating shaft 6, and the rotor yoke 5A in which the permanent magnets 31 have been inserted is formed of a ferromagnetic member. Therefore, most lines of magnetic force (hereinafter referred to as the "magnetic field") of both permanent magnets 31 and 31 pass through the rotor yoke 5A and attract each other. A part of the magnetic field bypasses the rotor yoke 5A and passes through the rotating shaft 6 via a void (including a lubricant). It is already well known that a magnetic member easily passes a magnetic field, while the void, which is not a magnetic member, restrains the passage of the magnetic field; therefore, no further explanation will be given.

Figure 25:
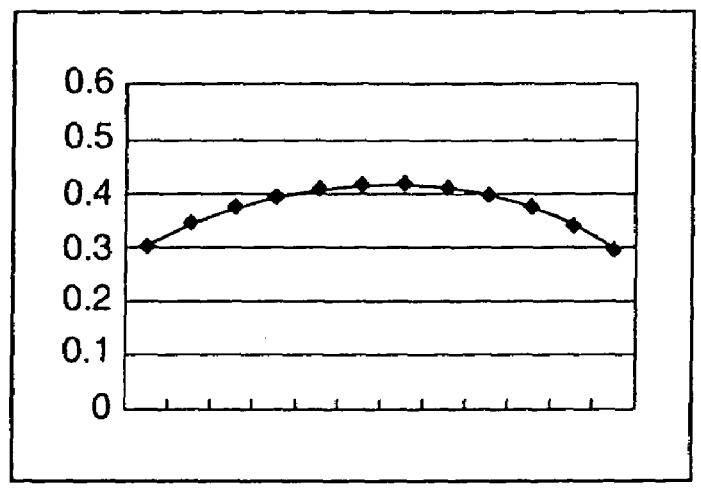
FIG. 25 illustrates a magnetic flux density in a rotating shaft of the rotor shown in FIG. 24.

Measurement results have shown that the magnetic flux density of the rotating shaft 6 ranges from about 0.3 teslas up to about 0.42 teslas, as shown in FIG. 25, although it depends on the magnetic forces of the permanent magnets 31 and other conditions. More specifically, the magnetic field of the permanent magnets 31 that passes through the rotating shaft 6 magnetizes the rotating shaft 6. The different permanent magnets 31 and 31 are laterally disposed in FIG. 4, and the different permanent magnets 31 and 31 are vertically disposed in FIG. 24; however, both are the same permanent magnets. In the drawings, the south magnetic pole of the permanent magnets 31 is shown, and the north magnetic pole has been omitted, because a magnetic field symmetrical to that of the south magnetic pole is produced on the north magnetic pole side.

Figure 26:
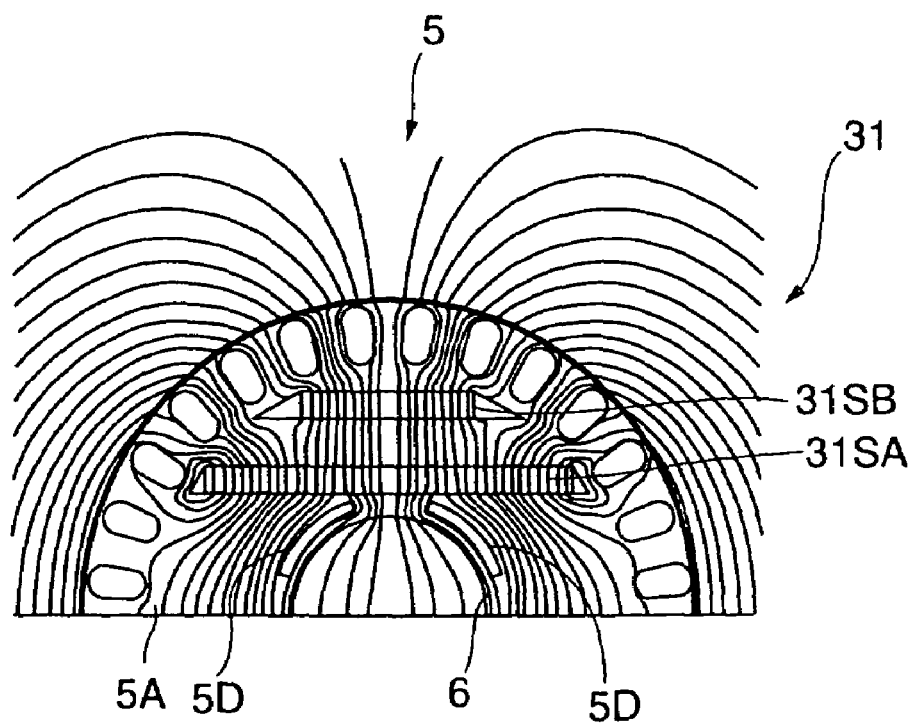
FIG. 26 is an analytical diagram of a magnetic field of a rotor observed when a void is formed in the rotor yoke in the layout of the permanent magnet shown in FIG. 4.

FIG. 26 is an analytical diagram of a magnetic field produced when the rotor 5 of FIG. 24 is provided with voids 5D. The voids 5D are arcuately formed in the rotor yoke 5A around the rotating shaft 6 and formed such that they are spaced away from the rotating shaft 6 by a predetermined distance and they penetrate in the direction in which the rotating shaft 6 extends. The voids 5D are laterally spaced away from each other by a predetermined dimension from a point where the permanent magnet 31 is closest to the rotating shaft 6, and the voids 5D are extended therefrom for a predetermined length and arcuately formed around the rotating shaft 6. More specifically, since a magnetic field is hardly formed in the voids 5D, so that the rotor 5 is provided with the voids 5D to restrain the passage of a magnetic field so as to alter the direction of the magnetic field in the rotor 5. The magnetic flux force of the rotor 5 in this case is $0.294 \times 10^{-2}$ [Wb].

Figure 27:
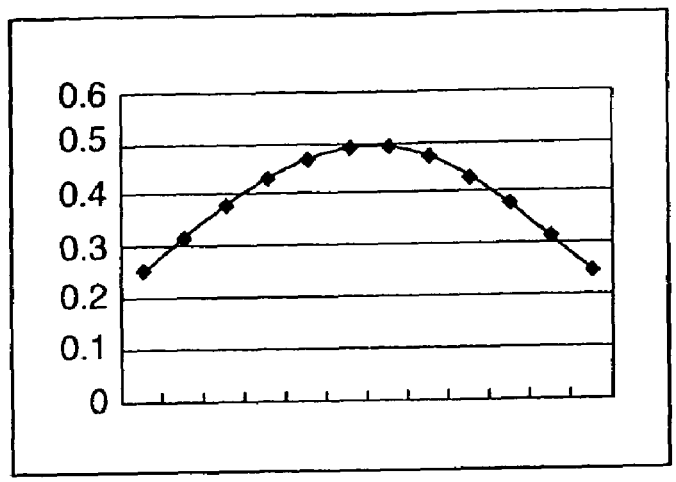
FIG. 27 is a diagram illustrating a magnetic flux density in the rotating shaft of the rotor shown in FIG. 26.

In this case, the voids 5D provided in the rotor yoke 5A are formed around the rotating shaft 6, and the magnetic field is accordingly formed around the rotating shaft 6. However, a part of the magnetic field of the two permanent magnets 31 and 31 passes between the two voids 5D and enter the rotating shaft 6. The magnetic flux density of the rotating shaft 6 ranges from about 0.25 teslas up to about 0.49 teslas, as shown in FIG. 27. In other words, since the magnetic field of the permanent magnets 31 undesirably passes between the void 5D and the void 5D spaced away from each other by the predetermined dimension, the rotating shaft 6 located therebetween is magnetized.

Figure 28:
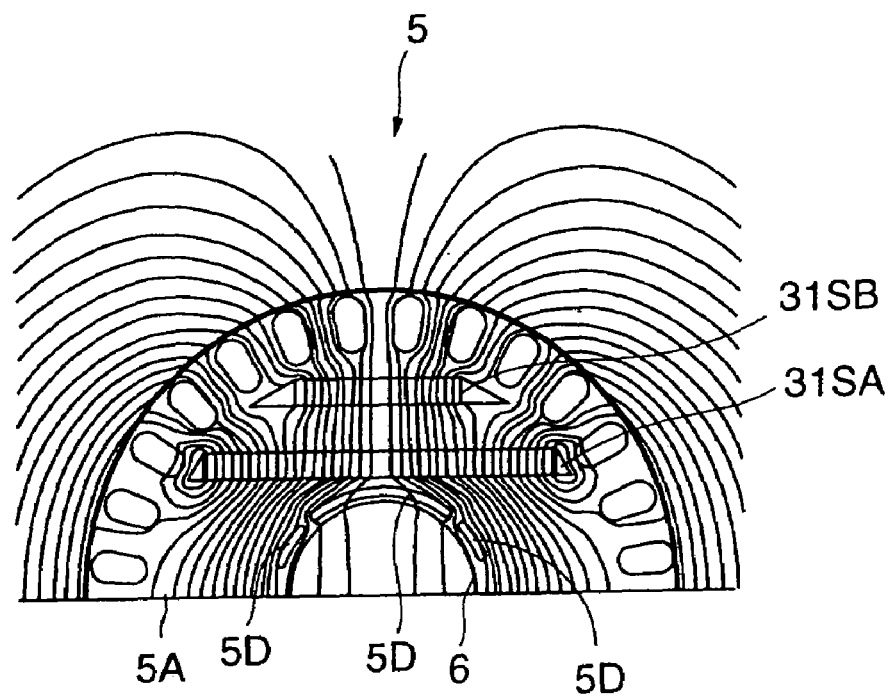
FIG. 28 is an analytical diagram of the magnetic field of the rotor observed when a plurality of voids is formed in the rotor yoke in the layout of the permanent magnet shown in FIG. 4.

FIG. 28 is an analytical diagram of a magnetic field produced when the rotor 5 is provided with a plurality of voids 5D at positions different from those of the voids 5D shown in FIG. 26. A void 5D is arcuately formed in the rotor yoke 5A around the rotating shaft 6 and formed such that they are spaced away from the rotating shaft 6 by a predetermined distance and it penetrates in the direction in which the rotating shaft 6 extends, as mentioned above. The void 5D is laterally and arcuately formed for a predetermined dimension from a point where the permanent magnet 31 is closest to the rotating shaft 6. In addition, arcuate voids 5D are further formed around the rotating shaft 6, with predetermined dimensions allowed from both ends of the void 5D. In other words, the void 5D having a predetermined width is provided at the central portion where the permanent magnets 31 and 31 provided in the rotor 5 attract each other so as to reduce the magnetic field passing through the rotor 5, thereby altering the direction of the magnetic field in the rotor 5. The magnetic flux of the rotor 5 in this case is $0.288 \times 10^{-2}$ [Wb].

Figure 29:
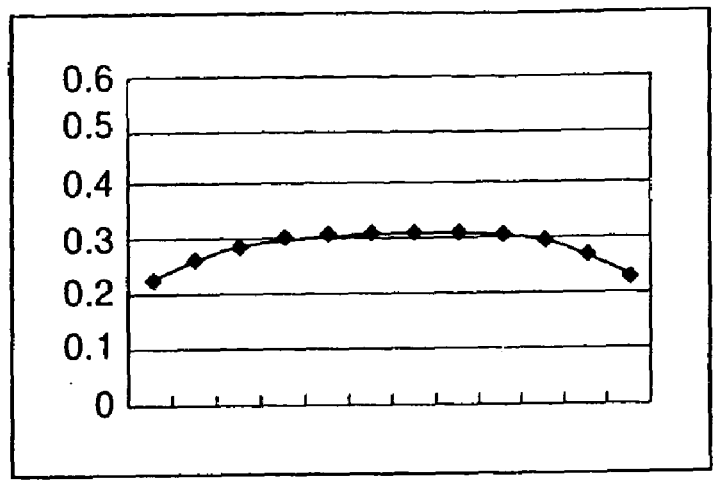
FIG. 29 is a diagram illustrating a magnetic flux density in the rotating shaft of the rotor shown in FIG. 28.

In this case also, the voids 5D provided in the rotor yoke 5A are formed around the rotating shaft 6; however, the one of the voids 5D laterally extends by a predetermined dimension from the point where the permanent magnet 31 is closest to the rotating shaft 6, and the magnetic field reduces when it passes through the void 5D. Actually, however, the magnetic field bypasses the voids 5D, as illustrated. In this case, the magnetic field formed by the permanent magnets 31 and 31 bypasses the rotating shaft 6 because of the voids 5D. The magnetic flux density of the rotating shaft 6 ranges from about 0.23 teslas up to about 0.32 teslas, as shown in FIG. 29. In other words, since the magnetic field of the permanent magnets 31 avoids passing through the voids 5D, the rotating shaft 6 is hardly magnetized.

Figure 30:
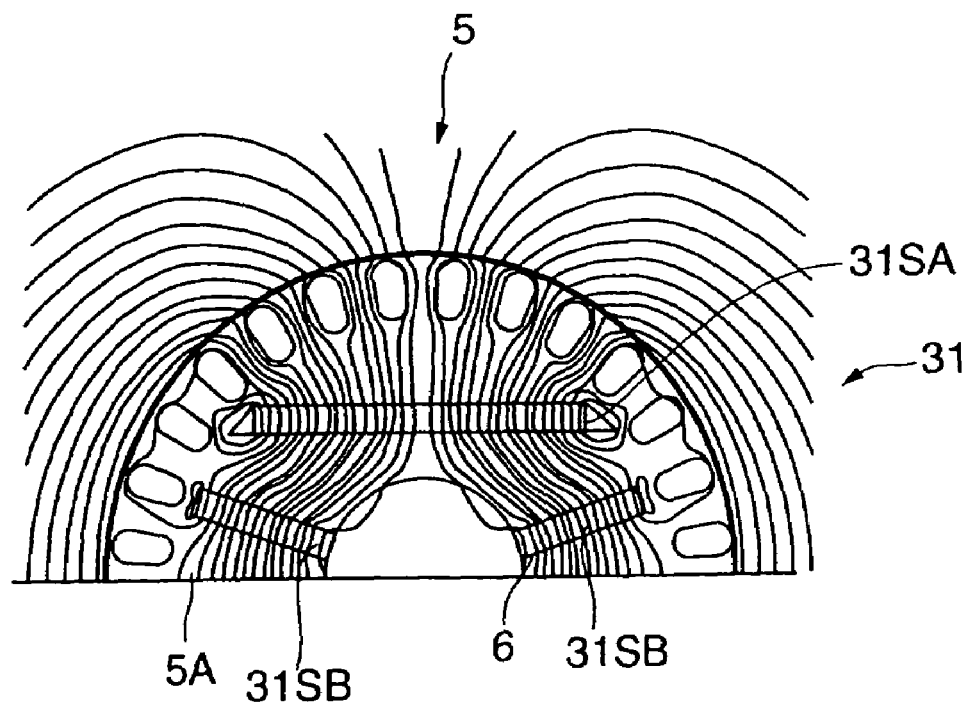
FIG. 30 is an analytical diagram of the magnetic field of a rotor configured such that a magnetic field produced by a permanent magnet bypasses a rotating shaft.

FIG. 30 is an analytical diagram showing a magnetic field of the rotor 5 when the permanent magnets 31 are disposed at different positions. In this case, permanent magnets 31SB are provided between two permanent magnets 31SA (one of the permanent magnets 31SA is not shown) that oppose the rotating shaft 6. The permanent magnets 31SB and 31SB are disposed such that they are inclined with respect to the center of the permanent magnet 31SA provided on the outer side of the rotor 5. In other words, the permanent magnets 31SB are inclined in the direction such that the flow of the magnetic field of the permanent magnet 31SA moves away from the rotating shaft 6. This means that the permanent magnets 31SB and 31SB for drawing in the magnetic field produced by the permanent magnet 31SA are disposed on both sides of the line that passes the permanent magnets 31SA and the rotating shaft 6.

Figure 31:
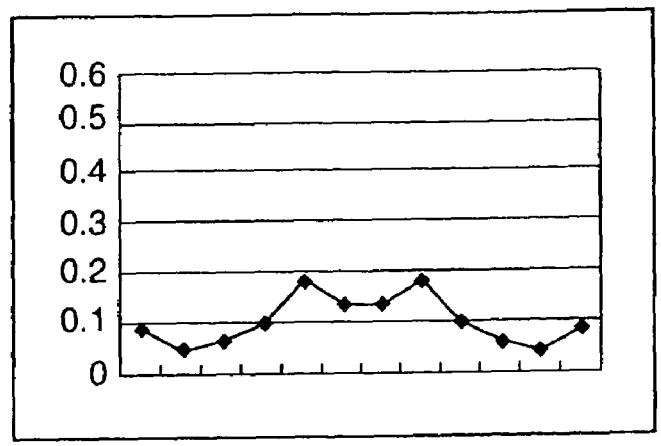
FIG. 31 is a diagram illustrating a magnetic flux density in the rotating shaft of the rotor shown in FIG. 28.

Thus, the flow of the magnetic field of the permanent magnets 31SA is directed toward the permanent magnets 31SB. In other words, the permanent magnets 31SA and the permanent magnets 31SB are disposed to attract each other thereby to change the direction of the magnetic field in the rotor 5 so as to cause the magnetic field to pass through the rotor yoke 5A excluding the rotating shaft 6. The magnetic flux of the rotor 5 in this case is $0.264 \times 10^{-2}$ [Wb]. In this case, the magnetic field produced by the two permanent magnets 31SA is formed such that it bypasses the rotating shaft 6 due to the presence of the permanent magnets 31SB. The magnetic flux density of the rotating shaft 6 ranges from about 0.03 teslas up to about 0.18 teslas, as shown in FIG. 31. In other words, the magnetic field of the permanent magnets 31 avoids passing through the rotating shaft 6, so that the rotating shaft 6 is hardly magnetized.

Based on the analytical results of the magnetic field of the rotor 5, the one shown in FIG. 30 wherein the permanent magnets 31SB are differently disposed with respect to the permanent magnet 31SA is most effective for restraining the magnetization of the rotating shaft 6. This layout of the permanent magnets, however, is not necessarily fully satisfactory. In comparison, it has been proven that the rotor 5 shown in FIG. 28 in which the voids 5D are provided such that they block the magnetic field between the two permanent magnets 31 and 31, facing against the rotating shaft 6, provides the greatest magnetic force without causing the rotating shaft 6 to be magnetized. This means that the experiment results have shown that providing the rotor yoke 5A with the voids 5D shown in FIG. 28 makes it possible to prevent iron powder from adhering to the rotating shaft 6 and restrain the degradation in the performance of the synchronous induction motor 2. Regarding the voids 5D, only the void 5D provided at the center between the two permanent magnets 31 and 31 may be provided.

Figure 32:
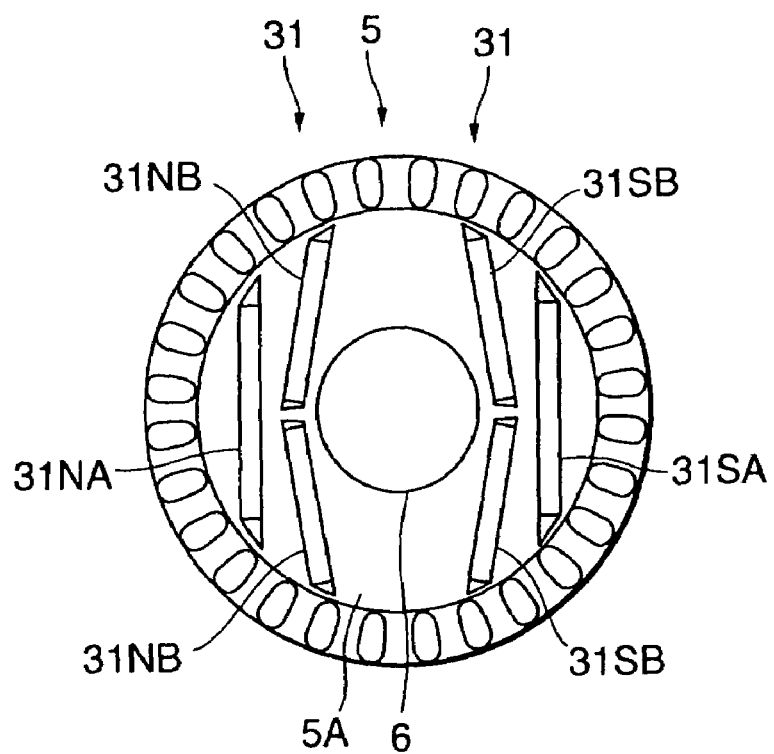
FIG. 32 is a cross sectional top view of a rotor illustrating another layout example of a permanent magnet.
Figure 33:
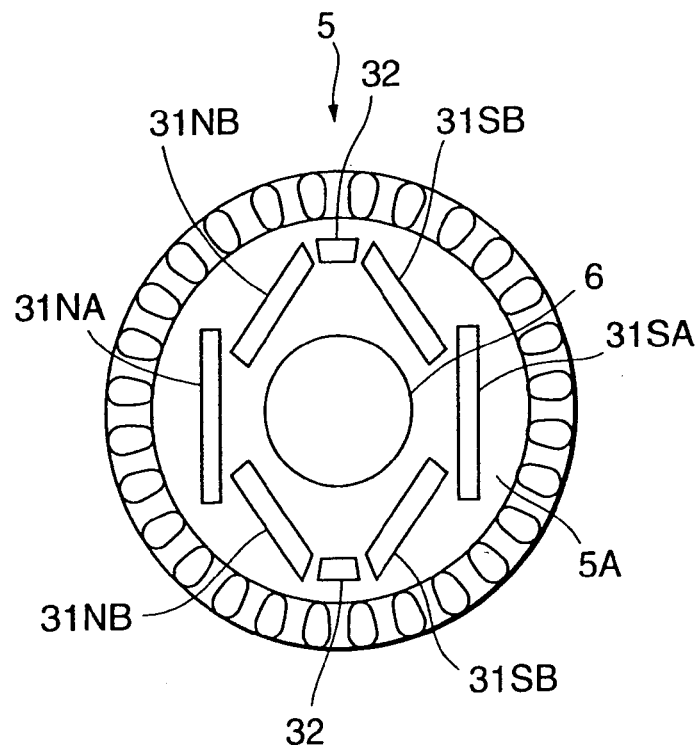
FIG. 33 is a cross sectional top view of a rotor illustrating yet another layout example of a permanent magnet.

Examples of the layout of the two-pole permanent magnets 31 are given by the rotors 5 shown in FIG. 32 through FIG. 37. Referring to FIG. 32, permanent magnets 31SB, 31SB and permanent magnets 31NB, 31NB are disposed on the right and left sides of the rotating shaft 6 of the rotor yoke 5A such that they oppose each other. These permanent magnets 31SB, 31SB and the permanent magnets 31NB, 31NB are laid out in "V" shapes such that they face toward the center of the rotating shaft 6. On the outer sides of these permanent magnets 31 (on the sides away from the rotating shaft 6), a pair of permanent magnets 31 are disposed, opposing each other, to have two poles, the one on the right side of the rotating shaft 6 carrying the south pole and the one on the left side thereof carrying the north pole. Referring to FIG. 33, permanent magnets 31SB, 31SB and permanent magnets 31NB, 31NB are further disposed in the rotor 5 of FIG. 32 such that they are inclined toward the rotating shaft 6. The permanent magnets provide two poles, the ones on the right side of the rotating shaft 6 carrying the south pole, while the ones on the left side thereof carrying the north pole.

Figure 34:
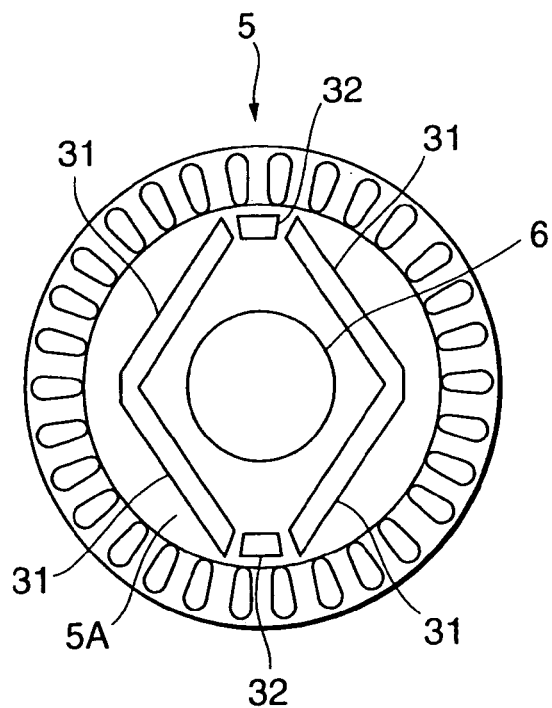
FIG. 34 is a cross sectional top view of a rotor illustrating still another layout example of a permanent magnet.

Referring now to FIG. 34, two permanent magnets 31 are disposed in the rotor yoke 5A substantially in "V" shapes such that they substantially form a diamond shape, laterally opposing each other, sandwiching the rotating shaft 6. The permanent magnet on the right side of the rotating shaft 6 carries the south pole, while the permanent magnet on the left side thereof carries the north pole. In other words, in the rotors 5 having the permanent magnets 31 laid out as shown in FIG. 32 through FIG. 34, the magnetization of the rotating shaft 6 caused by the magnetic forces of the permanent magnets 31 can be restrained by forming the voids 5D, which is shown in FIG. 28, in the rotor yoke 5A as described above, the voids being located at the central portion where the opposing permanent magnets 31 and 31 attract each other.

Figure 35:
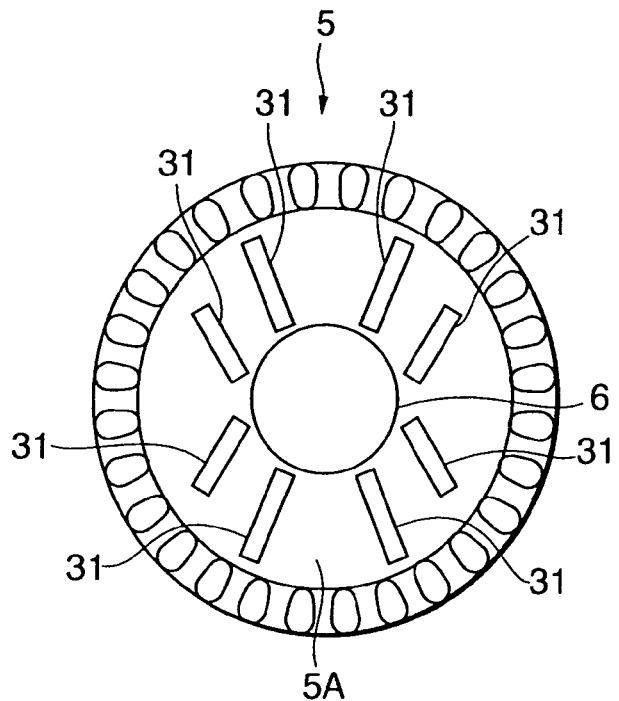
FIG. 35 is a cross sectional top view of a rotor illustrating a further layout example of a permanent magnet.
Figure 36:
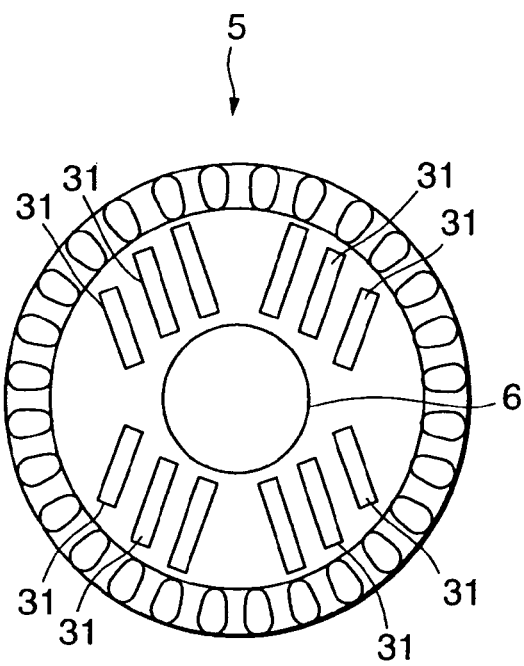
FIG. 36 is a cross sectional top view of a rotor illustrating another layout example of a permanent magnet.

Referring to FIG. 35, the rotor yoke 5A is provided with eight permanent magnets 31. The permanent magnets 31 are disposed roughly radially, as observed from the rotating shaft 6. More specifically, the permanent magnets 31 are arranged in an approximate radial pattern in two rows on each side with predetermined intervals provided among the permanent magnets and with a predetermined space laterally provided between the rows on the right side and the left side such that they oppose each other, sandwiching the rotating shaft 6. The permanent magnets carry two poles, the ones on the right side of the rotating shaft 6 carrying the south pole, while the ones on the left side thereof carrying the north pole. In FIG. 36, the permanent magnets 31 are arranged in an approximate radial pattern in three rows on each side with a predetermined interval laterally provided between the rows. The permanent magnets carry two poles, the ones on the right side of the rotating shaft 6 carrying the south pole, while the ones on the left side thereof carrying the north pole. In other words, in the rotors 5 shown in FIG. 35 and FIG. 36, the permanent magnets 31 are radially arranged substantially around the rotating shaft 6, so that the magnetic field is directed away from the rotating shaft 6, as illustrated in FIG. 30. Thus, the magnetic field of the two permanent magnets 31 and 31 disposed to oppose the rotating shaft 6 bypasses the rotating shaft 6; therefore, the rotating shaft 6 will not be magnetized.

Figure 37:
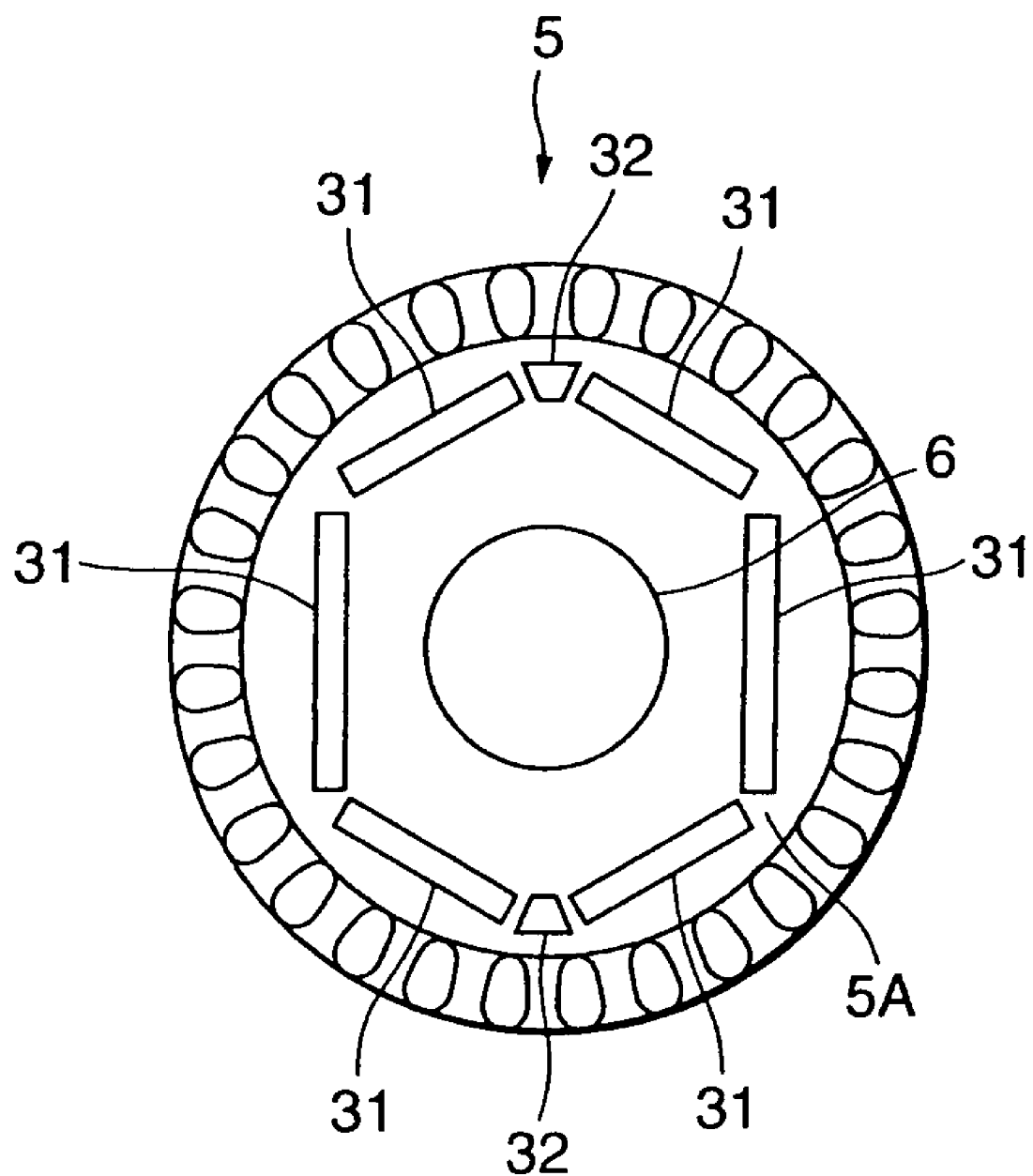
FIG. 37 is a cross sectional top view of a rotor illustrating another layout example of a permanent magnet.

Referring to FIG. 37, the rotor yoke 5A is provided with six permanent magnets 31. These permanent magnets 31 are laid out in a substantially hexagonal shape around the rotating shaft 6. The permanent magnets 31 have two poles, the ones on the right side of the rotating shaft 6 carrying the south pole, while the ones on the left side carrying the north pole. By forming the void 5D shown in FIG. 28 in the rotor yoke 5A mentioned above at the central portion where the opposing permanent magnets 31 attract each other, it is possible to further restrain the rotating shaft 6 from being magnetized by the magnetic forces of the permanent magnets 31. More specifically, in the rotor 5 provided with the permanent magnets 31 disposed as shown in FIG. 37, the voids 5D provided in the rotor 5 shown in FIG. 26 cause the magnetic fields of the two opposing permanent magnets 31 to pass the rotor yoke 5A, bypassing the voids 5D. As a result, the magnetic fields do not pass the rotating shaft 6, so that the rotating shaft 6 is hardly magnetized. Voids 32 shown in FIGS. 33, 34, and 37 intercept the magnetic field formed between the permanent magnets 31 on the south pole side and the permanent magnets 31 on the north pole side. The voids 32, however, are dispensable.

As described above, the voids 5D are formed at the central portion of the rotor yoke 5A where the permanent magnets 31 and 31, which oppose each other with the rotating shaft 6 sandwiched therebetween and attract each other, and the permanent magnets 31 are arranged such that the magnetic field does not pass through the rotating shaft 6 or the magnetic field bypasses the rotating shaft 6. With this arrangement, it is possible to restrain the rotating shaft 6 from being magnetized. This makes it possible to prevent inconveniences in which iron powder or the like adheres to the rotating shaft 6 or the rotating shaft 6 and the bearings 17 and 18 wear out due to friction caused by the magnetic forces of the permanent magnets 31.

In general, the permanent magnets used with synchronous induction motors are magnetized in advance at a different place, then installed in rotors. For this reason, when inserting the magnetized permanent magnets in rotors, the permanent magnets attract each other, leading to poor workability. Furthermore, when inserting a rotor in a stator, the rotor is attracted to a surrounding surface, posing the problem of degraded assemblability of a synchronous induction motor.

In addition, since the permanent magnets are incorporated in a rotor, the workability in installing the rotor in a stator is degraded, resulting in assembly failure.

Referring now to FIG. 38 through FIG. 46, the descriptions will be given to the structure of a synchronous induction motor that allows permanent magnets to be inserted in a rotor without the magnetic attraction problem of the permanent magnets, and that also features dramatically improved workability of installation. The descriptions will also be given of a manufacturing method for the synchronous induction motor.

Figure 38:
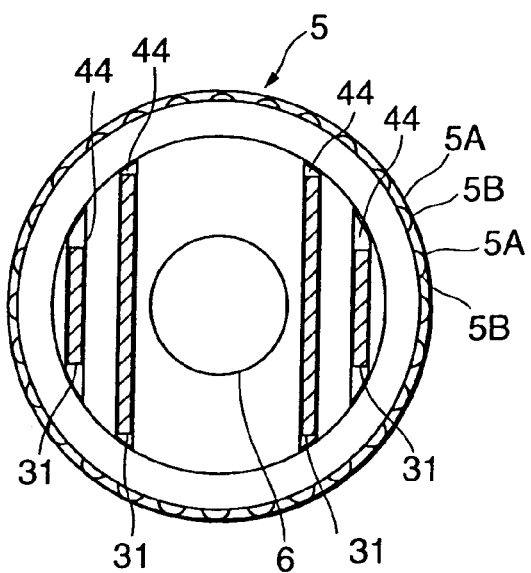
FIG. 38 is a partially cutaway cross sectional top view of another rotor.
Figure 39:
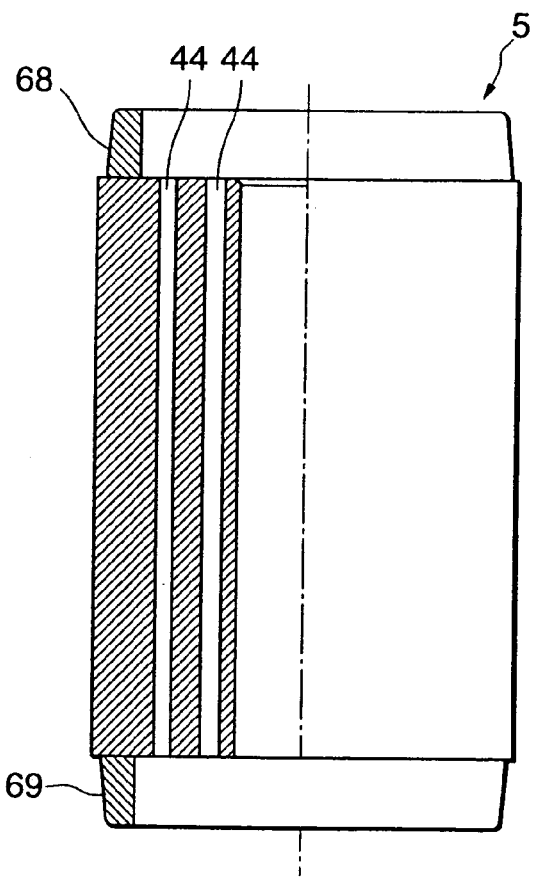
FIG. 39 is a partial longitudinal sectional side view of the rotor shown in FIG. 38.

The rotor 5 in this case is constructed of a rotor yoke 5A, die-cast squirrel-cage secondary conductors 5B positioned around the rotor yoke 5A, a die-cast end ring 69 which is positioned on the peripheral portion of an end surface of the rotor yoke 5A, annularly protrudes by a predetermined dimension, and integrally die-cast with the squirrel-cage secondary conductors 5B, and permanent magnets 31 embedded in the rotor yoke 5A. The permanent magnets 31 are magnetized after permanent magnet materials are inserted in slots 44, which will be discussed hereinafter. The permanent magnets 31 (31SA and 31SB) embedded in one side (e.g., the right side in the drawing) from the rotating shaft 6 are polarized with the same south pole, while the permanent magnets 31 (31NA and 31NB) embedded in the other side (e.g., the left side in the drawing) are polarized with the same north pole, as shown in FIG. 38 and FIG. 39.

The plurality of squirrel-cage secondary conductors 5B are provided on the peripheral portion of the rotor yoke 5A and have aluminum diecast members injection-molded in cylindrical holes (not shown) formed in the cage in the direction in which the rotating shaft 6 extends, as described previously. The squirrel-cage secondary conductors 5B are formed in a so-called skew pattern in which they are spirally inclined at a predetermined angle in the circumferential direction of the rotating shaft 6 from one end toward the other end, as illustrated in FIG. 5.

The rotor yoke 5A has a plurality of slots 44 (four in this embodiment) vertically formed with both ends open. The openings at both ends of the slots 44 are closed by a pair of the end surface members 66 and 67, respectively, as shown in FIG. 7. When the squirrel-cage secondary conductors 5B and the end rings 68 and 69 are die-cast, the end surface member 67 is fixed to the rotor yoke 5A by the end ring 69. The end surface member 66 is secured to the rotor yoke 5A by a plurality of rivets 66A functioning as fixtures.

In this case, after the unmagnetized magnet constituents of the permanent magnets 31 are inserted through the openings of the slots 44, the openings are closed by the end surface member 66, and the end surface member 66 is fixed by riveting into engaging holes 5C provided in the rotor yoke 5A by using the rivets 66A. This secures the magnet constituents in the slots 44. The magnet constituents are formed of a rare earth type permanent magnet material of, for example, a praseodymium type permanent magnet or a neodymium type permanent magnet with nickel plating or the like provided on the surface thereof, or a ferrite material, that is capable of exhibiting high magnet characteristics even in a low magnetizing magnetic field. In this case, the demagnetization during operation can be restrained by using, for example, a ferrite magnet or a rare earth type magnet (the coercive force at normal temperature being 1350 to 2150 kA/m and the coercive force temperature coefficient being −0.7%/° C. or less).

If an unmagnetized magnet constituent is inserted in a rotor, and a stator winding is energized to magnetize the magnet constituent, the stator winding may be deformed by the electromagnetic force produced at the magnetization. For this reason, the stator winding 7 is coated with varnish or a sticking agent that fuses when heated. The varnish or the sticking agent that fuses when heated securely prevents the deformation of a winding end of the stator winding 7 and the degradation of the coating of the winding caused by heat if the stator winding 7 becomes hot from the heat generated by itself when the magnet constituent is magnetized.

There is another problem in that the quality of a synchronous induction motor is deteriorated. To solve the problem, a predetermined voltage and a predetermined current are supplied to one phase or two phases of the stator winding so as to magnetize the unmagnetized magnet constituents fixed in the slots 44 provided in the rotor yoke 5A. This permits better magnetizing performance than that obtained by energizing the primary winding 7A and the auxiliary winding 7B at the same time. Hence, the unmagnetized magnet constituents can be intensely magnetized.

Figure 40:
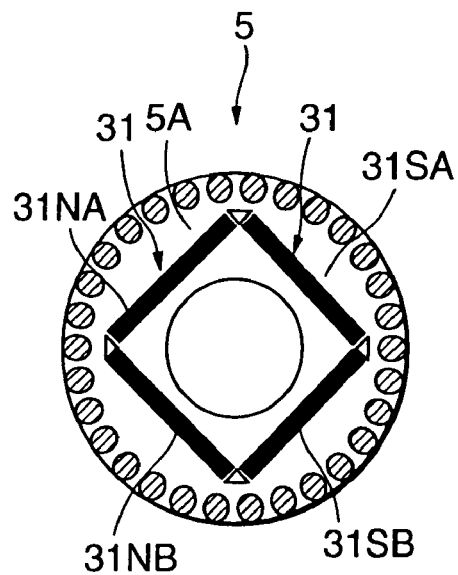
FIG. 40 is a cross sectional top view of the rotor shown in FIG. 38.

The rotor 5 is provided with four permanent magnets 31 and 31 formed of the magnetized magnet constituents that oppose the rotating shaft 6. The opposing permanent magnets 31 and 31 are disposed with opposite magnetic poles, as shown in FIG. 40. Permanent magnets 31SA and 31SB embedded in one side of the rotating shaft 6 (e.g., upper and lower on the right side in the drawing) from the rotating shaft 6 are polarized with the same south pole, while the permanent magnets 31NA and 31NB embedded in the other side (e.g. upper and lower on the left side in the drawing) are polarized with the same north pole.

More specifically, the permanent magnets 31SA, 31SB and the permanent magnets 31NA, 31NB are disposed to substantially form a rectangular shape around the rotating shaft 6, and are embedded such that they carry two poles, namely, the south pole and the north pole, outward in the circumferential direction of the rotating shaft 6. This enables torque to be applied to the rotor 5 by the magnetic forces of a primary winding 7A and an auxiliary winding 7B, which will be discussed hereinafter. The layout of the permanent magnets 31 shown in FIG. 40 is different from the layout of the permanent magnets 31 shown in FIG. 38; however, the layout of the permanent magnets 31 shown in FIG. 40 may be replaced by the layout shown in FIG. 38. In this case, however, the riveting positions of the rivets 66A have to be changed. Further alternatively, the permanent magnets 31 shown in FIG. 38 may be arranged as shown in FIG. 40.

Thus, after the magnet constituents of the permanent magnets 31 are embedded in the rotor yoke 5A, the magnet constituents are magnetized by current passed through the stator winding 7. Hence, when the rotor 5 is inserted in the stator 4, a problem can be solved in which the permanent magnets 31 inserted in the stator 4 cause magnetic attraction to the surrounding. This arrangement makes it possible to prevent inconvenience of lower productivity of the synchronous induction motor 2, thus permitting improved assemblability of the synchronous induction motor 2.

Figure 41:
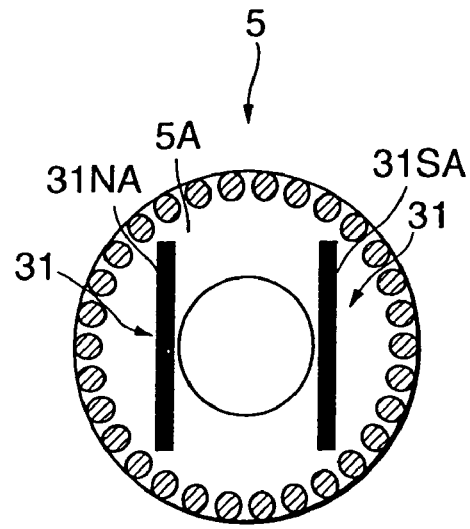
FIG. 41 is a cross sectional top view of another rotor.

Another rotor 5 is shown in FIG. 41. In this case, the rotor yoke 5A has two magnet constituents embedded therein. The two plate-like magnet constituents are arranged in parallel to each other, sandwiching the rotating shaft 6 and embedded in slots 44 vertically formed in the rotor yoke 5A so that they penetrate the rotor yoke 5A. The magnet constituents are formed of a rare earth type or ferrite material, as mentioned above.

Figure 46:
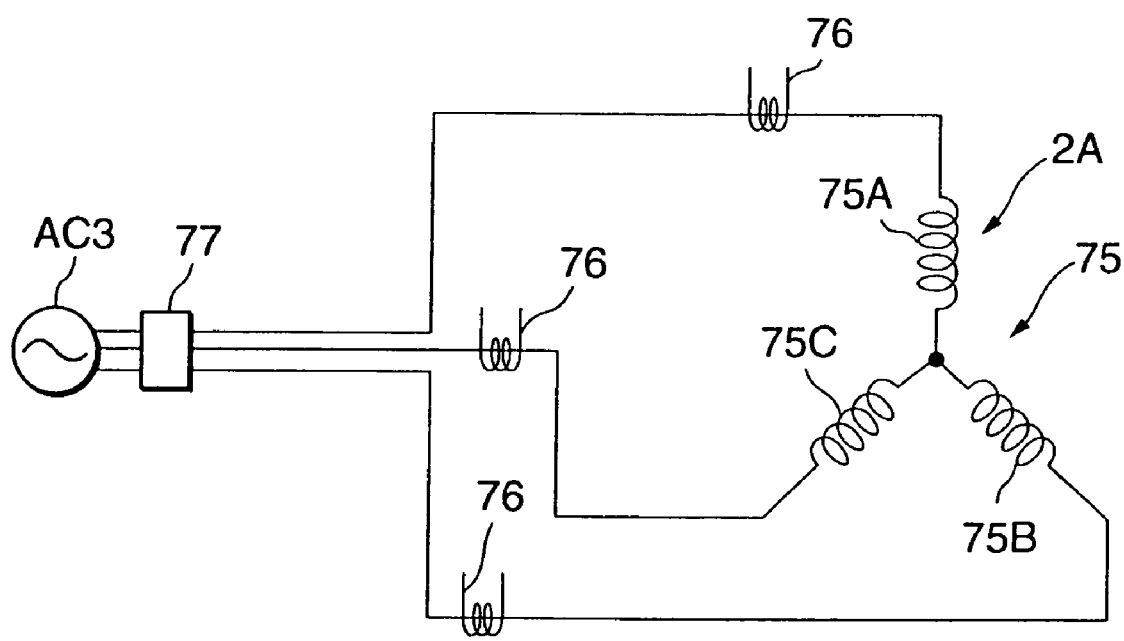
FIG. 46 is an electrical circuit diagram of a three-phase, two-pole synchronous induction motor.

Referring now to FIG. 46, a three-phase, two-pole synchronous induction motor 2A will be described. The synchronous induction motor 2A is installed in the hermetic electric compressor C, as in the case of the synchronous induction motor 2 described above. FIG. 46 is an electrical circuit diagram of the three-phase, two-pole synchronous induction motor 2A. In the drawing, the synchronous induction motor 2A is equipped with a three-phase stator winding 75 constructed of a winding 75A, a winding 75B, and a winding 75C. The winding 75A, the winding 75B, and the winding 75C of the stator winding 75 are connected to a three-phase alternating current commercial power source AC3 through the intermediary of a power switch 77. Current-sensitive line current detectors 76 for detecting line current are provided on the lines connected to the winding 75A, the winding 75B, and the winding 75C. The power switch 77 functions also as a protective switch that cuts off the supply of power to the stator winding 7 if any of the line current detectors 76 senses a predetermined current. The rest of the configuration is as described above.

The two unmagnetized magnet constituents fixed in the slots 44 provided in the rotor yoke 5A are magnetized by a predetermined voltage and a predetermined current supplied to one phase, two phases, or three phases of the stator winding. Thus, the two opposing magnet constituents are magnetized into the permanent magnets 31 having opposite magnetic polarities. To be more specific, the rotor 5 includes opposing permanent magnets 31 magnetized to have opposite magnetic polarities, namely, permanent magnets 31SA on the right side and permanent magnets 31NA on the left side.

Figure 42:
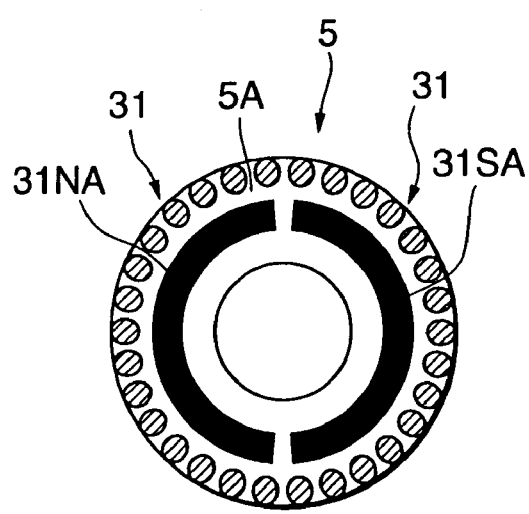
FIG. 42 is a cross sectional top view of yet another rotor.

Another example of the rotor 5 is shown in FIG. 42. In this case also, the rotor yoke 5A is provided with two magnet constituents. The two magnet constituents are embedded in slots 44 vertically formed in the rotor yoke 5A so that they penetrate the rotor yoke 5A. The magnet constituents are disposed in arcuate shapes inside the squirrel-cage secondary conductor 5B with a predetermined interval allowed therebetween, and are embedded such that both ends of the two arcuate magnet constituents are close to each other. The magnet constituents is formed of a rare earth type or ferrite material, as mentioned above.

The two unmagnetized magnet constituents fixed in the slots 44 provided in the rotor yoke 5A are magnetized by a predetermined voltage and a predetermined current supplied to one phase, two phases, or three phases of the stator winding. Thus, the two opposing magnet constituents are magnetized into the permanent magnets 31 having opposite magnetic polarities to constitute the rotor 5. To be more specific, the rotor 5 includes opposing permanent magnets 31 magnetized to have opposite magnetic polarities, namely, a permanent magnet 31SA on the right side and a permanent magnet 31NA on the left side.

Figure 43:
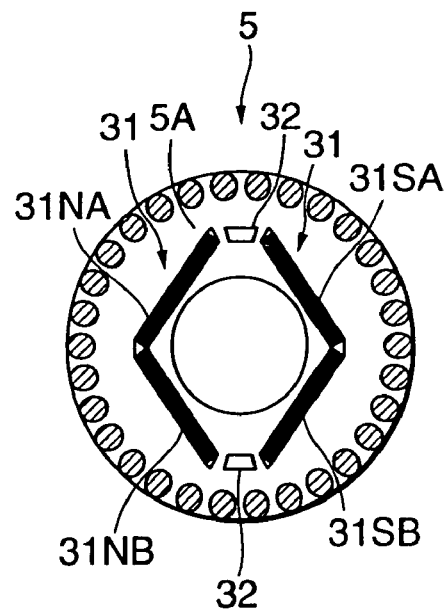
FIG. 43 is a cross sectional top view of still another rotor.

Another example of the rotor 5 is shown in FIG. 43. In this case, the rotor yoke 5A is provided with four magnet constituents. The four magnet constituents are individually embedded in slots 44 vertically formed in the rotor yoke 5A such that they penetrate the rotor yoke 5A. The magnet constituents are embedded inside the squirrel-cage secondary conductor 5B such that two sets of permanent magnets 31, each set consisting of two magnet constituents and shaping substantially like "V", oppose each other, sandwiching the rotating shaft 6. The magnet constituents are arranged such that they form substantially a diamond shape, as observed from above. The magnet constituents are formed of a rare earth type or ferrite material, as previously mentioned. Voids 32 function to intercept the magnetic field formed between the south pole (permanent magnets 31SA, 31SB) and the north pole (permanent magnets 31NA, 31NB). The voids 32, however, are dispensable.

The unmagnetized magnet constituents fixed in the slots 44 provided in the rotor yoke 5A are magnetized by a predetermined voltage and a predetermined current supplied to one phase, two phases, or three phases of the stator winding. Thus, the opposing sets of magnet constituents are magnetized into the sets of permanent magnets 31 carrying opposite magnetic polarities. To be more specific, the rotor 5 includes opposing sets of permanent magnets 31 magnetized to have opposite magnetic polarities, namely, two upper and lower permanent magnet 31SA and 31SB on the right side and two upper and lower permanent magnet 31NA and 31NB on the left side.

Figure 44:
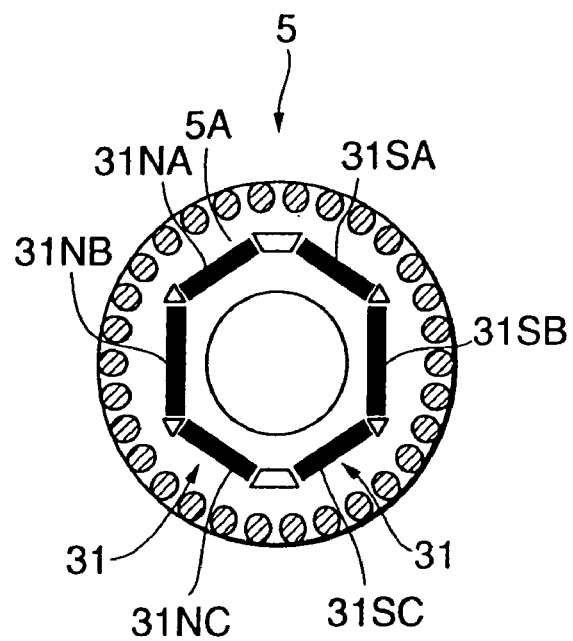
FIG. 44 is a cross sectional top view of a further rotor.

Another example of the rotor 5 is shown in FIG. 44. In this case, the rotor yoke 5A is provided with six magnet constituents. The six magnet constituents are individually embedded in slots 44 vertically formed in the rotor yoke 5A such that they penetrate the rotor yoke 5A. The magnet constituents are arranged inside the squirrel-cage secondary conductor 5B such that two sets, each set consisting of three magnet constituents, oppose each other, sandwiching the rotating shaft 6 therebetween, and are shaped like a hexagon. The magnet constituents are formed of a rare earth type or ferrite material, as previously mentioned.

The unmagnetized magnet constituents fixed in the slots 44 provided in the rotor yoke 5A are magnetized by a predetermined voltage and a predetermined current supplied to one phase, two phases, or three phases of the stator winding. Thus, the opposing sets of magnet constituents are magnetized into the sets of permanent magnets 31 carrying opposite magnetic polarities. To be more specific, the rotor 5 includes opposing sets of permanent magnets 31 magnetized to have opposite magnetic polarities, namely, three permanent magnets 31SA, 31SB, and 31SC on the right side and three permanent magnets 31NA, 31NB, and 31NC on the left side.

Figure 45:
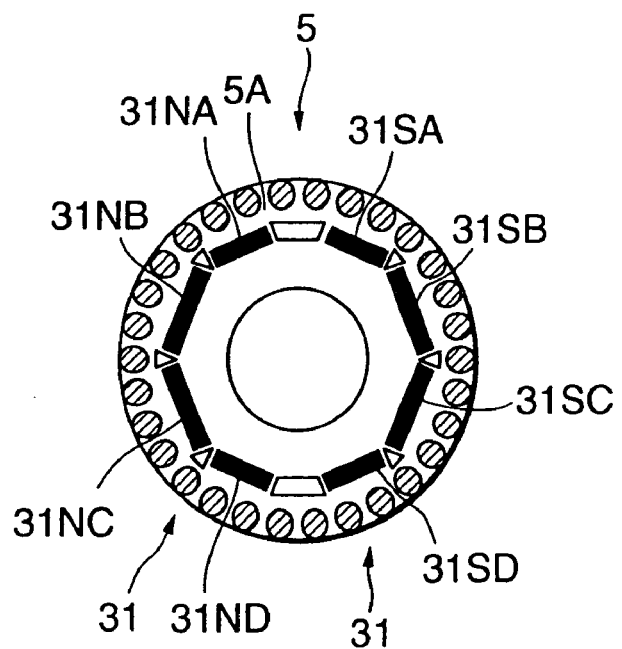
FIG. 45 is a cross sectional top view of another rotor.

Another example of the rotor 5 is shown in FIG. 45. In this case, the rotor yoke 5A is provided with eight magnet constituents. The eight magnet constituents are individually embedded in slots 44 vertically formed in the rotor yoke 5A such that they penetrate the rotor yoke 5A. The magnet constituents are arranged inside the squirrel-cage secondary conductor 5B such that two sets, each set consisting of four magnet constituents, oppose each other, sandwiching the rotating shaft 6 therebetween, and are shaped like an octagon. The magnet constituents are formed of a rare earth type or ferrite material, as previously mentioned.

The unmagnetized magnet constituents fixed in the slots 44 provided in the rotor yoke 5A are magnetized by a predetermined voltage and a predetermined current supplied to one phase, two phases, or three phases of the stator winding. Thus, the opposing sets of magnet constituents are magnetized into the sets of permanent magnets 31 carrying opposite magnetic polarities. To be more specific, the rotor 5 includes opposing sets of permanent magnets 31 magnetized to have opposite magnetic polarities, namely, four permanent magnets 31SA, 31SB, 31SC, and 31SD on the right side and four permanent magnets 31NA, 31NB, 31NC, and 31ND on the left side.

Thus, it is possible to magnetize a plurality of unmagnetized magnet constituents inserted in the rotor 5 either at once or in a plurality of number of times. This arrangement makes it possible to energize either one phase or two phases of windings to effect the magnetization if a winding or the like deforms due to heat generated during magnetization. Even if windings are not deformed by heat generated during magnetization, either one phase or two phases of windings may be selected and energized to magnetize at once. This makes it possible to efficiently magnetize a plurality of unmagnetized magnet constituents inserted in the rotor 5, leading to dramatically improved productivity of the synchronous induction motor 2.

An air conditioner or an electric refrigerator or the like requires large motion torque at the time of start-up, so that it incorporates a motor that provides larger motion torque than steady motion torque required for normal operation. Increasing the motion torque for starting a synchronous induction motor inevitably increases power consumed during normal operation. Therefore, the motion torque for starting the motor used in a hermetic electric compressor constituting a refrigerating cycle of a refrigerator or an air conditioner has not been entirely adequate in achieving higher efficiency to meet recent energy regulations. For this reason, there has been demand for developing a drive unit for a synchronous induction motor that consumes less power during normal operation and secures sufficient motion torque at a start-up at the same time.

Referring to FIG. 47 through FIG. 52, the descriptions will now be given of a drive unit for a synchronous induction motor that consumes less power during normal operation and provides high motion torque at a start-up.

Figure 47:
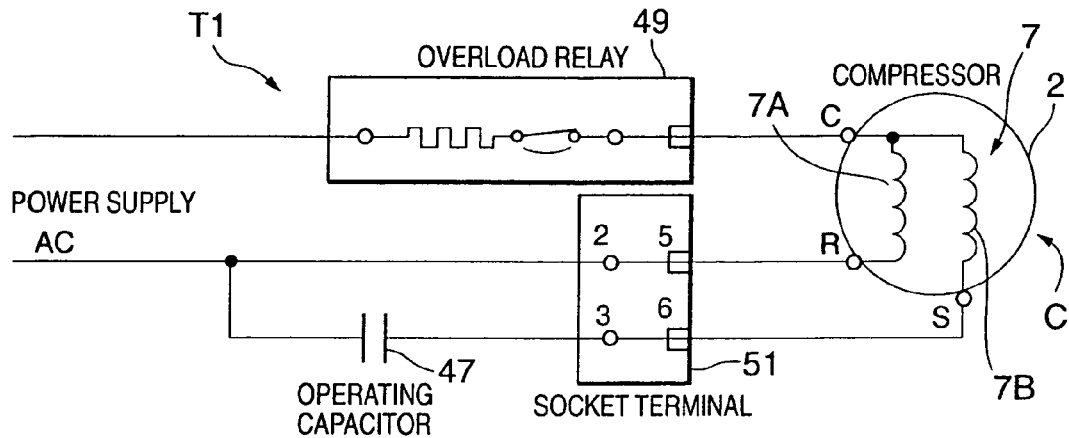
FIG. 47 is an electrical circuit diagram of a drive unit of the synchronous induction motor in accordance with the present invention.

FIG. 47 is an electrical circuit diagram of a drive unit T1 of a synchronous induction motor 2 that exhibits the aforesaid features. Referring to FIG. 47, the synchronous induction motor 2 that receives power from a single-phase alternating current commercial power source AC is equipped with a stator winding 7 constructed of a primary winding 7A and an auxiliary winding 7B. One end of the primary winding 7A is connected to one end of the single-phase alternating current commercial power source AC, and the other end thereof is connected to the other end of the single-phase alternating current commercial power source AC through the intermediary of a socket terminal 51. One end of the auxiliary winding 7B is connected to one end of the single-phase alternating current commercial power source AC, and the other end thereof is connected to the other end of the single-phase alternating current commercial power source AC through the intermediary of a socket terminal 51 and an operating capacitor 47. A power switch 49 is constituted by a current-sensitive type line current sensor for detecting line current and an overload relay that serves also as a protective switch used to supply power from the single-phase alternating current commercial power source AC to the stator winding 7 and to cut off the supply of power to the stator winding 7. The operating capacitor 47 is set to have a capacitance suited for start-up and steady operation of the synchronous induction motor 2.

When the power switch 49 is turned ON to supply power from the single-phase alternating current commercial power source AC, the parallel circuit of the operating capacitor 47 and the primary winding 7A is connected to the auxiliary winding 7B. By the current phase difference between the primary winding 7A and the auxiliary winding 7B, the synchronous induction motor 2 obtains a start-up motion torque to start running. The synchronous induction motor 2 continues its steady operation from the current phase difference between the primary winding 7A and the auxiliary winding 7B produced by the operating capacitor 47. In this case, the operating capacitor 47 serves also as a start-up capacitor.

Figure 48:
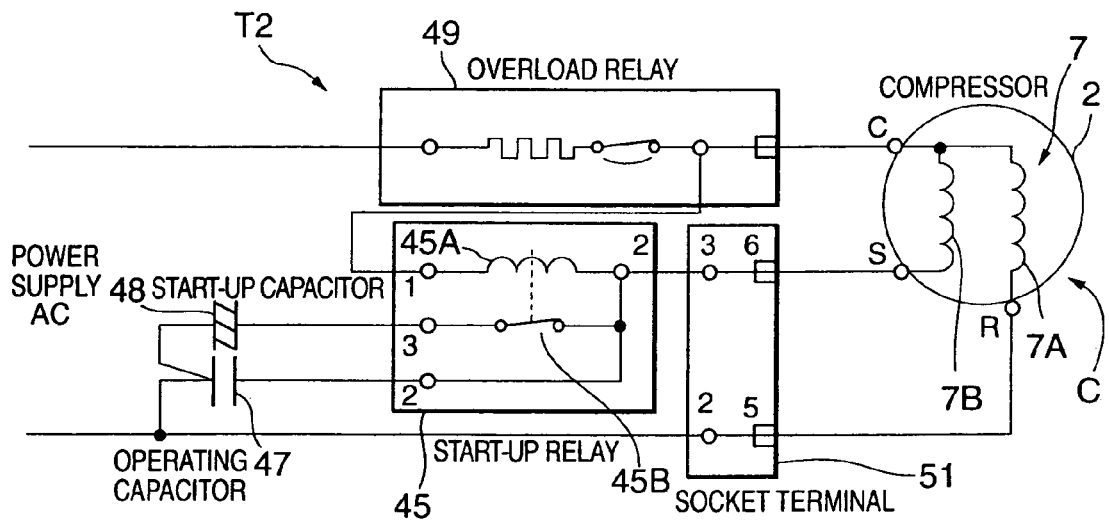
FIG. 48 is an electrical circuit diagram of a drive unit of another synchronous induction motor.

FIG. 48 is an electrical circuit diagram of another drive unit T2 for a synchronous induction motor 2. Referring to FIG. 48, the synchronous induction motor 2 receiving power from a single-phase alternating current commercial power source AC is also equipped with a stator winding 7 constructed of a primary winding 7A and an auxiliary winding 7B. The stator winding 7 is connected to the single-phase alternating current commercial power source AC through the intermediary of a power switch 49. The primary winding 7A connected to one end of the single-phase alternating current commercial power source AC is connected to the other end of the single-phase alternating current commercial power source AC through the intermediary of a socket terminal 51. The auxiliary winding 7B connected to one end of the single-phase alternating current commercial power source AC is connected to the power switch 49 through the intermediary of the socket terminal 51 and a relay coil 45A of a start-up relay 45.

The auxiliary winding 7B is connected in series to the other end of the single-phase alternating current commercial power source AC through the intermediary of a socket terminal 51, a start-up relay contact 45B of the start-up relay 45, and a start-up capacitor 48. The operating capacitor 47 is connected in parallel to the start-up relay contact 45B and the start-up capacitor 48. The operating capacitor 47 is set to provide a capacitance suited for steady operation. In a state wherein the operating capacitor 47 and the start-up capacitor 48 are connected in parallel, the capacitors 47 and 48 are set to capacitances suited for a start-up. Very little current passes the relay coil 45A at an operation start when large current passes through the synchronous induction motor 2. When the synchronous induction motor 2 moves to its steady-operation with the start-up relay contact 45B closed, current passes through the relay coil 45A, and the start-up relay contact 45B is opened, isolating the start-up capacitor 48.

The moment the power switch 49 is turned ON, current flows from the single-phase alternating current commercial power source AC to the primary winding 7A and the auxiliary winding 7B. When large current passes through the auxiliary winding 7B at the start-up of the synchronous induction motor 2, very little current passes through the relay coil 45A; therefore, the start-up relay contact 45B of the start-up relay 45 remains closed, and the auxiliary winding 7B provides start-up motion torque from the current phase difference from the primary winding 7A provided by the operating capacitor 47 and the start-up capacitor 48 connected in parallel thereto, thus causing the synchronous induction motor 2 to start running. As the synchronous induction motor 2 shifts to its steady operation, the current passing through the auxiliary winding 7B decreases, causing current to pass through the relay coil 45A. The magnetomotive force of the relay coil 45A turns the power switch 49 OFF to isolate the start-up capacitor 48. The synchronous induction motor 2 continues its steady operation by the current phase difference between the primary winding 7A and the auxiliary winding 7B produced by the operating capacitor 47. Alternatively, the use of the start-up relay 45 may be replaced by current control based on a thyristor.

Figure 49:
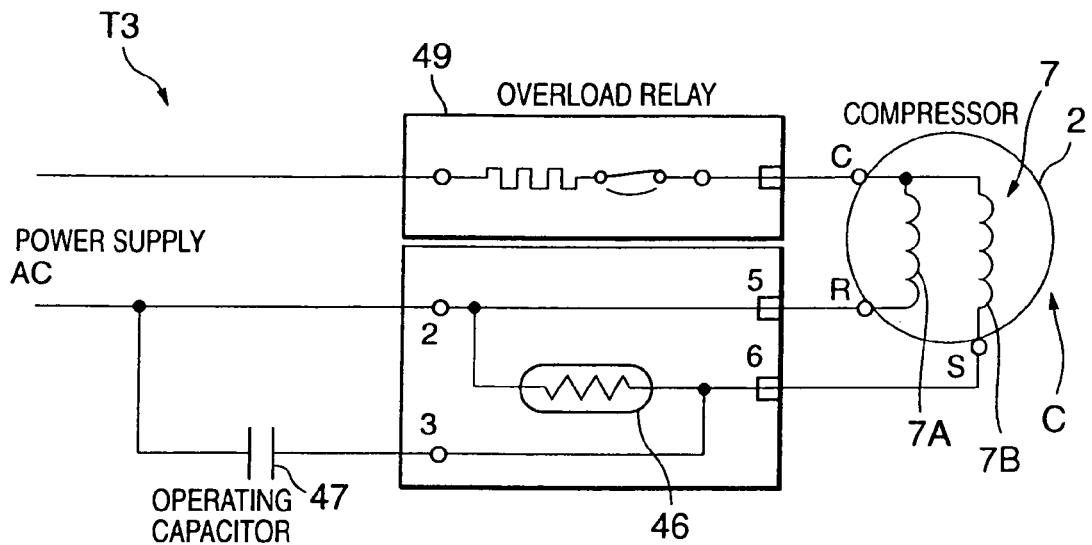
FIG. 49 is an electrical circuit diagram of a drive unit of still another synchronous induction motor.

FIG. 49 is an electrical circuit diagram of another drive unit T3 for the synchronous induction motor 2. Referring to FIG. 49, the synchronous induction motor 2 receiving power from a single-phase alternating current commercial power source AC is also equipped with a stator winding 7 constructed of a primary winding 7A and an auxiliary winding 7B. The stator winding 7 is connected to the single-phase alternating current commercial power source AC through the intermediary of a power switch 49. One end of the primary winding 7A is connected to one end of the single-phase alternating current commercial power source AC, and the other end thereof is connected to the other end of the single-phase alternating current commercial power source AC. One end of the auxiliary winding 7B is connected to one end of the single-phase alternating current commercial power source AC, and the other end thereof is connected to the other end of the single-phase alternating current commercial power source AC through the intermediary of a positive thermistor 46 (hereinafter referred to as "PTC"). An operating capacitor 47 is connected in parallel to the PTC 46. The PTC 46 is a semiconductor device whose resistance value increases with increasing temperature. The resistance value of the PTC 46 is low when the synchronous induction motor 2 is started, but it increases as the PTC 46 generates heat due to the passage of current.

The moment the power switch 49 is turned ON, current flows from the single-phase alternating current commercial power source AC to the primary winding 7A and the auxiliary winding 7B, causing the synchronous induction motor 2 to start up. When the synchronous induction motor 2 is started up, the temperature of the PTC 46 is low and its resistance value is low; therefore, large current passes through the PTC 46, and large current accordingly passes through the auxiliary winding 7B (the current passing through the operating capacitor 47 being small). This energization causes the PTC 46 to start self-heating, and the resistance value of the PTC 46 increases accordingly until very little current passes through the PTC 46 itself. Thus, the synchronous induction motor 2 continues steady operation from the current phase difference between the primary winding 7A and the auxiliary winding 7B by the operating capacitor 47.

Figure 50:
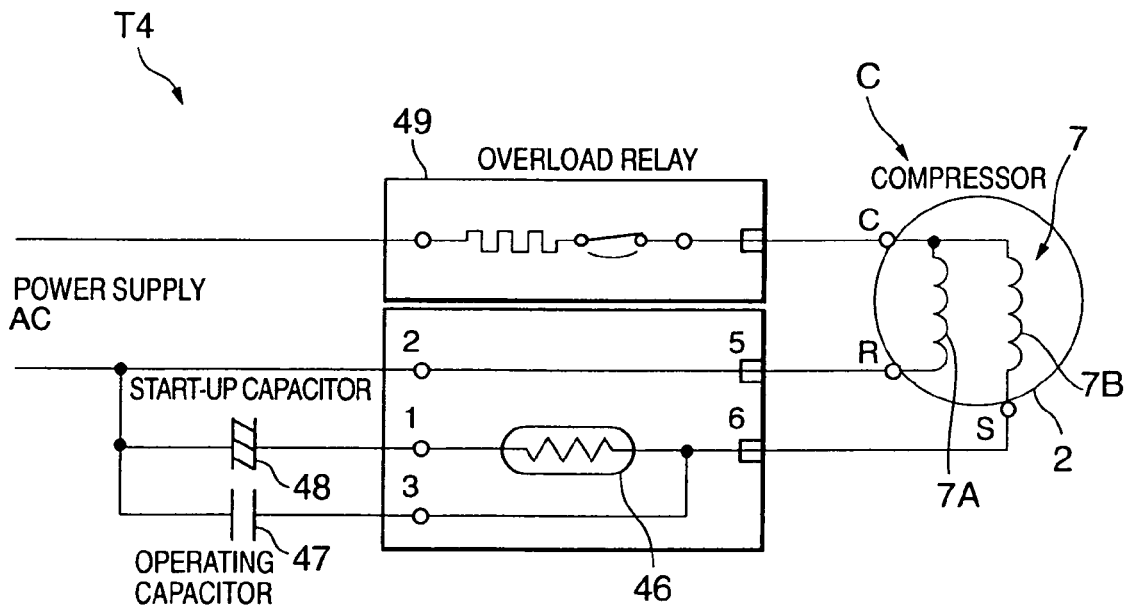
FIG. 50 is an electrical circuit diagram of a drive unit of yet another synchronous induction motor.

FIG. 50 is an electrical circuit diagram of another drive unit T4 for the synchronous induction motor 2. The construction of the drive unit T4 is the same as that shown in FIG. 9. The construction will be explained again in detail. The synchronous induction motor 2 receiving power from a single-phase alternating current commercial power source AC is also equipped with a stator winding 7 constructed of a primary winding 7A and an auxiliary winding 7B. The stator winding 7 is connected to the single-phase alternating current commercial power source AC through the intermediary of a power switch 49. One end of the primary winding 7A is connected to one end of the single-phase alternating current commercial power source AC, and the other end thereof is connected to the other end of the single-phase alternating current commercial power source AC. One end of the auxiliary winding 7B is connected to one end of the single-phase alternating current commercial power source AC, and the other end thereof is connected in series to the other end of the single-phase alternating current commercial power source AC through the intermediary of a PTC 46 and a start-up capacitor 48. An operating capacitor 47 is connected in parallel to the PTC 46 and the start-up capacitor 48.

When the power switch 49 is closed, current flows from the single-phase alternating current commercial power source AC to the primary winding 7A and the auxiliary winding 7B. When the synchronous induction motor 2 is started up, the temperature of the PTC 46 is low and the resistance value thereof is also low, so that large current passes through the PTC 46 and large current accordingly passes through the auxiliary winding 7B. The auxiliary winding 7B obtains start-up torque from the current phase difference between itself and the primary winding 7A produced by the operating capacitor 47 and the start-up capacitor 48 connected in parallel, thus causing the synchronous induction motor 2 to start running. This energization causes the PTC 46 to start self-heating, and the resistance value of the PTC 46 increases accordingly until very little current passes through the PTC 46 itself. Thus, the start-up capacitor 48 is isolated, and the synchronous induction motor 2 continues steady operation from the current phase difference between the primary winding 7A and the auxiliary winding 7B by the operating capacitor 47.

Figure 51:
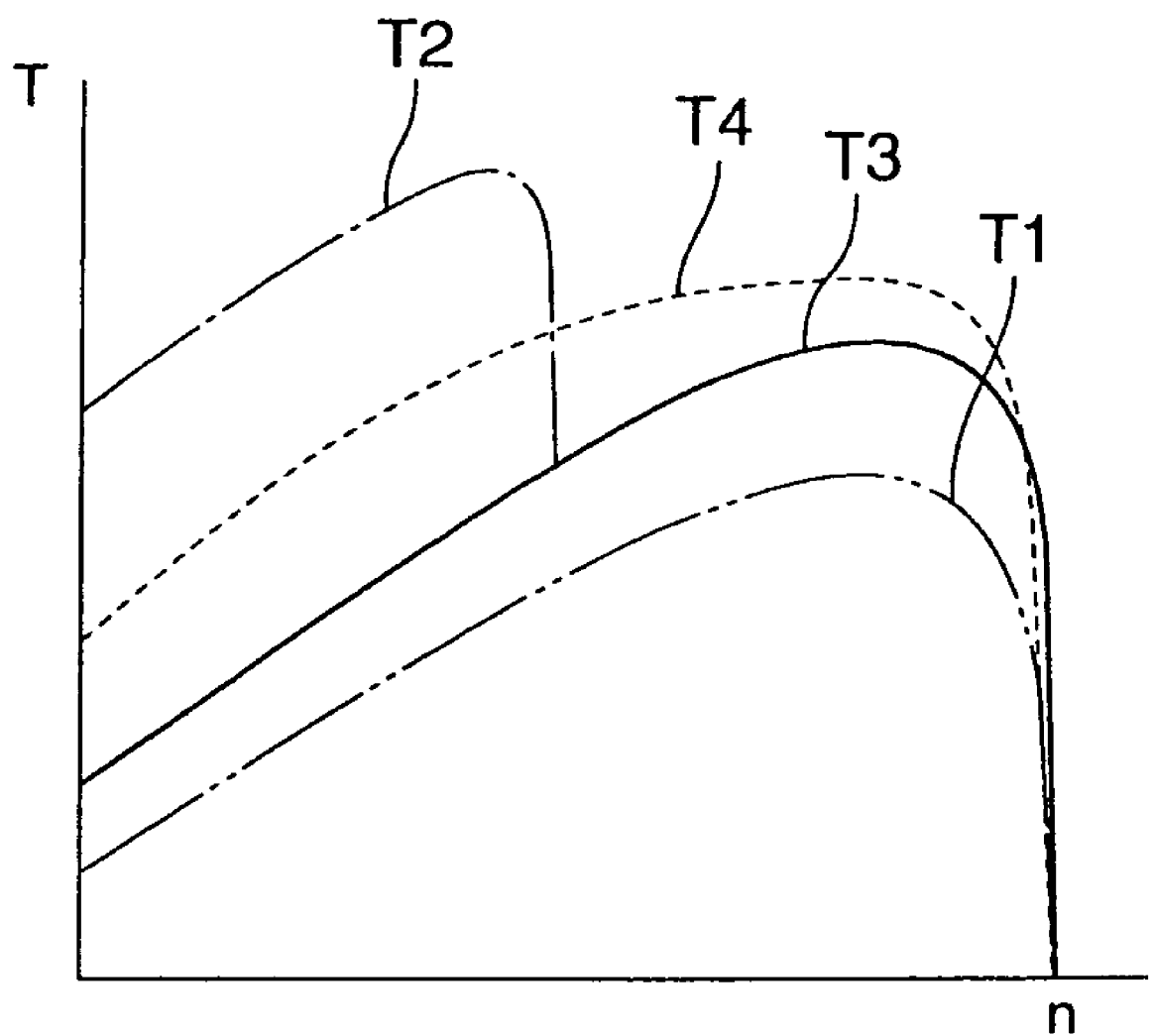
FIG. 51 is a diagram illustrating a relationship between a rotational torque and a number of revolutions provided by each electric circuit of each drive unit.

FIG. 51 shows the relationship between rotating torque T provided by the electric circuit of each of the drive units T1, T2, T3, and T4 set forth above, and a number of revolutions n. In the chart, the axis of ordinates indicates a rotating torque T, the rotating torque T is the smallest at the bottom, and is higher at a higher level. The axis of abscissa indicates the number of revolutions n, the left end thereof being the smallest number of revolutions n, while the right end being the largest number of revolutions n. The two-dot chain curve denotes the rotating torque T in relation to the number of revolutions n of the drive unit T1, and the solid-line curve denotes the rotating torque T in relation to the number of revolutions n of the drive unit T3. The dashed line curve denotes the rotating torque T in relation to the number of revolutions n of the drive unit T4, and the one-dot chain curve denotes the rotating torque T in relation to the number of revolutions n of the drive unit T2.

As can be seen from the chart, the drive unit T1 having a single capacitor that serves as the starting capacitor 48 and the operating capacitor 47 exhibits low start-up operating torque and low steady operating torque. The drive unit T1, however, obviates the need for the start-up relay 45 and other elements, so that it is used with an air conditioner or other equipment, such as an electric refrigerator, that has relatively low start-up operating torque and steady operating torque.

The drive unit T2 that switches between the start-up capacitor 48 and the operating capacitor 47 by the start-up relay 45 provides higher start-up operating torque. As the number of revolutions n of the synchronous induction motor 2 increases, leading to the shift to the steady operation mode, current passes through the relay coil 45A, causing the start-up relay contact 45B to open thereby to isolate the start-up capacitor 48. Thereafter, the drive unit T2 performs the same operation as that of the drive unit T3 at the rotating torque T in relation to the number of revolutions n. Thus, the operating torque for starting up the synchronous induction motor 2 can be increased, while the power consumed during the steady operation can be reduced, permitting the synchronous induction motor 2 to be operated at extremely high efficiency. The drive unit T2 provides higher operating torque for start-up and higher operating torque for steady operation, so it is used with an air conditioner or other equipment, such as an electric refrigerator, that has relatively high start-up operating torque and steady operating torque.

The drive unit T3 that uses the PTC 46, which is a semiconductor device whose resistance value increases with increasing temperature, and the operating capacitor 47 provides a higher start-up rotating torque than the drive unit T1. The drive unit T3 obviates the need for the start-up relay 45 and other devices, and secures higher reliability. This makes it possible to allow a higher operating torque to be obtained at the start-up of the synchronous induction motor 2, and to reduce the power consumed during normal operation, thus enabling the synchronous induction motor 2 to be operated with extremely high efficiency. The drive unit T3, therefore, is used with an air conditioner or other equipment, such as an electric refrigerator, that has relatively low start-up operating torque and steady operating torque and is required to exhibit high reliability.

The drive unit T4 that uses the PTC 46, which is a semiconductor device whose resistance value increases with increasing temperature, the start-up capacitor 48, and the operating capacitor 47 provides a still higher start-up rotating torque T than the drive unit T3, permitting even higher reliability to be achieved. This makes it possible to allow a higher operating torque to be obtained at the start-up of the synchronous induction motor 2, and to reduce the power consumed during normal operation, thus enabling the synchronous induction motor 2 to be operated with extremely high efficiency. The drive unit T4, therefore, is used with an air conditioner or other equipment, such as an electric refrigerator, that has relatively high start-up operating torque and steady operating torque and is required to exhibit high reliability.

Figure 52:
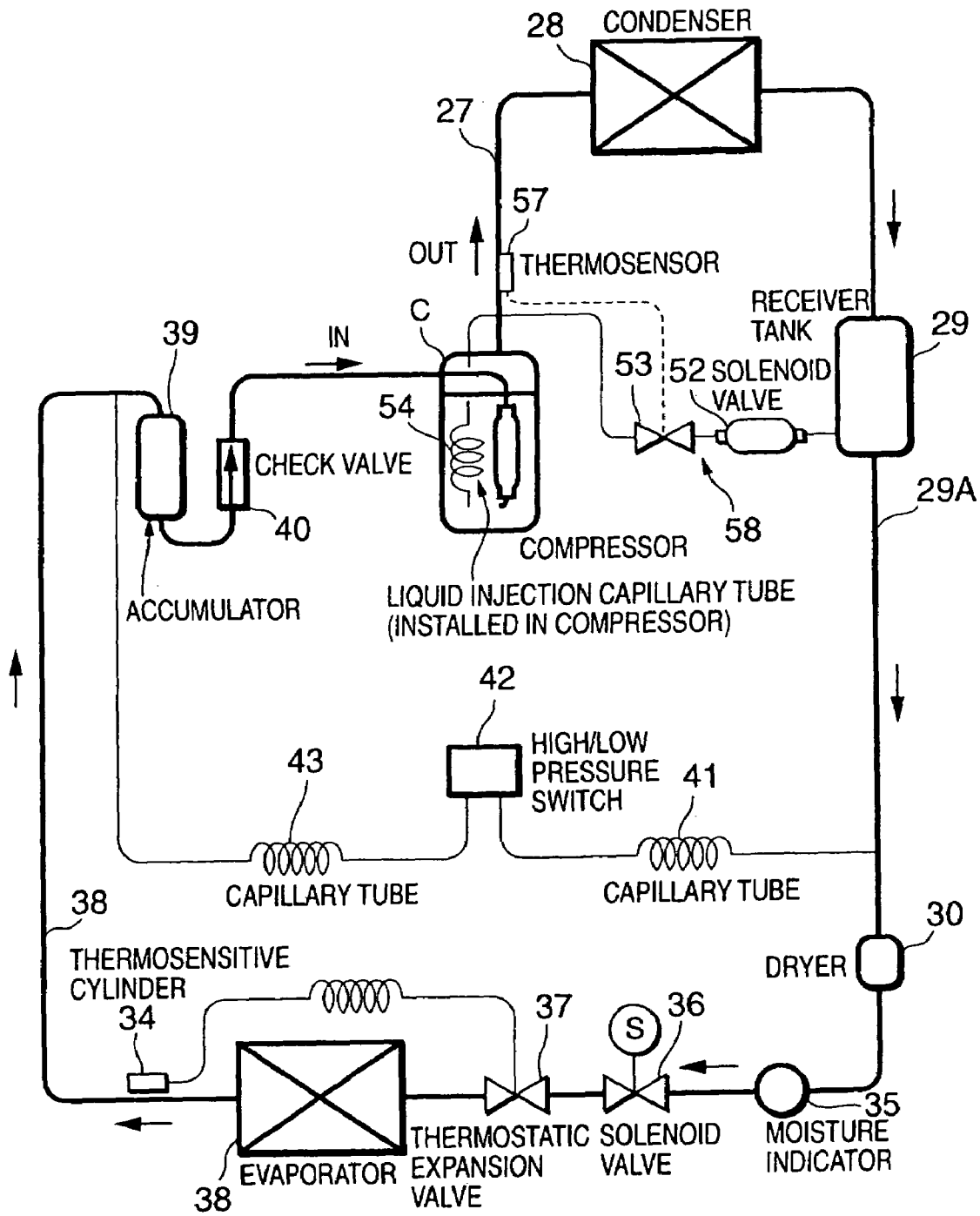
FIG. 52 is another refrigerant circuit diagram of an air conditioner or an electric refrigerator or the like that uses the hermetic electric compressor incorporating a synchronous induction motor.

FIG. 52 is a refrigerant circuit of an air conditioner or other equipment, such as an electric refrigerator, that uses a hermetic electric compressor C incorporating a synchronous induction motor 2. The refrigerant circuit has added a liquid injection circuit 58 to the refrigerant circuit shown in FIG. 8. A receiver tank 29 provided in the refrigerant circuit is connected to a compressor 3 of the hermetic electric compressor C through the intermediary of a strainer 52, a solenoid valve 53, and a capillary tube 54.

The solenoid valve 53 is connected to a thermosensor 57 connected to a pipe 27 located at the discharge end of the compressor 3, and the opening degree thereof is automatically adjusted according to the temperature detected by the thermosensor 57. When the compressor 3 of the hermetic electric compressor C is driven, the refrigerant sealed in the refrigerant circuit is drawn in through a suction pipe 23 and compressed in steps by a first rotary cylinder 9 and a second rotary cylinder 10, then discharged into the pipe 27 through a discharge pipe 22. The compressed gas refrigerant discharged into the pipe 27 flows into a condenser 28 wherein it radiates heat and condenses into a liquid refrigerant which flows into the receiver tank 29. A part of the liquid refrigerant leaving the receiver tank 29 flows also into the liquid injection circuit 58 and further passes through the strainer 52 and the solenoid valve 53 to reach the capillary tube 54 wherein it is throttled before being discharged into a compressor 3. The liquid refrigerant discharged into the compressor 3 evaporates therein when it absorbs heat so as to cool the compressor 3. This restrains a temperature rise in the compressor 3 in a cooling operation mode thereby to protect the compressor 3. The rest of the operation is the same as previously described.

Hitherto, the stator winding constituting the synchronous induction motor of this type of hermetic electric compressor is thermally protected primarily by actuating a thermostat wrapped around the stator winding to cut off the supply of power to the synchronous induction motor. Alternatively, a temperature sensor is attached to the discharge pipe or the suction pipe of the hermetic electric compressor or to the outer surface of the hermetic vessel, and if the temperature of the hermetic electric compressor reaches a preset value or more, a protective switch is actuated by the temperature sensor to cut off the supply of power to the synchronous induction motor so as to protect the hermetic electric compressor.

In a conventional hermetic electric compressor, if the temperature of the stator winding rises due to an overloaded operation, in order to protect the stator winding of the synchronous induction motor from being burnt, the thermostat wrapped around the stator winding is actuated to cut off the supply of power to the synchronous induction motor. Alternatively, an expensive circuit device using a thermistor or the like is installed on the discharge pipe, and if a discharge temperature reaches a reference level or more, then the supply of power to the synchronous induction motor is cut off thereby to protect the synchronous induction motor from abnormal temperatures. In this case, the difference between the actual temperature of the stator winding and the discharge temperature greatly varies according to load conditions, etc. Hence, there has been a problem in that the operation of the synchronous induction motor is actually continued while the temperature of the stator winding is higher than the reference level, leading to a markedly shortened service life of the synchronous induction motor. There has been another problem in that the stator winding is burnt.

There has been still another problem in that a rise in the temperature of the synchronous induction motor causes the permanent magnets embedded in the rotor yoke to be thermally demagnetized, resulting in reduced driving power of the synchronous induction motor.

Referring now to FIG. 53 through FIG. 66, a hermetic electric compressor capable of restraining a rise in temperature of the stator winding and of securely preventing permanent magnets from being thermally demagnetized will be described.

In this case, a hermetic vessel 1 of a hermetic electric compressor C is divided into two parts, namely, a cylindrical shell 1A having an open upper end and an end cap 1B that closes the open upper end. An electric unit and a compression unit (hereinafter referred to as "the synchronous induction motor 2" and "the compressor 3") are housed in the shell 1A, the end cap 1B is attached to the shell 1A so as to cover the shell 1A, then they are sealed by high-frequency welding or the like.

Figure 53:
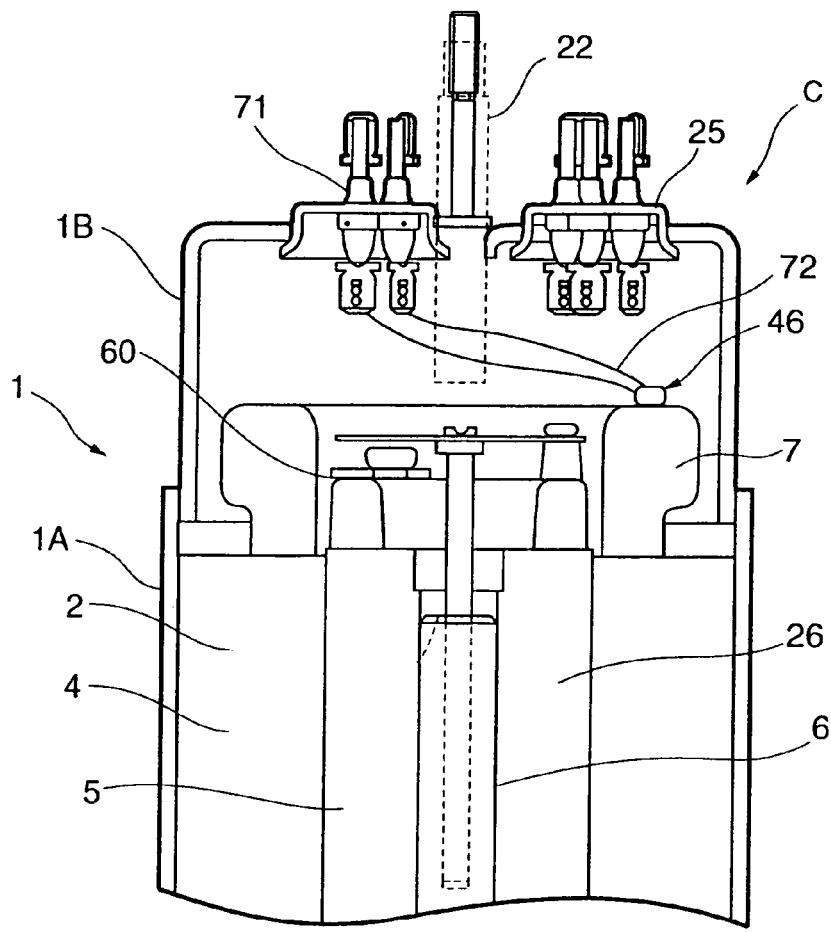
FIG. 53 is a longitudinal sectional side view of a part (in the vicinity of an end cap) of the hermetic electric compressor in accordance with the present invention.

The hermetic electric compressor C is provided with a thermistor 46 serving as a thermal protective device whose resistance value changes with temperature. The thermistor 46 is attached to a stator winding 7 provided in the hermetic vessel 1 of the hermetic electric compressor C. The thermistor 46 is secured to the stator winding 7 by a polyester yarn 70 binding the coil end of the stator winding 7. Furthermore, the thermistor 46 is connected to a connection terminal 71 provided on the end cap 1B of the hermetic vessel 1 by a lead wire 72, as shown in FIG. 53.

Figure 54:
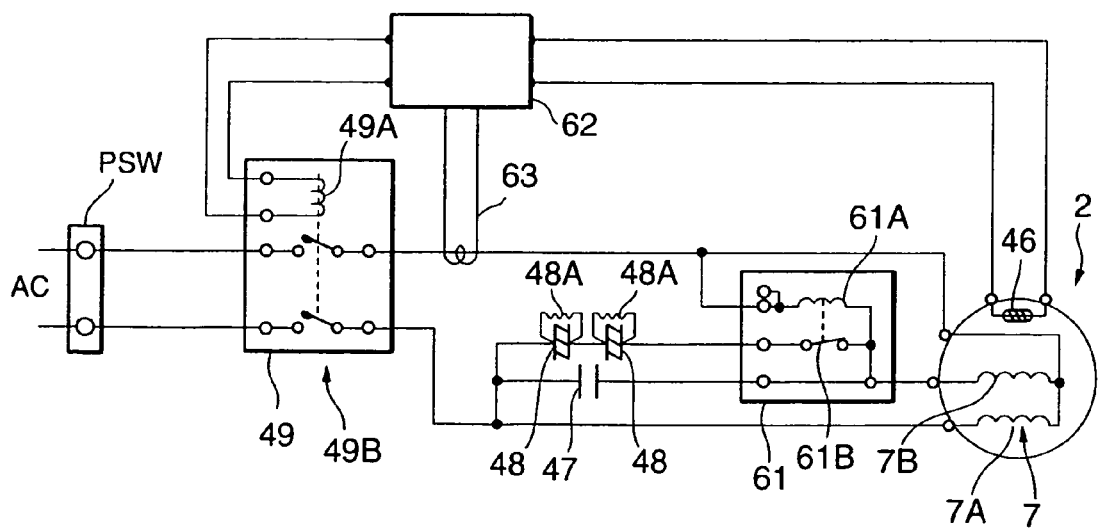
FIG. 54 is an electrical circuit diagram of a synchronous induction motor.

FIG. 54 is an electrical circuit diagram of the synchronous induction motor 2 in this embodiment. Referring to FIG. 54, the synchronous induction motor 2, which receives power from a single-phase alternating current commercial power source AC, is equipped with a stator winding 7 formed of a primary winding 7A and an auxiliary winding 7B. One end of the primary winding 7A is connected to one end of the single-phase alternating current commercial power source AC, and the other end thereof is connected to the other end of the power source AC. One end of the auxiliary winding 7B is connected to one end of the single-phase alternating current commercial power source AC, and the other end thereof is connected to the other end of the power source AC through the intermediary of an operating capacitor 47.

One end of the auxiliary winding 7B is connected to the other end of the single-phase alternating current commercial power source AC through the intermediary of a contact 61B of a start-up relay 61 and start-up capacitors 48 and 48. These contact 61B and the start-up capacitors 48 and 48 are connected in series, and the operating capacitor 47 is connected in parallel to the contact 61B and the start-up capacitors 48 and 48. The operating capacitor 47 is set to a capacitance suited for steady operation. In the state wherein the operating capacitor 47 and the start-up capacitors 48 and 48 are connected in parallel, the capacitors 47, 48, and 48 are set to capacitances suited for start-up. Reference numerals 48A and 48A denote discharge resistors for discharging currents charged in the start-up capacitors 48 and 48, reference numeral 61A denotes a start-up relay coil, and reference character PSW denotes a power switch.

A control relay 49 is provided that is connected between the power switch PSW and the stator winding 7 and provided with a control relay contact 49B to supply power from the single-phase alternating current commercial power source AC to the stator winding 7 and to cut off the supply of power to the stator winding 7. A controller 62 controls the supply of power to the synchronous induction motor 2 according to a change in the resistance value of the thermistor 46. The controller 62 is connected to the thermistor 46 secured to the stator winding 7 and also connected to a control relay coil 49A of the control relay 49. Connected to the controller 62 is a current-sensitive line current detector 63 that is connected to one end of the single-phase alternating current commercial power source AC and that functions as an overload protective device for detecting line current.

When the power switch PSW is turned ON with the control relay contact 49B closed, current is supplied from the single-phase alternating current commercial power source AC to the primary winding 7A and the auxiliary winding 7B. At the start-up of the synchronous induction motor 2, current passes through a start relay coil 61A, causing the contact 61B to close. The auxiliary winding 7B obtains start-up torque from the current phase difference between itself and the primary winding 7A produced by the operating capacitor 47 and the start-up capacitors 48 and 48 connected in parallel, thus causing the synchronous induction motor 2 to start running. After the synchronous induction motor 2 is energized and starts running, the contact 61B opens after a while to isolate the start-up capacitors 48 and 48, and the synchronous induction motor 2 continues steady operation from the current phase difference between the primary winding 7A and the auxiliary winding 7B produced by the operating capacitor 47. The running synchronous induction motor 2 operates the hermetic electric compressor C, thus enabling an air conditioner to effect air conditioning in the room wherein the air conditioner is installed, or enabling the refrigerator to effect cooling therein.

As the hermetic electric compressor C is operated, the temperature of the compressor 3 rises and the compressor 3 becomes hot. As the compressor 3 becomes hot, the temperature of the stator winding 7 rises accordingly. This causes the resistance value of the thermistor 46 to change, and the temperature rise in the stator winding 7 is detected. If the detected temperature is higher than a preset temperature level, then the controller 62 detects that the temperature of the stator winding 7 is higher than the preset level, and passes current through the control relay coil 49A to open the control relay contact 49B thereby to cut off the supply of power to the stator winding 7. With this arrangement, the supply of power to the stator winding 7 can be interrupted before the stator winding 7 generates abnormal heat while the hermetic electric compressor C is in operation, thus making it possible to securely restrain damage to the stator winding 7 and the thermal demagnetization of the permanent magnets 31. The controller 62 causes current to the control relay coil 49A to open the control relay contact 49B so as to interrupt the supply of power to the stator winding 7 if it detects that the temperature of the stator winding 7 is higher than a preset temperature. Alternatively, however, the controller 62 may control the supply of power to the synchronous induction motor 2 to reduce the number of revolutions thereof or to shut off the supply of power to the synchronous induction motor 2 if the temperature of the hermetic electric compressor C rises and exceeds a preset temperature level.

Furthermore, if large current flows into the stator winding 7 due to overloaded operation of the hermetic electric compressor C, the line current detector 63 detects the large current flow. If the detected current is larger than a preset current level, then the controller 62 detects the large current flow into the stator winding 7, and passes current through the control relay coil 49A to open the control relay contact 49B so as to cut off the supply of power to the stator winding 7. With this arrangement, the supply of power to the stator winding 7 can be interrupted so as to protect the synchronous induction motor 2 before an overloaded operation of the hermetic electric compressor C is continued, which would lead to damage to the hermetic electric compressor C. The controller 62 shuts off the supply of power to the stator winding 7 to protect the synchronous induction motor 2 in response to a signal issued by the thermistor 46 or the line current detector 63, whichever issued the detection signal first.

Figure 55:
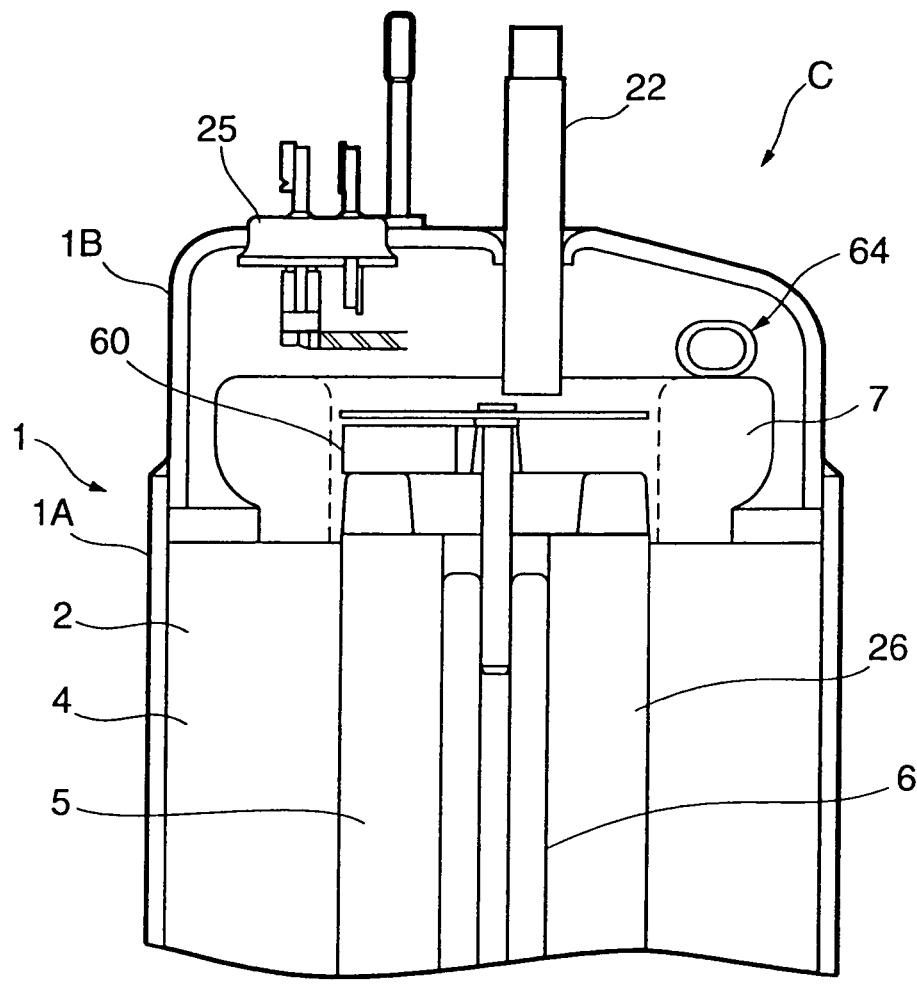
FIG. 55 is a longitudinal sectional side view of a part (in the vicinity of an end cap) of another hermetic electric compressor.

FIG. 55 is a longitudinal sectional side view of a part of another hermetic electric compressor C (the part being in the vicinity of an end cap 1B). The hermetic electric compressor C shown in FIG. 55 is equipped with a bimetal switch 64 as a thermal protector that opens and closes a contact at a predetermined temperature. The bimetal switch 64 is secured to the stator winding 7 by a polyester yarn 70 for binding a coil end of the stator winding 7. The bimetal switch 64 is connected between a hermetic terminal 25 provided on the end cap 1B of the hermetic vessel 1 and the stator winding 7, and it cuts off the supply of power from the single-phase alternating current commercial power source AC to the stator winding 7 by opening the contact 61B if the temperature of the stator winding 7 exceeds a predetermined temperature level.

Figure 56:
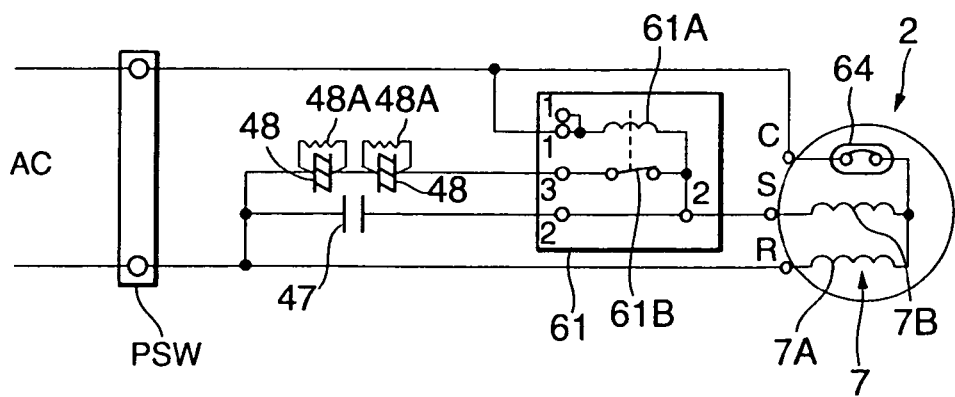
FIG. 56 is an electrical circuit diagram of a synchronous induction motor of the hermetic electric compressor shown in FIG. 55.

FIG. 56 is an electrical circuit diagram of the synchronous induction motor 2 of the hermetic electric compressor C shown in FIG. 55. Referring to FIG. 56, the synchronous induction motor 2, which receives power from a single-phase alternating current commercial power source AC through the intermediary of the bimetal switch 64, is equipped with a stator winding 7 formed of a primary winding 7A and an auxiliary winding 7B. One end of the primary winding 7A is connected to one end of the single-phase alternating current commercial power source AC, and the other end thereof is connected to the other end of the power source AC. One end of the auxiliary winding 7B is connected to one end of the single-phase alternating current commercial power source AC, and the other end thereof is connected to the other end of the power source AC through the intermediary of an operating capacitor 47.

One end of the auxiliary winding 7B is also connected to the other end of the single-phase alternating current commercial power source AC through the intermediary of a contact 61B of a start-up relay 61 and start-up capacitors 48 and 48. These contact 61B and the start-up capacitors 48 and 48 are connected in series, and the operating capacitor 47 is connected in parallel to the contact 61B and the start-up capacitors 48 and 48. The operating capacitor 47 is set to a capacitance suited for steady operation. In the state wherein the operating capacitor 47 and the start-up capacitors 48 and 48 are connected in parallel, the capacitors 47, 48, and 48 are set to capacitances suited for start-up. Reference numerals 48A and 48A denote discharge resistors for discharging currents charged in the start-up capacitors 48 and 48, and reference numeral 61A denotes a start-up relay coil.

When the power switch PSW is turned ON, current is supplied from the single-phase alternating current commercial power source AC to the primary winding 7A and the auxiliary winding 7B. At the start-up of the synchronous induction motor 2, current passes through the start relay coil 61A, causing the contact 61B to close. The auxiliary winding 7B obtains start-up torque from the current phase difference between itself and the primary winding 7A produced by the operating capacitor 47 and the start-up capacitors 48 and 48 connected in parallel, thus causing the synchronous induction motor 2 to start running. After the synchronous induction motor 2 is energized and starts running, the contact 61B opens after a while to isolate the start-up capacitors 48 and 48, and the synchronous induction motor 2 continues steady operation from the current phase difference between the primary winding 7A and the auxiliary winding 7B produced by the operating capacitor 47. The running synchronous induction motor 2 operates the hermetic electric compressor C, thus enabling an air conditioner to effect air conditioning in the room wherein the air conditioner is installed, or the refrigerator to effect cooling therein.

As the hermetic electric compressor C is operated, the temperature of the compressor 3 rises and the compressor 3 becomes hot. As the compressor 3 becomes hot, the temperature of the stator winding 7 rises accordingly. The bimetal switch 64 detects the temperature of the stator winding 7. If the detected temperature is higher than a preset temperature level, then the bimetal switch 64 opens the contact to interrupt the supply of power to the stator winding 7. With this arrangement, the supply of power to the stator winding 7 can be interrupted before the stator winding 7 generates abnormal heat while the hermetic electric compressor C is in operation, thus making it possible to securely restrain damage to the stator winding 7 and the thermal demagnetization of the permanent magnets 31 and to protect the hermetic electric compressor C from damage due to abnormal heat generation.

Figure 57:
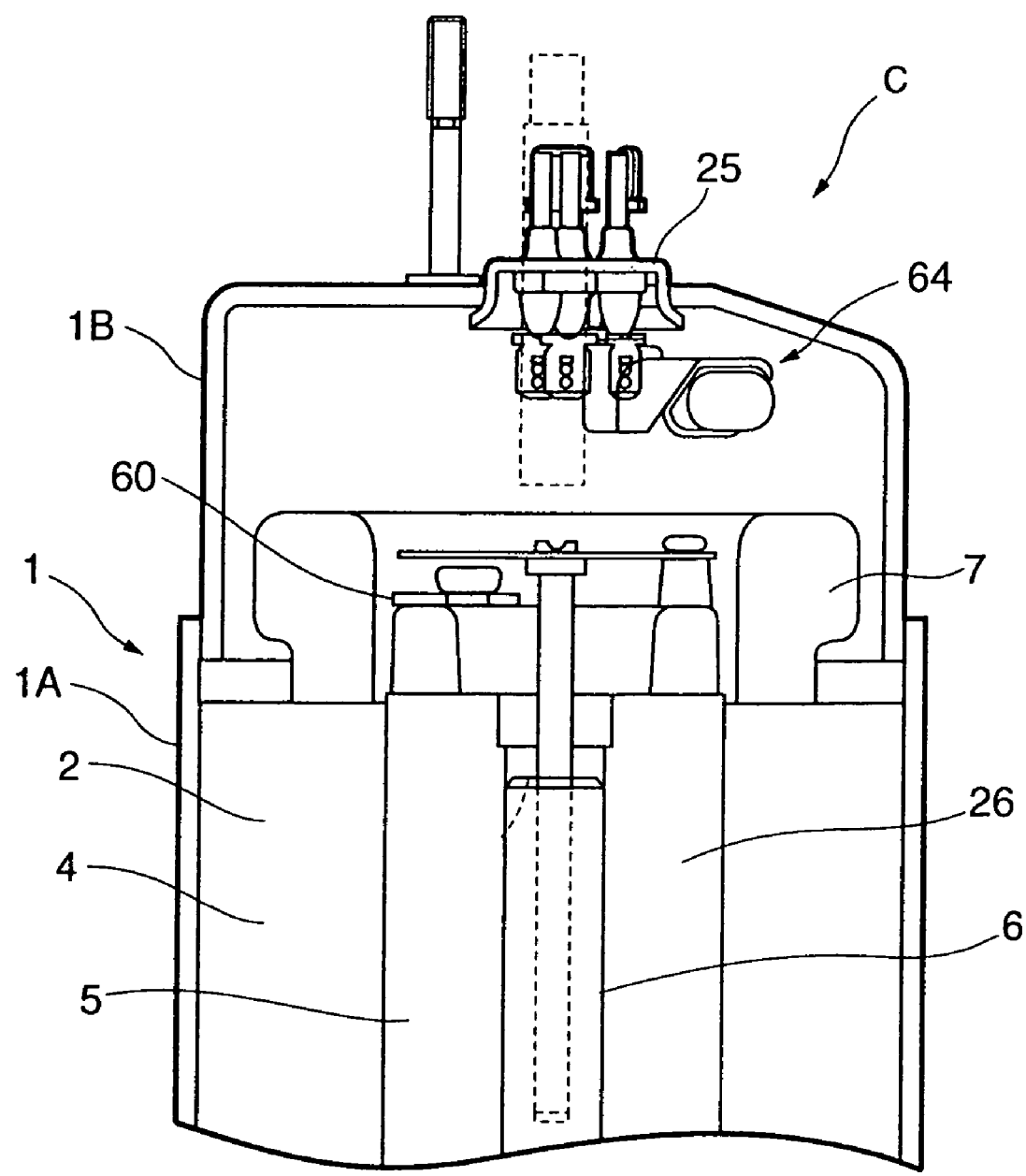
FIG. 57 is a longitudinal sectional side view of a part (in the vicinity of an end cap) of another hermetic electric compressor.

FIG. 57 is a longitudinal sectional side view of a part of another hermetic electric compressor C (the part being in the vicinity of an end cap 1B). The hermetic electric compressor C shown in FIG. 57 is equipped with a bimetal switch 64 as a thermal protector that opens and closes a contact at a predetermined temperature, as mentioned above. The bimetal switch 64 is directly connected to a hermetic terminal 25 that extends into a hermetic vessel 1. The bimetal switch 64 is connected between the hermetic terminal 25 provided on the end cap 1B of the hermetic vessel 1 and the stator winding 7, and it cuts off the supply of power from the single-phase alternating current commercial power source AC to the stator winding 7 by opening the contact if the temperature in the hermetic vessel 1 exceeds a predetermined temperature level. The electrical circuit diagram of the hermetic electric compressor C is the same as that shown in FIG. 56.

When the power switch PSW is turned ON, current is supplied from the single-phase alternating current commercial power source AC to the primary winding 7A and the auxiliary winding 7B. At the start-up of the synchronous induction motor 2, current passes through the start relay coil 61A, causing the contact 61B to close. The auxiliary winding 7B obtains start-up torque from the current phase difference between itself and the primary winding 7A produced by the operating capacitor 47 and the start-up capacitors 48 and 48 connected in parallel, thus causing the synchronous induction motor 2 to start running. After the synchronous induction motor 2 is energized and starts running, the contact 61B opens after a while to isolate the start-up capacitors 48 and 48, and the synchronous induction motor 2 continues steady operation from the current phase difference between the primary winding 7A and the auxiliary winding 7B produced by the operating capacitor 47. The running synchronous induction motor 2 operates the hermetic electric compressor C, thus enabling an air conditioner to effect air conditioning in the room wherein the air conditioner is installed, or the refrigerator to effect cooling therein.

As the hermetic electric compressor C is operated, the temperature of the compressor 3 rises and becomes hot. As the compressor 3 becomes hot, the temperature of the stator winding 7 rises, and the temperature inside the end cap 1B also rises accordingly. As the temperature inside the end cap 1B rises, the bimetal switch 64 detects the temperature. If the detected temperature inside the end cap 1B is higher than a preset temperature level, then the contact is opened to interrupt the supply of power to the stator winding 7. With this arrangement, the supply of power to the stator winding 7 can be interrupted before the stator 4 or the stator winding 7 generates abnormal heat while the hermetic electric compressor C is in operation, thus making it possible to securely restrain damage to the stator winding 7 and the thermal demagnetization of the permanent magnets 31 and to protect the hermetic electric compressor C from damage due to abnormal heat generation.

Figure 58:
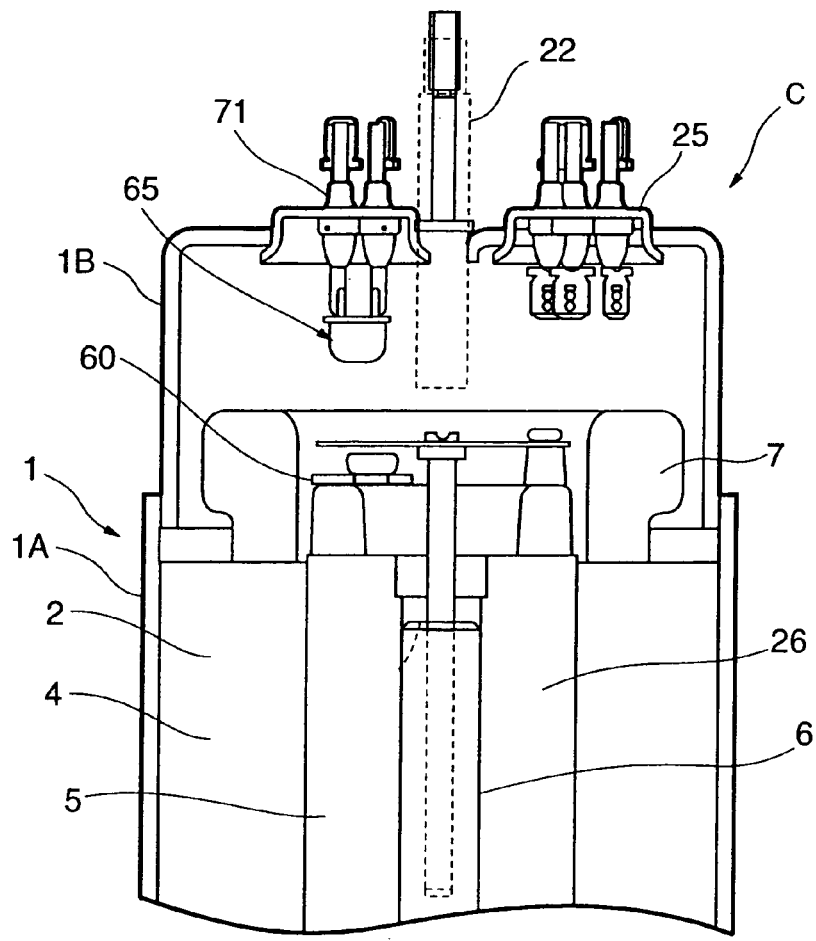
FIG. 58 is a longitudinal sectional side view of a part (in the vicinity of an end cap) of still another hermetic electric compressor.

FIG. 58 is a longitudinal sectional side view of a part of yet another hermetic electric compressor C (the part being in the vicinity of an end cap 1B). The hermetic electric compressor C shown in FIG. 58 is equipped with a thermostat 65 as a thermal protector that opens and closes a contact at a predetermined temperature. The thermostat 65 is connected to a connecting terminal 71 provided on the end cap 1B of a hermetic vessel 1 by a lead wire 72, and it cuts off the supply of power from the single-phase alternating current commercial power source AC to the stator winding 7 by opening the contact if the temperature in the hermetic vessel 1 exceeds a predetermined temperature level.

Figure 59:
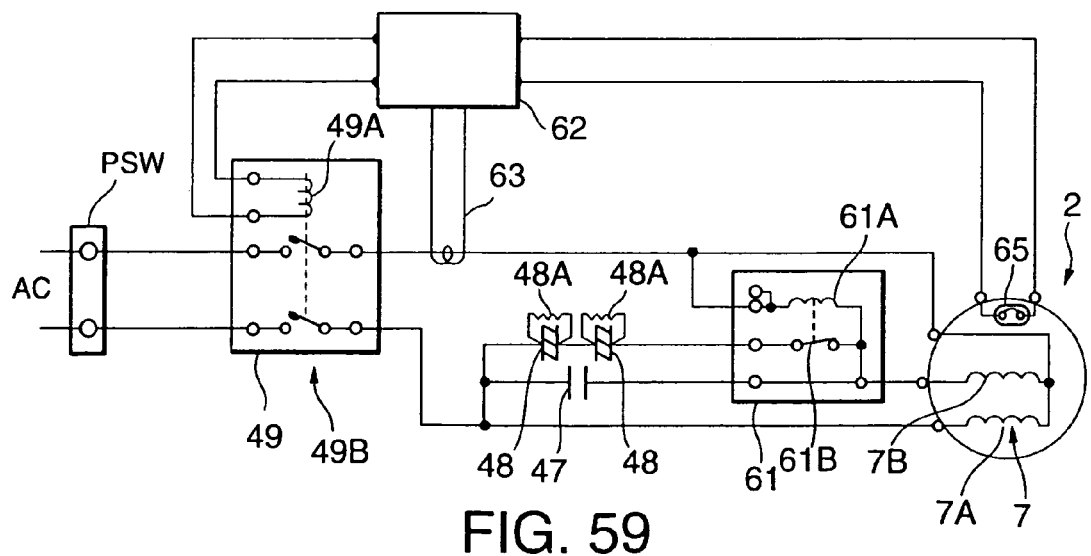
FIG. 59 is an electrical circuit diagram of a synchronous induction motor of the hermetic electric compressor shown in FIG. 58.

FIG. 59 shows an electrical circuit diagram of the synchronous induction motor 2 of the hermetic electric compressor C shown in FIG. 58. Referring to FIG. 59, reference numeral 65 denotes the thermostat. The rest of FIG. 59 is the same as FIG. 54. When a power switch PSW is turned ON with a control relay contact 49B closed, current is supplied from the single-phase alternating current commercial power source AC to the primary winding 7A and the auxiliary winding 7B. At the start-up of the synchronous induction motor 2, current passes through a start relay coil 61A, causing the contact 61B to close. The auxiliary winding 7B obtains start-up torque from the current phase difference between itself and the primary winding 7A produced by the operating capacitor 47 and the start-up capacitors 48 and 48 connected in parallel thereto, thus causing the synchronous induction motor 2 to start running. After the synchronous induction motor 2 is energized and starts running, the contact 61B opens after a while to isolate the start-up capacitors 48 and 48, and the synchronous induction motor 2 continues steady operation from the current phase difference between the primary winding 7A and the auxiliary winding 7B produced by the operating capacitor 47. The running synchronous induction motor 2 operates the hermetic electric compressor C, thus enabling an air conditioner to effect air conditioning in the room wherein the air conditioner is installed, or enabling the refrigerator to effect cooling therein.

As the hermetic electric compressor C is operated, the temperature of the compressor 3 rises and the compressor 3 becomes hot. As the compressor 3 becomes hot, the temperature inside the end cap 1B also rises. This causes the thermostat 65 to detect the temperature inside the end cap 1B, and if the detected temperature is higher than a preset temperature level, the contact thereof is closed. The moment the contact of the thermostat 65 is closed, the controller 62 causes current to pass through the control relay coil 49A to open the control relay contact 49B thereby to cut off the supply of power to the stator winding 7. With this arrangement, the supply of power to the stator winding 7 can be interrupted before abnormal heat is generated inside the end cap 1B while the hermetic electric compressor C is in operation, thus making it possible to securely restrain damage to the stator winding 7 and the thermal demagnetization of the permanent magnets 31.

Furthermore, if large current flows into the stator winding 7 due to overloaded operation of the hermetic electric compressor C, the line current detector 63 detects the large current flow. If the detected current is larger than a preset current level, then the controller 62 detects the large current flow into the stator winding 7, and passes current through the control relay coil 49A to open the control relay contact 49B to cut off the supply of power to the stator winding 7. With this arrangement, the supply of power to the stator winding 7 can be interrupted so as to protect the synchronous induction motor 2 before an overloaded operation of the hermetic electric compressor C is continued, which would lead to damage to the hermetic electric compressor C. The controller 62 shuts off the supply of power to the stator winding 7 to protect the synchronous induction motor 2 in response to a signal issued by the thermostat 65 or the line current detector 63, whichever issued the detection signal first.

Figure 60:
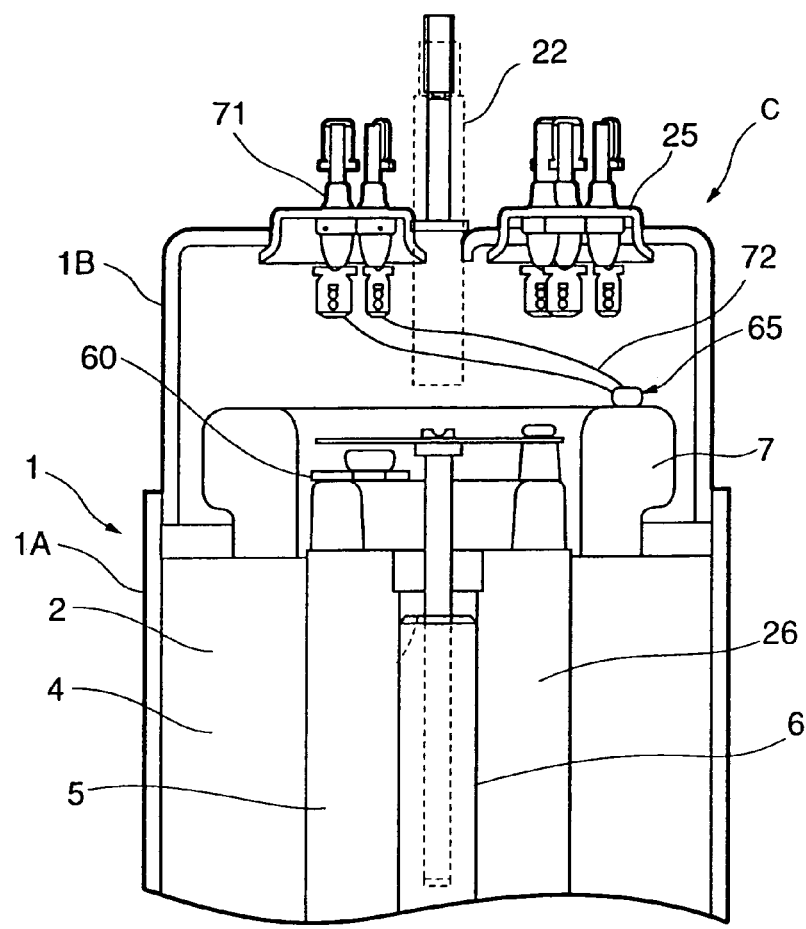
FIG. 60 is a longitudinal sectional side view of a part (in the vicinity of an end cap) of yet another hermetic electric compressor.

FIG. 60 is a longitudinal sectional side view of a part of a further hermetic electric compressor C (the part being in the vicinity of an end cap 1B). The hermetic electric compressor C shown in FIG. 60 is provided with a thermostat 65 whose resistance value changes with temperature. The thermostat 65 is secured to the stator winding 7 by a polyester yarn 70 for binding a coil end of the stator winding 7. The thermostat 65 is connected, by a lead wire 72, also to a connecting terminal 71 provided on the end cap 1B of the hermetic vessel 1.

Figure 61:
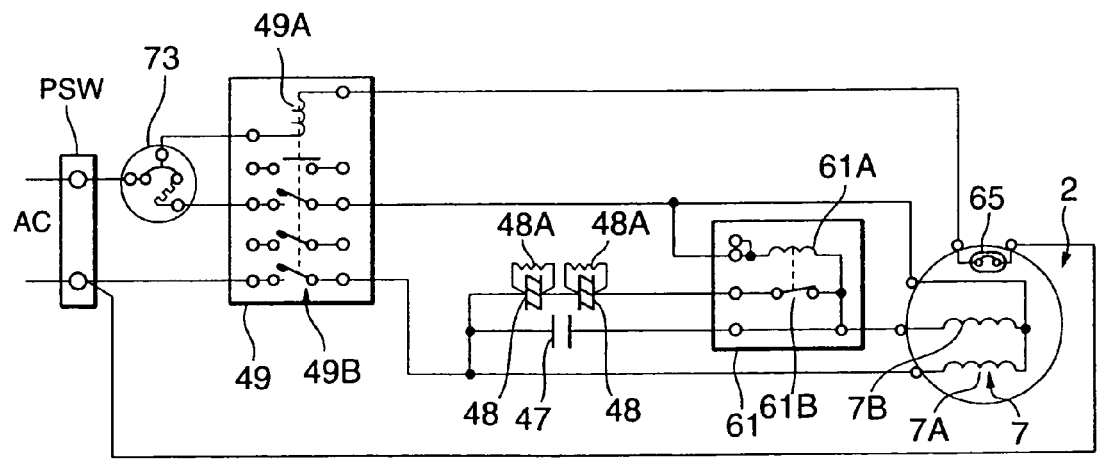
FIG. 61 is an electrical circuit diagram of a synchronous induction motor of the hermetic electric compressor shown in FIG. 60.

FIG. 61 is an electrical circuit diagram of the synchronous induction motor 2 of the hermetic electric compressor C shown in FIG. 60. Referring to FIG. 61, the synchronous induction motor 2, which receives power from a single-phase alternating current commercial power source AC is equipped with a stator winding 7 formed of a primary winding 7A and an auxiliary winding 7B. One end of the primary winding 7A is connected to one end of the single-phase alternating current commercial power source AC, and the other end thereof is connected to the other end of the power source AC. One end of the auxiliary winding 7B is connected to one end of the single-phase alternating current commercial power source AC, and the other end thereof is connected to the other end of the power source AC through the intermediary of an operating capacitor 47.

One end of the auxiliary winding 7B is also connected to the other end of the single-phase alternating current commercial power source AC through the intermediary of a contact 61B of a start-up relay 61 and start-up capacitors 48 and 48. These contact 61B and the start-up capacitors 48 and 48 are connected in series, and the operating capacitor 47 is connected in parallel to the contact 61B and the start-up capacitors 48 and 48. The operating capacitor 47 is set to a capacitance suited for steady operation. In the state wherein the operating capacitor 47 and the start-up capacitors 48 and 48 are connected in parallel, the capacitors 47, 48, and 48 are set to capacitances suited for start-up. Reference numerals 48A and 48A denote discharge resistors for discharging currents charged in the start-up capacitors 48 and 48, reference numeral 61A denotes a start-up relay coil, and PSW denotes a power switch.

A control relay 49 is provided that is connected between the power switch PSW and the stator winding 7 and that serves also as a protective switch for supplying power from the single-phase alternating current commercial power source AC to the stator winding 7 and to cut off the supply of power to the stator winding 7. One end of the thermostat 65 secured to the stator winding 7 is connected to one end of the single-phase alternating current commercial power source AC through the intermediary of a relay coil 49A of the control relay 49 and an overload switch 73 functioning as an overload protector. The other end of the thermostat 65 is connected to the other end of the single-phase alternating current commercial power source AC. Reference numeral 49B denotes switch contacts that cause current to pass through a control relay coil 49A so as to open the control relay 49 if a predetermined overload current flows into the overload switch 73.

When the power switch PSW is turned ON with the control relay contact 49B closed, current is supplied from the single-phase alternating current commercial power source AC to the primary winding 7A and the auxiliary winding 7B through the. intermediary of an overload switch 73 and the control relay contact 49B. At the start-up of the synchronous induction motor 2, current passes through a start relay coil 61A, causing the contact 61B to close. The auxiliary winding 7B obtains start-up torque from the current phase difference between itself and the primary winding 7A produced by the operating capacitor 47 and the start-up capacitors 48 and 48 connected in parallel, thus causing the synchronous induction motor 2 to start running. After the synchronous induction motor 2 is energized and starts running, the contact 61B opens after a while to isolate the start-up capacitors 48 and 48, and the synchronous induction motor 2 continues steady operation from the current phase difference between the primary winding 7A and the auxiliary winding 7B produced by the operating capacitor 47. The running synchronous induction motor 2 operates the hermetic electric compressor C, thus enabling an air conditioner to effect air conditioning in the room wherein the air conditioner is installed, or enabling the refrigerator to effect cooling therein.

As the hermetic electric compressor C is operated, the temperature of the compressor 3 rises and the compressor 3 becomes hot. As the compressor 3 becomes hot, the temperature of the stator winding 7 rises accordingly. The thermostat 65 detects the temperature, and if the detected temperature is higher than a preset temperature level, then the contact is closed. This causes current to pass through the control relay coil 49A to open the control relay contacts 49B thereby to cut off the supply of power to the stator winding 7. With this arrangement, the supply of power to the stator winding 7 can be interrupted before abnormal heat is generated inside the end cap 1B while the hermetic electric compressor C is in operation, thus making it possible to securely restrain damage to the stator winding 7 and the thermal demagnetization of the permanent magnets 31.

If overload current flows into the stator winding 7 due to overloaded operation of the hermetic electric compressor C, the overload switch 73 detects the overload current. If the detected current exceeds a preset current value, then the overload switch 73 passes current through the control relay coil 49A to open the control relay contacts 49B so as to cut off the supply of power to the stator winding 7. This makes it possible to cut off the supply of power to the stator winding 7 to protect the synchronous induction motor 2 before the hermetic electric compressor C is damaged due to an overloaded operation of the hermetic electric compressor C. The supply of power to the stator winding 7 is interrupted in order to protect the synchronous induction motor 2 in response to a signal issued by the thermostat 65 or the overload switch 73, whichever issued the detection signal first.

Figure 62:
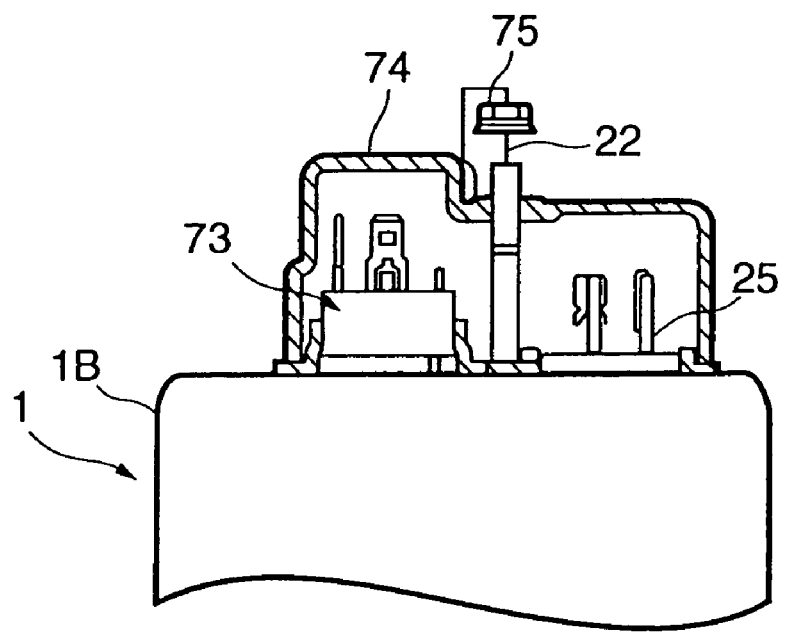
FIG. 62 is a longitudinal sectional side view of a part (in the vicinity of an end cap) of a further hermetic electric compressor.

FIG. 62 is a longitudinal sectional side view of a part of still another hermetic electric compressor C (the part being in the vicinity of an end cap 1B). The hermetic electric compressor C shown in FIG. 62 is equipped with an overload switch 73 as an overload protector. The overload switch 73 is secured to the end cap 1B of a hermetic vessel 1. More specifically, the overload switch 73 is secured to a hermetic terminal 25 on the end surface of the hermetic vessel 1, and opens a contact (not shown) to cut off the supply of power to the stator winding 7 if a predetermined overload current passes. Reference numeral 74 denotes a cover for protecting the hermetic terminal 25 and the overload switch 73, and reference numeral 75 denotes a nut for securing the cover 74.

Figure 63:
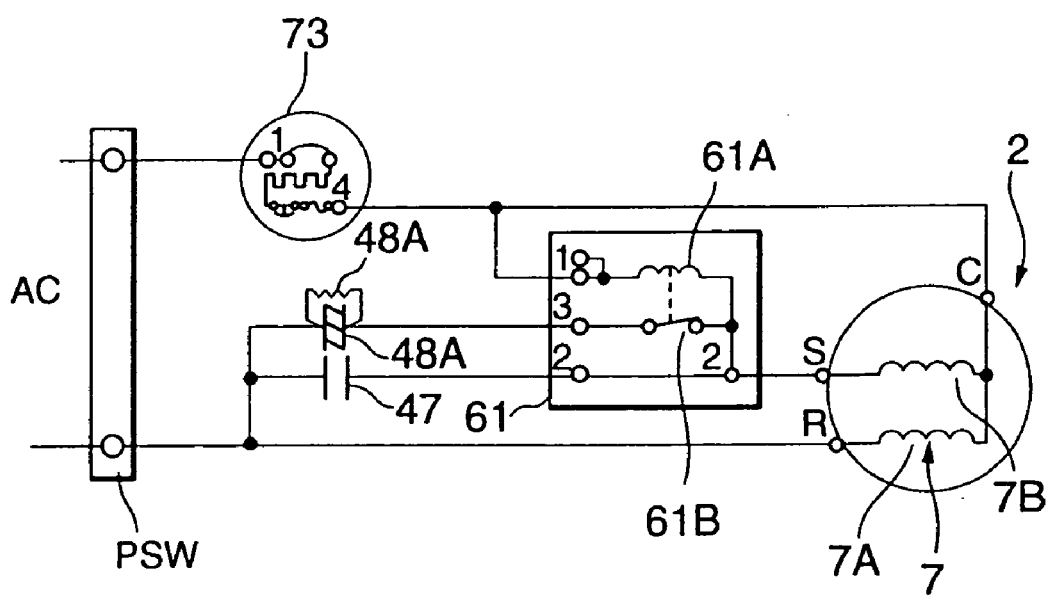
FIG. 63 is an electrical circuit diagram of a synchronous induction motor of the hermetic electric compressor shown in FIG. 62.

FIG. 63 is an electrical circuit diagram of the synchronous induction motor 2 of the hermetic electric compressor C shown in FIG. 62. Referring to FIG. 63, the synchronous induction motor 2, which receives power from a single-phase alternating current commercial power source AC through the intermediary of the overload switch 73 is equipped with a stator winding 7 formed of a primary winding 7A and an auxiliary winding 7B. One end of the primary winding 7A is connected to one end of the single-phase alternating current commercial power source AC, and the other end thereof is connected to the other end of the power source AC. One end of the auxiliary winding 7B is connected to one end of the single-phase alternating current commercial power source AC, and the other end thereof is connected to the other end of the power source AC through the intermediary of an operating capacitor 47.

One end of the auxiliary winding 7B is also connected to the other end of the single-phase alternating current commercial power source AC through the intermediary of a contact 61B of a start-up relay 61 and a start-up capacitor 48. These contact 61B and the start-up capacitor 48 are connected in series, and the operating capacitor 47 is connected in parallel to the contact 61B and the start-up capacitor 48. The operating capacitor 47 is set to a capacitance suited for steady operation. In the state wherein the operating capacitor 47 and the start-up capacitor 48 are connected in parallel, the capacitors 47 and 48 are set to capacitances suited for start-up. Reference numeral 48A denotes a discharge resistor for discharging current charged in the start-up capacitor 48, reference numeral 61A denotes a start-up relay coil, and PSW denotes a power switch.

When the power switch PSW is turned ON, current is supplied from the single-phase alternating current commercial power source AC to the primary winding 7A and the auxiliary winding 7B through the intermediary of the overload switch 73. At the start-up of the synchronous induction motor 2, current passes through a start relay coil 61A, causing the contact 61B to close. The auxiliary winding 7B obtains start-up torque from the current phase difference from the primary winding 7A produced by the operating capacitor 47 and the start-up capacitor 48 connected in parallel thereto, thus causing the synchronous induction motor 2 to start running. After the synchronous induction motor 2 is energized and starts running, the contact 61B opens after a while to isolate the start-up capacitor 48, and the synchronous induction motor 2 continues steady operation from the current phase difference between the primary winding 7A and the auxiliary winding 7B produced by the operating capacitor 47. The running synchronous induction motor 2 operates the hermetic electric compressor C, thus enabling an air conditioner to effect air conditioning in the room wherein the air conditioner is installed, or enabling the refrigerator to effect cooling therein.

If overload current flows into the stator winding 7 due to overloaded operation of the hermetic electric compressor C, the overload switch 73 detects the overload current. If the detected current exceeds a preset current value, then the overload switch 73 causes the contact to open so as to cut off the supply of power to the stator winding 7. More specifically, if overload current flows into the stator winding 7, then the overload switch 73 opens the contact thereby to interrupt the supply of power from the single-phase alternating current commercial power source AC to the stator winding 7. This makes it possible to cut off the supply of power to the stator winding 7 to protect the synchronous induction motor 2 before the hermetic electric compressor C is damaged due to an overloaded operation of the hermetic electric compressor C.

Figure 64:
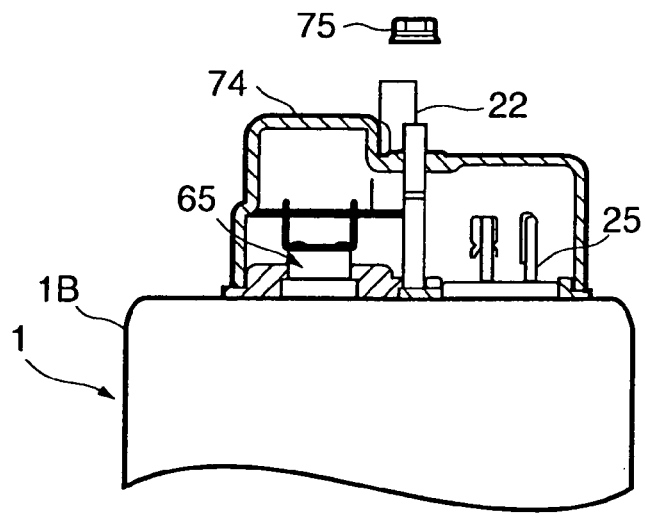
FIG. 64 is a longitudinal sectional side view of a part (in the vicinity of an end cap) of another hermetic electric compressor.

FIG. 64 is a longitudinal sectional side view of a part of still another hermetic electric compressor C (the part being in the vicinity of an end cap 1B). The hermetic electric compressor C shown in FIG. 64 is equipped with a thermostat 65 functioning as an overload protector that opens/closes a contact at a predetermined temperature. The thermostat 65 is secured to the end cap 1B, which is an outer surface of a hermetic vessel 1. More specifically, the thermostat 65 is secured to the a hermetic terminal 25 on the end surface of the hermetic vessel 1, and opens/closes a contact according to the temperature of the end cap 1B. Reference numeral 74 denotes a cover for protecting the hermetic terminal 25 and the thermostat 65, and reference numeral 75 denotes a nut for securing the cover 74.

Figure 65:
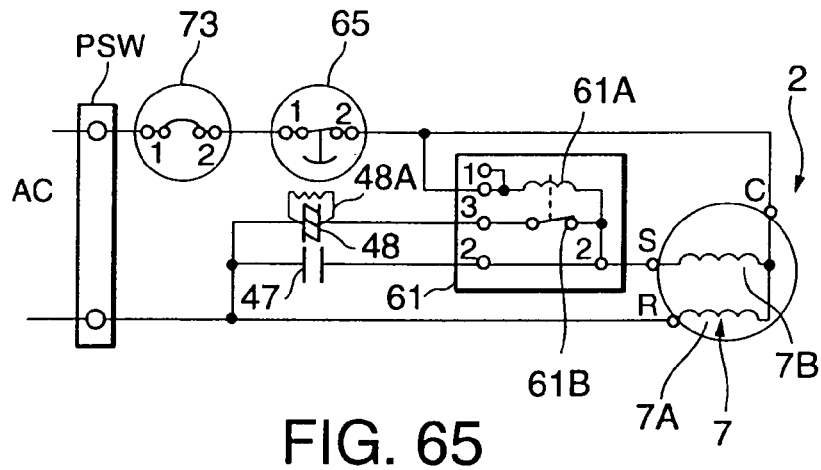
FIG. 65 is an electrical circuit diagram of a synchronous induction motor of the hermetic electric compressor shown in FIG. 64.

FIG. 65 is an electrical circuit diagram of the synchronous induction motor 2 of the hermetic electric compressor C shown in FIG. 64. Referring to FIG. 65, the synchronous induction motor 2, which receives power from a single-phase alternating current commercial power source AC through the intermediary of the overload switch 73 and the thermostat 65 is equipped with a stator winding 7 formed of a primary winding 7A and an auxiliary winding 7B. One end of the primary winding 7A is connected to one end of the single-phase alternating current commercial power source AC, and the other end thereof is connected to the other end of the power source AC. One end of the auxiliary winding 7B is connected to one end of the single-phase alternating current commercial power source AC, and the other end thereof is connected to the other end of the power source AC through the intermediary of an operating capacitor 47.

One end of the auxiliary winding 7B is also connected to the other end of the single-phase alternating current commercial power source AC through the intermediary of a contact 61B of a start-up relay 61 and a start-up capacitor 48. These contact 61B and the start-up capacitor 48 are connected in series, and the operating capacitor 47 is connected in parallel to the contact 61B and the start-up capacitor 48. The operating capacitor 47 is set to a capacitance suited for steady operation. In the state wherein the operating capacitor 47 and the start-up capacitor 48 are connected in parallel, the capacitors 47 and 48 are set to capacitances suited for start-up. Reference numeral 48A denotes a discharge resistor for discharging current charged in the start-up capacitor 48, reference numeral 61A denotes a start-up relay coil, and PSW denotes a power switch.

When the power switch PSW is turned ON, current is supplied from the single-phase alternating current commercial power source AC to the primary winding 7A and the auxiliary winding 7B. At the start-up of the synchronous induction motor 2, current passes through the start relay coil 61A, causing the contact 61B to close. The auxiliary winding 7B obtains start-up torque from the current phase difference between itself and the primary winding 7A produced by the operating capacitor 47 and the start-up capacitor 48 connected in parallel thereto, thus causing the synchronous induction motor 2 to start running. After the synchronous induction motor 2 is energized and starts running, the contact 61B opens after a while to isolate the start-up capacitor 48, and the synchronous induction motor 2 continues steady operation from the current phase difference between the primary winding 7A and the auxiliary winding 7B produced by the operating capacitor 47. The running synchronous induction motor 2 operates the hermetic electric compressor C, thus enabling an air conditioner to effect air conditioning in the room wherein the air conditioner is installed, or enabling the refrigerator to effect cooling therein.

As the hermetic electric compressor C is operated, the temperature of the compressor 3 rises and the compressor 3 becomes hot. As the compressor 3 becomes hot, the temperature of the end cap 1B rises accordingly. The thermostat 65 detects the temperature of the end cap 1B, and if the temperature of the end cap 1B is higher than a preset temperature level, then the contact is opened. This interrupts the supply of power to the stator winding 7. With this arrangement, the supply of power to the stator winding 7 can be shut off before abnormal heat is generated inside the end cap 1B while the hermetic electric compressor C is in operation, thus making it possible to securely restrain damage to the stator winding 7 and the thermal demagnetization of the permanent magnets 31.

If overload current flows into the stator winding 7 due to overloaded operation of the hermetic electric compressor C, the overload switch 73 detects the overload current. If the detected current exceeds a preset current value, then the overload switch 73 opens the contact so as to cut off the supply of power to the stator winding 7. This makes it possible to cut off the supply of power to the stator winding 7 to protect the synchronous induction motor 2 before the hermetic electric compressor C is damaged due to an overloaded operation of the hermetic electric compressor C. The supply of power to the stator winding 7 is interrupted in order to protect the synchronous induction motor 2 in response to a signal issued by the thermostat 65 or the overload switch 73, whichever issued the detection signal first.

Figure 66:
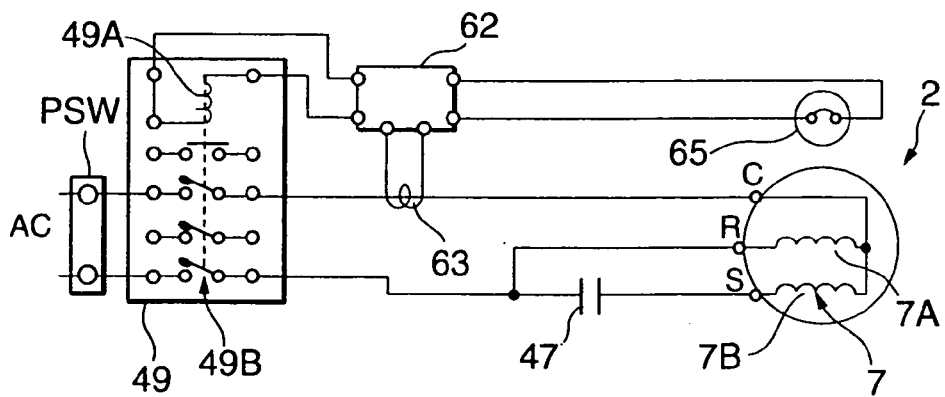
FIG. 66 is an electrical circuit diagram of a synchronous induction motor of another hermetic electric compressor.

FIG. 66 is an electrical circuit diagram of another synchronous induction motor 2 of the hermetic electric compressor C. A thermostat 65 is secured to the outer surface of the hermetic vessel 1, as in the case of the compressor shown in FIG. 64. Referring to FIG. 66, the synchronous induction motor 2, which receives power from a single-phase alternating current commercial power source AC is equipped with a stator winding 7 formed of a primary winding 7A and an auxiliary winding 7B. One end of the primary winding 7A is connected to one end of the single-phase alternating current commercial power source AC, and the other end thereof is connected to the other end of the power source AC. One end of the auxiliary winding 7B is connected to one end of the single-phase alternating current commercial power source AC, and the other end thereof is connected to the other end of the power source AC through the intermediary of an operating capacitor 47. The operating capacitor 47 is set to a capacitance suited for start-up and steady operation of the synchronous induction motor 2.

A control relay 49 is provided which is connected between the power switch PSW and the stator winding 7 and which acts also as a protective switch for supplying power from the single-phase alternating current commercial power source AC to the stator winding 7 and for cutting off the supply of power to the stator winding 7. A controller 62 is connected to the thermostat 65 secured to the end cap 1B and also connected to a control relay coil 49A of the control relay 49. Connected to the controller 62 is a current-sensitive line current detector 63 that is connected to one end of the single-phase alternating current commercial power source AC and that functions as an overload protector for detecting line current. Reference numeral 49B denotes a control relay contact.

When the power switch PSW is turned ON to supply power from the single-phase alternating current commercial power source AC to the stator winding 7, a parallel circuit of the operating capacitor 47 and the primary winding 7A is connected to the auxiliary winding 7B. The auxiliary winding 7B obtains start-up operating torque produced by the current phase difference between the primary winding 7A and the auxiliary winding 7B, thus causing the synchronous induction motor 2 to start running. The synchronous induction motor 2 then shifts to the steady operation from the current phase difference between the primary winding 7A and the auxiliary winding 7B produced by the operating capacitor 47. In this case, the operating capacitor 47 serves also as a start-up capacitor.

As the hermetic electric compressor C is operated, the temperature of the compressor 3 rises and the compressor 3 becomes hot. As the compressor 3 becomes hot, the temperature of the end cap 1B (the outer surface of the hermetic vessel 1) rises accordingly. The thermostat 65 detects the temperature of the outer surface of the hermetic vessel 1, and if the detected temperature is higher than a preset temperature level, then the contact is closed. This causes the controller 62 to detect that the temperature of the outer surface of the hermetic vessel 1 is higher than the preset temperature and to pass current through the control relay coil 49A to open the control relay-contact 49B thereby to cut off the supply of power to the stator winding 7. With this arrangement, the supply of power to the stator winding 7 can be interrupted before the hermetic vessel 1 develops abnormal heat while the hermetic electric compressor C is in operation, thus making it possible to securely restrain damage to the stator winding 7 and the thermal demagnetization of the permanent magnets 31.

Furthermore, if large current flows into the stator winding 7 due to an overloaded operation of the hermetic electric compressor C, the line current detector 63 detects the large current flow. If the detected current is larger than a preset current level, then the controller 62 passes current through the control relay coil 49A to open the control relay contact 49B so as to cut off the supply of power to the stator winding 7. With this arrangement, the supply of power to the stator winding 7 can be interrupted so as to protect the synchronous induction motor 2 before an overloaded operation of the hermetic electric compressor C is continued, which would lead to damage to the stator winding 7. The controller 62 shuts off the supply of power to the stator winding 7 to protect the synchronous induction motor 2 in response to a signal issued by the thermostat 65 or the line current detector 63, whichever issued the detection signal first.

The controller 62 incorporates a timer. The controller 62 is adapted to restart the supply of current to the synchronous induction motor 2 after waiting for the elapse of a predetermined delay time since the supply of current to the synchronous induction motor 2 was cut off. This means that the controller 62 waits for the predetermined time counted by the timer before it restarts the supply of current to the synchronous induction motor 2 after the supply of current to the synchronous induction motor 2 was cut off. Thus, since the predetermined delay time is allowed before the supply of power to the synchronous induction motor 2 is restarted after the power to the synchronous induction motor was cut off, it is possible to restrain the rotor 5 from becoming hot due to, for example, frequent repetition of energizing and de-energizing of the synchronous induction motor 2 because of a starting failure of the synchronous induction motor 2. This arrangement make it also possible to restrain the demagnetization of the permanent magnets 31 embedded in the rotor 5 caused by the heat generated in the rotor 5.

As described above, the hermetic electric compressor C is provided with the thermal protector (the thermistor 46, the bimetal switch 64, or the thermostat 65) to cut off the supply of power to the synchronous induction motor 2 in response to a predetermined temperature rise. Hence, the supply of power to the stator winding 7 can be interrupted before the stator winding 7 generates abnormal heat while the hermetic electric compressor C is running. This arrangement makes it possible to restrain the demagnetization of the permanent magnets 31 embedded in the rotor yoke 5A caused by a temperature rise, permitting dramatically improved reliability of the hermetic electric compressor C.

Moreover, the hermetic electric compressor C is provided with the overload protector (the line current detector 63 or the overload switch 73) to cut off the supply of power to the synchronous induction motor 2 in response to a predetermined overload current. Hence, the supply of power to the synchronous induction motor 2 to restrain a temperature rise in the synchronous induction motor 2 thereby to protect it if the hermetic electric compressor C is operated under an overload. This makes it possible to prevent damage to the synchronous induction motor 2, permitting a markedly prolonged service life of the synchronous induction motor 2 with resultant markedly improved reliability of the hermetic electric compressor C.

In the embodiments, the stainless steel plates have been used for the end surface members 66 and 67 holding the permanent magnets 31. Alternatively, however, using aluminum plates that allow further easier passage of current for the end surface members 66 and 67 will permit a reduction in the secondary resistance, leading to significantly higher operational performance.

In the embodiments, the rotary compressor has been used as an example of the hermetic electric compressor C; however, the present invention is not limited thereto. The present invention may be also effectively applied to a hermetic scroll compressor constituted by a pair of meshed scrolls.

As described above in detail, according to the present invention, the synchronous induction motor includes a stator equipped with a stator winding, a rotor rotating in the stator, a plurality of secondary conductors which is positioned around a rotor yoke constituting the rotor and which is formed by die casting, end rings which are positioned on the peripheral portions of both end surfaces of the rotor yoke and which are integrally formed with the secondary conductors by die casting, permanent magnets inserted in slots formed such that they penetrate the rotor yoke, and a pair of end surface members formed of a non-magnetic material that closes the openings of both ends of the slots, wherein one of the end surface members is secured to the rotor yoke by one of the end rings when the secondary conductors and end rings are formed, and the other end surface member is secured to the rotor yoke by a fixture. Therefore, one of the end surface members can be secured to the rotor yoke at the same time when the secondary conductors and the end rings are die-cast.

With this arrangement, after the permanent magnets are inserted into the slots, the permanent magnets can be secured to the rotor merely by securing the other end surface member to the rotor yoke by a fixture. It is therefore possible to reduce the number of steps for installing the permanent magnets and to improve the assemblability, permitting the overall productivity of synchronous induction motors to be dramatically improved.

Furthermore, according to the present invention, the synchronous induction motor includes a stator equipped with a stator winding, a rotor rotating in the stator, a plurality of secondary conductors which is positioned around a rotor yoke constituting the rotor and which is formed by die casting, end rings which are positioned on the peripheral portions of both end surfaces of the rotor yoke and which are integrally formed with the secondary conductors by die casting, permanent magnets inserted in slots formed such that they penetrate the rotor yoke, and a pair of end surface members formed of a non-magnetic material that closes the openings of both ends of the slots, wherein a non-magnetic member is disposed in contact with the inner sides of the two end rings to secure the two end surface members by pressing them against the rotor yoke by the non-magnetic member. It is therefore possible to increase the sectional areas of the end rings by the amount provided by pressing the end surface members against rotor yoke by the non-magnetic member. With this arrangement, the secondary resistance is decreased by the amount equivalent to the increase in the sectional areas of the end rings. Hence, the loss of the rotor can be decreased and the heat generation can be restrained, and the magnetic forces of the magnets can be effectively used, making it possible to significantly improve the running performance of the synchronous induction motor.

According to the present invention, the synchronous induction motor includes a stator equipped with a stator winding, a rotor rotating in the stator, a plurality of secondary conductors which is positioned around a rotor yoke constituting the rotor and which is formed by die casting, end rings which are positioned on the peripheral portions of both end surfaces of the rotor yoke and which are integrally formed with the secondary conductors by die casting, permanent magnets inserted in slots formed such that they penetrate the rotor yoke, and a pair of end surface members formed of a non-magnetic material that closes the openings of both ends of the slots, wherein a balancer formed into a predetermined shape beforehand is secured by a fixture to the rotor yoke together with the end surface member. Therefore, the ease of installation of the balancer can be considerably improved. With this arrangement, it is no longer necessary to secure the permanent magnets and the balancer separately, with consequent greater ease of installation. This permits dramatically improved productivity of the synchronous induction motor.

According to the present invention, the synchronous induction motor includes a stator equipped with a stator winding, a rotor rotating in the stator, a plurality of secondary conductors which is positioned around a rotor yoke constituting the rotor and which is formed by die casting, end rings which are positioned on the peripheral portions of both end surfaces of the rotor yoke and which are integrally formed with the secondary conductors by die casting, permanent magnets inserted in slots formed such that they penetrate the rotor yoke, and a pair of end surface members which is formed of a non-magnetic material and which closes the openings of both ends of the slots, wherein a plurality of laminated sheet balancers is secured by a fixture to the rotor yoke together with the end surface member. Therefore, the ease of installation of the balancer is improved, permitting dramatically improved productivity to be achieved. Furthermore, since a plurality of sheet balancers is laminated, using inexpensive metal sheets for the balancer allows a considerable reduction in the cost of the balancer. This leads to a dramatically reduced production cost of the synchronous induction motor.

According to the present invention, the synchronous induction motor is provided with a stator equipped with a stator winding, a rotor rotating in the stator, a plurality of secondary conductors which is positioned around a rotor yoke constituting the rotor and which is formed by die casting, end rings which are positioned on the peripheral portions of both end surfaces of the rotor yoke and which are integrally formed with the secondary conductors by die casting, permanent magnets inserted in slots formed such that they penetrate the rotor yoke, and a pair of end surface members formed of a non-magnetic material that closes the openings of both ends of the slots, wherein at least one of the end surface members and a balancer are formed into one piece. Hence, the number of components can be reduced. This permits simpler installation of the end surface members, resulting in dramatically improved productivity.

According to the present invention, the synchronous induction motor includes a stator equipped with a stator winding, a rotor rotating in the stator, a plurality of secondary conductors which is positioned around a rotor yoke constituting the rotor and which is formed by die casting, end rings which are positioned on the peripheral portions of both end surfaces of the rotor yoke and which are integrally formed with the secondary conductors by die casting, permanent magnets inserted in slots formed such that they penetrate the rotor yoke, a pair of end surface members formed of a non-magnetic material that closes the openings of both ends of the slots, and a balancer secured by being press-fitted to the inner side of at least one of the end rings. Hence, the installation of the balancer can be simplified. This arrangement makes it possible to significantly improve the productivity of the synchronous induction motor.

According to the present invention, the synchronous induction motor includes a stator equipped with a stator winding, a rotor rotating in the stator, a plurality of secondary conductors which is positioned around a rotor yoke constituting the rotor and which is formed by die casting, end rings which are positioned on the peripheral portions of both end surfaces of the rotor yoke and which are integrally formed with the secondary conductors by die casting, permanent magnets inserted in slots formed such that they penetrate the rotor yoke, and a pair of end surface members formed of a non-magnetic material that closes the openings of both ends of the slots in which the permanent magnets have been inserted, wherein the two end surface members are secured to the rotor yoke by the two end rings when the secondary conductors and the end rings are formed. This arrangement makes it possible to obviate the need of, for example, the cumbersome step for inserting the permanent magnets into the slots, then attaching the end surface members to both ends of the rotor yoke after die-casting the end rings, as in the case of a prior art. Thus, the productivity of the rotor can be dramatically improved.

According to the present invention, the synchronous induction motor includes a stator equipped with a stator winding, a rotor which is secured to a rotating shaft and which rotates in the stator, a secondary conductor provided around the rotor yoke constituting the rotor, and a permanent magnet embedded in the rotor yoke, wherein a magnetic field produced by the permanent magnet does not pass through the rotating shaft. Thus, it is possible to prevent the rotating shaft from being magnetized. This arrangement makes it possible to prevent iron powder or the like from adhering to the rotating shaft and to protect the rotating shaft and a bearing from being worn due to the friction attributable to the magnetic force of the permanent magnet. This permits secure prevention of damage to the motor caused by the friction.

According to the present invention, the synchronous induction motor includes a stator equipped with a stator winding, a rotor which is secured to a rotating shaft and which rotates in the stator, a secondary conductor provided around the rotor yoke constituting the rotor, and a permanent magnet embedded in the rotor yoke, wherein a magnetic field produced by the permanent magnet bypasses the rotating shaft. Thus, it is possible to prevent the rotating shaft from being magnetized. This arrangement makes it possible to prevent iron powder or the like from adhering to the rotating shaft and to protect the rotating shaft and a bearing from being worn due to the friction attributable to the magnetic force of the permanent magnet. This permits secure prevention of damage to the motor caused by the friction.

According to the present invention, the synchronous induction motor includes a stator equipped with a stator winding, a rotor which is secured to a rotating shaft and which rotates in the stator, a secondary conductor provided around the rotor yoke constituting the rotor, and a permanent magnet embedded in the rotor yoke, wherein a magnetic field produced by the permanent magnet passes through only the rotor yoke, excluding the rotating shaft. Thus, it is possible to prevent the rotating shaft from being magnetized. This arrangement makes it possible to prevent iron powder or the like from adhering to the rotating shaft and to protect the rotating shaft and a bearing from being worn due to the friction attributable to the magnetic force of the permanent magnet. This permits secure prevention of damage to the motor caused by the friction.

In the synchronous induction motor in accordance with the present invention, a void is formed in the rotor yoke between the permanent magnet and the rotating shaft, so that the passage of the magnetic field produced by the permanent magnet can be reduced. Thus, it is possible to prevent the rotating shaft from being magnetized. This arrangement makes it possible to prevent iron powder or the like from adhering to the rotating shaft and to protect the rotating shaft and a bearing from being worn due to the friction attributable to the magnetic force of the permanent magnet. This permits secure prevention of damage to the motor caused by the friction.

In the synchronous induction motor in accordance with the present invention, a pair of the permanent magnets is disposed, sandwiching the rotating shaft therebetween, and permanent magnets for attracting the magnetic field produced by the paired permanent magnets are disposed at both ends of a line that passes the paired permanent magnets and the rotating shaft. It is therefore possible to prevent the magnetic field produced by the paired permanent magnets from passing through the rotating shaft. Thus, it is possible to prevent the rotating shaft from being magnetized. This arrangement makes it possible to prevent iron powder or the like from adhering to the rotating shaft and to protect the rotating shaft and a bearing from being worn due to the friction attributable to the magnetic force of the permanent magnet. This permits secure prevention of damage to the motor caused by the friction.

In the synchronous induction motor in accordance with the present invention, the permanent magnets are provided at both ends of a line that connects two magnetic poles, and the permanent magnets are radially disposed substantially about the rotating shaft. Hence, the magnetic field produced by the permanent magnets can be spaced away from the rotating shaft. Thus, it is possible to prevent the rotating shaft from being magnetized. This arrangement makes it possible to prevent iron powder or the like from adhering to the rotating shaft and to protect the rotating shaft and a bearing from being worn due to the friction attributable to the magnetic force of the permanent magnet. This permits secure prevention of damage to the motor due to the friction.

According to the present invention, the synchronous induction motor includes a stator equipped with a stator winding, a rotor rotating in the stator, a secondary conductor provided around the rotor yoke constituting the rotor, and a permanent magnet embedded in the rotor yoke, wherein the permanent magnet is magnetized by current passed through the stator winding. Hence, for example, a rotor in which a magnetic material for the permanent magnet that has not yet been magnetized has been inserted is installed in the stator, so that the rotor can be inserted into the stator without being magnetically attracted to its surrounding. This arrangement makes it possible to prevent inconvenience of lower productivity of the synchronous induction motor, thus permitting improved assemblability of the synchronous induction motor. This allows a synchronous induction motor with high reliability to be provided.

In the synchronous induction motor in accordance with the present invention, the permanent magnet is made of a rare earth type magnet or a ferrite magnet, so that high magnet characteristic can be achieved. With this arrangement, the magnitude of the current passed through the stator winding can be reduced so as to control the temperature at the time of magnetization to a minimum. Hence, the deformation of the rotor or the stator or the like that would be caused by high temperature can be minimized, making it possible to provide a synchronous induction motor with secured high quality.

Especially in the case of a synchronous induction motor, current passes through the secondary conductor even during normal synchronous operation, causing the temperature of the entire rotor to rise. Therefore, a reduction in demagnetization at high temperature can be restrained by using, for example, a ferrite magnet or a rare earth type magnet (the coercive force at normal temperature being 1350 to 2150 kA/m and the coercive force temperature coefficient being −0.7%/° C. or less).

In the synchronous induction motor in accordance with the present invention, the stator winding is of a single-phase configuration and has a primary winding and an auxiliary winding, and the permanent magnet is magnetized by the current passed through either the primary winding or the auxiliary winding. Hence, it is possible to achieve better magnetizing performance than, for example, in the case where current is passed through both the primary winding and the auxiliary winding at the same time. This allows an unmagnetized magnet material to be intensely magnetized.

In the synchronous induction motor in accordance with the present invention, the stator winding is of a three-phase configuration that includes a three-phase winding. The permanent magnet is magnetized by current passed through a single phase, two phases, or three phases of the stator windings. Therefore, it is possible to select the phase or phases through which current is to be passed according to the disposition of the magnet or the permissible current (against deformation or the like) of the windings.

In the synchronous induction motor in accordance with the present invention, the stator windings are coated with varnish or a sticking agent that is heated to fuse the windings. Hence, for example, even if the stator windings generate heat and become hot when an unmagnetized magnet material inserted into the rotor is magnetized by passing current through the stator windings, it is possible to restrain the deformation of winding ends of the stator windings and the deterioration of winding films caused by the heat. Thus, since the winding ends of the stator windings do not deform even if an unmagnetized magnet material inserted into the rotor is magnetized, a highly reliable synchronous induction motor can be provided.

Furthermore, according to the present invention, the synchronous induction motor in accordance with the present invention is installed in a compressor, allowing the production cost of the compressor to be considerably reduced.

In addition, it is possible to prevent inconveniences in that iron powder adhere to the rotating shaft of the synchronous induction motor of the compressor or the rotating shaft is magnetically attracted to the bearing and wears itself. This makes it possible to prevent the operation performance of the compressor from degrading.

Moreover, according to the present invention, the compressor is used with an air conditioner or an electric refrigerator or the like. Hence, the production cost of the air conditioner or the electric refrigerator can be decreased.

It is also possible to restrain the degradation of the operation performance of the air condition or the electric refrigerator or the like.

According to the present invention, the manufacturing method for a synchronous induction motor having a stator equipped with a stator winding, a rotor rotating in the stator, a secondary conductor provided around a rotor yoke constituting the rotor, and a permanent magnet embedded in the rotor yoke, includes a step for embedding a magnet constituent for the permanent magnet in the rotor yoke and a step for passing current through the stator winding to magnetize the magnet constituent. Hence, the rotor can be inserted into the stator without being magnetically attracted to its surrounding, permitting dramatically improved assemblability of the synchronous induction motor. This makes it possible to prevent an inconvenience of reduced productivity of the synchronous induction motor, which permits improved assemblability of the synchronous induction motor. As a result, a highly reliable synchronous induction motor can be provided.

In the manufacturing method for the synchronous induction motor in accordance with the present invention, a rare earth type or ferrite material is used for the magnet constituent. Therefore, a high magnet characteristic can be achieved even if, for example, a magnetizing magnetic field is weak. This makes it possible to reduce the current passing through the stator winding so as to minimize a temperature rise that occurs at the time of magnetization. Thus, the deformation of the rotor or the stator or the like caused by high temperature can be minimized, ensuring high quality of the synchronous induction motor.

In the manufacturing method for the synchronous induction motor in accordance with the present invention, the stator winding is of a single-phase configuration and has a primary winding and an auxiliary winding, and the magnet constituent is magnetized by the current passed through either the primary winding or the auxiliary winding. Hence, it is possible to achieve better magnetizing performance than, for example, in the case where current is passed through both the primary winding and the auxiliary winding at the same time. This allows an unmagnetized magnet material to be intensely magnetized.

In the manufacturing method for the synchronous induction motor in accordance with the present invention, the stator winding is of a three-phase configuration that includes a three-phase winding. The magnet constituent is magnetized by current passed through a single phase, two phases, or three phases of the stator windings. Therefore, it is possible to select the phase or phases through which current is to be passed according to the disposition of the magnet or the permissible current (against deformation or the like) of the windings.

In the manufacturing method for the synchronous induction motor in accordance with the present invention, the stator windings are coated with varnish or a sticking agent that is heated to fuse the windings. Hence, for example, even if the stator windings are subjected to electromagnetic forces when an unmagnetized magnet material inserted into the rotor is magnetized by passing current through the stator windings, it is possible to restrain the deformation of the windings and the deterioration of the films of the windings. Thus, since the winding ends of the stator windings do not deform even if an unmagnetized magnet material inserted into the rotor is magnetized, a highly reliable synchronous induction motor can be provided.

According to the present invention, the drive unit for a synchronous induction motor includes a stator equipped with a stator winding formed of a primary winding and an auxiliary winding, a rotor rotating in the stator, a secondary conductor provided around a rotor yoke constituting the rotor, a permanent magnet embedded in the rotor yoke, an operating capacitor connected to the auxiliary winding, and a series circuit of a start-up capacitor and a PTC, which is connected in parallel to the operating capacitor. This arrangement permits larger running torque to be provided at starting up the synchronous induction motor equipped with the operating capacitor connected to the auxiliary winding and the series circuit of the start-up capacitor and the PTC, which is connected in parallel to the operating capacitor. This enables the power consumed during normal operation to be reduced, making it possible to provide a drive unit capable of running the synchronous induction motor with extremely high efficiency. Hence, considerably higher efficiency can be achieved during the operation of the synchronous induction motor.

According to the present invention, the drive unit for a synchronous induction motor that includes a stator equipped with a stator winding formed of a primary winding and an auxiliary winding, a rotor rotating in the stator, a secondary conductor provided around a rotor yoke constituting the rotor, a permanent magnet embedded in the rotor yoke, an operating capacitor connected to the auxiliary winding, and a PTC connected in parallel to the operating capacitor. This arrangement permits larger running torque to be provided at starting up the synchronous induction motor equipped with the operating capacitor connected to the auxiliary winding and the PTC connected in parallel to the operating capacitor. This enables the power consumed during normal operation to be reduced, making it possible to provide a drive unit capable of running the synchronous induction motor with extremely high efficiency. Hence, considerably higher efficiency can be achieved during the operation of the synchronous induction motor.

According to the present invention, the drive unit for a synchronous induction motor includes a stator equipped with a stator winding formed of a primary winding and an auxiliary winding, a rotor rotating in the stator, a secondary conductor provided around a rotor yoke constituting the rotor, a permanent magnet embedded in the rotor yoke, an operating capacitor connected to the auxiliary winding, and a series circuit of a start-up capacitor and a start-up relay contact, which is connected in parallel to the operating capacitor. This arrangement permits larger running torque to be provided at starting up the synchronous induction motor equipped with the operating capacitor connected to the auxiliary winding and the series circuit of the start-up capacitor and the start-up relay contact, which is connected in parallel to the operating capacitor. This enables the power consumed during normal operation to be reduced, making it possible to provide a drive unit capable of running the synchronous induction motor with extremely high efficiency. Hence, considerably higher efficiency can be achieved during the operation of the synchronous induction motor.

According to the present invention, the drive unit for a synchronous induction motor includes a stator equipped with a stator winding formed of a primary winding and an auxiliary winding, a rotor rotating in the stator, a secondary conductor provided around a rotor yoke constituting the rotor, a permanent magnet embedded in the rotor yoke, and an operating capacitor connected to the auxiliary winding. This arrangement permits larger running torque to be provided at starting up the synchronous induction motor equipped with the operating capacitor connected to the auxiliary winding. This enables the power consumed during normal operation to be reduced, making it possible to provide a drive unit capable of running the synchronous induction motor with extremely high efficiency. Hence, considerably higher efficiency can be achieved during the operation of the synchronous induction motor.

According to the present invention, the hermetic electric compressor includes a compression unit and an electric unit for driving the compression unit in a hermetic vessel, wherein the electric unit is secured to the hermetic vessel and constituted by a stator equipped with a stator winding and a rotor rotating in the stator, the rotor has a secondary conductor provided around a rotor yoke and a permanent magnet embedded in the rotor yoke, and a thermal protector for cutting off the supply of current to the electric unit in response to a predetermined temperature rise is provided in the hermetic vessel. Therefore, installing the thermal protector onto the stator winding, for example, makes it possible to cut off the supply of current to the electric unit if the temperature of the stator winding rises. This arrangement makes it possible to prevent the permanent magnet embedded in the rotor yoke from being thermally demagnetized by a rise in temperature of the electric unit. Hence, the supply of current to the stator winding can be cut off before the stator winding generates abnormal heat while the hermetic electric compressor is in operation. This makes it possible to securely prevent damage to the stator winding and thermal demagnetization of the permanent magnet so as to ideally maintain the driving force of a synchronous induction motor, permitting significantly improved reliability of the electric unit.

According to the present invention, the hermetic electric compressor has a compression unit and an electric unit for driving the compression unit in a hermetic vessel, wherein the electric unit is secured to the hermetic vessel and constituted by a stator equipped with a stator winding and a rotor rotating in the stator, the rotor has a secondary conductor provided around a rotor yoke and a permanent magnet embedded in the rotor yoke, and a thermal protector for cutting off the supply of current to the electric unit in response to a predetermined temperature rise is provided on the outer surface of the hermetic vessel. Therefore, it is possible to cut off the supply of current to the electric unit if the temperature of the outer surface of the hermetic vessel rises due to the heat generated by the electric unit. Thus, a temperature rise in the hermetic vessel can be restrained, so that an accident, such as a fire, caused by a temperature rise in the hermetic vessel can be prevented.

In the hermetic electric compressor in accordance with the present invention, the thermal protector is constructed of a thermistor whose resistance value varies with temperature and a controller that controls the supply of current to the electric unit according to a change in the resistance value of the thermistor. Thus, if, for example, the temperature of the hermetic electric compressor rises and exceeds a preset level, the controller controls the supply of current to the electric unit to reduce the number of revolutions of the electric unit or cut off the supply of current to the electric unit. With this arrangement, it is possible to control the current supplied to the stator winding before the hermetic electric compressor is run under an overload condition and damaged. Thus, since the temperature of the electric unit can be controlled without the need for interrupting the operation of the hermetic electric compressor, an inconvenience, such as inadequate cooling, attributable to an interrupted operation of the hermetic electric compressor can be securely avoided. Moreover, a temperature rise in the electric unit can be securely controlled by controlling the revolution of the electric unit, enabling the service life of the electric unit to be prolonged, with resultant dramatically improved reliability of the hermetic electric compressor.

In the hermetic electric compressor in accordance with the present invention, the thermal protector is constituted by a bimetal switch, so that the current supplied to the electric unit can be cut off also if the temperature of the hermetic electric compressor rises. This obviates the need for controllably adjusting the electric unit by using an expensive circuit device, making it possible to effect inexpensive and secure protection of the hermetic electric compressor from damage caused by a temperature rise.

In the hermetic electric compressor in accordance with the present invention, the thermal protector is constituted by a thermostat that opens/closes a contact according to temperature, so that the current supplied to the electric unit can be cut off also if the temperature of the hermetic electric compressor rises. This obviates the need for controllably adjusting the electric unit by using an expensive circuit device, making it possible to effect inexpensive and secure protection of the hermetic electric compressor from damage caused by a temperature rise.

According to a further aspect of the present invention, the hermetic electric compressor includes a compression unit and an electric unit for driving the compression unit in a hermetic vessel, wherein the electric unit is secured to the hermetic vessel and constituted by a stator equipped with a stator winding and a rotor rotating in the stator, the rotor has a secondary conductor provided around a rotor yoke and a permanent magnet embedded in the rotor yoke, and an overload protector for cutting off the supply of current to the electric unit at a predetermined overload current is provided. Therefore, it is possible to cut off the supply of current to the electric unit if the hermetic electric compressor is overloaded during operation, thereby allowing the electric unit to be protected from a temperature rise. Thus, damage to the electric unit can be prevented, enabling the service life of the electric unit to be considerably prolonged, with resultant dramatically improved reliability of the hermetic electric compressor.

In the hermetic electric compressor in accordance with the present invention, the overload protector is constituted by an overload switch, so that the current supplied to the electric unit can be cut off to prevent a temperature rise in the electric unit thereby to protect it if the hermetic electric compressor is overloaded during operation. Thus, damage to the electric unit can be prevented, enabling the service life of the electric unit to be considerably prolonged, with resultant dramatically improved reliability of the hermetic electric compressor.

In the hermetic electric compressor in accordance with the present invention, the overload protector is constituted by a current transformer for detecting the current supplied to the electric unit and a controller for controlling the supply of current to the electric unit on the basis of an output of the current transformer, so that the current supplied to the electric unit can be cut off by the controller if the hermetic electric compressor is overloaded during operation. This arrangement makes it possible to prevent a temperature rise in the electric unit so as to protect the electric unit. Hence, damage to the electric unit attributable to an overload current can be securely prevented.

In the hermetic electric compressor in accordance with the present invention, the controller cuts off the supply of current to the electric unit after a predetermined time elapses since a temperature or current exceeded a predetermined value. It is therefore possible to protect, by the controller, the electric unit which would be damaged if continuously subjected to an excessive temperature rise or overcurrent caused by an overload operation or the like of the hermetic electric compressor. Thus, damage to the electric unit can be prevented, enabling the service life of the electric unit to be considerably prolonged, with resultant dramatically improved reliability of the hermetic electric compressor.

In the hermetic electric compressor in accordance with the present invention, the controller restarts the supply of current to the electric unit after waiting for the elapse of a predetermined delay time since the supply of current to the electric unit was cut off. This means that the delay time is always allowed before the supply of current to the electric unit is resumed after the supply of current to the electric unit was cut off. It is therefore possible to prevent the rotor from becoming hot due to, for example, frequent repetition of energizing and de-energizing of the electric unit. Hence, demagnetization of the permanent magnet embedded in the rotor due to heat can be prevented.

What is claimed is:
1. A synchronous induction motor comprising:
a stator equipped with a stator winding;
a rotor which is secured to a rotating shaft and which rotates in the stator;
a secondary conductor provided around the rotor yoke constituting the rotor;
a pair of permanent magnets embedded in the rotor yoke; and
permanent magnets for attracting the magnetic field produced by the paired permanent magnets, wherein
a magnetic field produced by the permanent magnet substantially does not pass through the rotating shaft, but rather substantially by-passes the rotating shaft and substantially passes through only the rotor yoke; substantially excluding the rotating shaft,
the stator is a two-pole stator,
the pair of the permanent magnets is disposed, sandwiching the rotating shaft therebetween, with a magnetic pole of one of the pair facing an opposite magnetic pole of the other one of the pair, and
the permanent magnets for attracting the magnetic field produced by the paired permanent magnets are disposed at lines of magnetic force which are produced by the paired permanent magnets and which pass around the rotating shaft, so as to have the permanent magnets draw the magnetic field away from the rotating shaft.

* * * * *